United States Patent
Do Nascimento, Jr. et al.

(10) Patent No.: US 12,459,392 B1
(45) Date of Patent: Nov. 4, 2025

(54) MODULAR, MULTI-DIRECTIONAL, BATTERY-INTEGRATED SMART ELECTRIC VEHICLE CHARGING STATION

(71) Applicant: ElectricFish Energy Inc., San Carlos, CA (US)

(72) Inventors: Nelio Batista Do Nascimento, Jr., Mountain View, CA (US); Anurag Kamal, San Carlos, CA (US); Abhishek Hemant Vinchure, San Carlos, CA (US); Gabriel Felipe de Souza, Patrocínio MG (BR)

(73) Assignee: ElectricFish Energy Inc., San Carlos, CA (US)

( * ) Notice: Subject to any disclaimer, the term of this patent is extended or adjusted under 35 U.S.C. 154(b) by 0 days.

(21) Appl. No.: 19/194,751

(22) Filed: Apr. 30, 2025

Related U.S. Application Data

(63) Continuation-in-part of application No. 19/060,799, filed on Feb. 24, 2025, now Pat. No. 12,334,727.

(51) Int. Cl.
| | |
|---|---|
| *B60L 53/63* | (2019.01) |
| *B60L 53/10* | (2019.01) |
| *B60L 53/16* | (2019.01) |
| *B60L 53/18* | (2019.01) |
| *B60L 53/53* | (2019.01) |
| *B60L 53/56* | (2019.01) |
| *B60L 53/57* | (2019.01) |
| *B60L 53/66* | (2019.01) |
| *B60L 53/68* | (2019.01) |
| *B60L 55/00* | (2019.01) |

(52) U.S. Cl.
CPC ............. *B60L 53/63* (2019.02); *B60L 53/11* (2019.02); *B60L 53/16* (2019.02); *B60L 53/18* (2019.02); *B60L 53/53* (2019.02); *B60L 53/56* (2019.02); *B60L 53/57* (2019.02); *B60L 53/665* (2019.02); *B60L 53/68* (2019.02); *B60L 55/00* (2019.02); *B60L 2210/10* (2013.01); *B60L 2210/30* (2013.01); *B60L 2260/46* (2013.01)

(58) Field of Classification Search
CPC .......... B60L 53/63; B60L 53/57; B60L 53/68; B60L 53/53; B60L 53/11; B60L 53/665; B60L 53/16; B60L 53/56; B60L 53/18; B60L 2210/10; B60L 2210/30
USPC ........................................................ 320/109
See application file for complete search history.

(56) References Cited

U.S. PATENT DOCUMENTS

| | | |
|---|---|---|
| 5,070,252 A | 12/1991 | Castenschiold et al. |
| 7,492,057 B2 | 2/2009 | Baldwin et al. |
| (Continued) | | |

FOREIGN PATENT DOCUMENTS

| | | |
|---|---|---|
| CN | 110929948 A | 3/2020 |
| CN | 111884213 A | 11/2020 |
| (Continued) | | |

*Primary Examiner* — Nathaniel R Pelton
(74) *Attorney, Agent, or Firm* — Boon Intellectual Property Law, PLLC; Brian S. Boon

(57) ABSTRACT

A modular, multi-directional, smart electric vehicle (EV) charging station. In an embodiment, the EV charging station has a field-serviceable, replaceable modular construction, a fully multi-directional power routing architecture, buffered EV-to-grid and EV-to-EV charging, multi-EV charging capability, and the ability to integrate multiple modular charging stations into a networked local and/or wide-area charging system.

20 Claims, 24 Drawing Sheets

(56) References Cited

U.S. PATENT DOCUMENTS

| | | | |
|---|---|---|---|
| 9,622,373 | B1 | 4/2017 | Sarti |
| 11,770,006 | B2 | 9/2023 | Rao et al. |
| 2015/0083505 | A1 | 3/2015 | Pearce, Jr. et al. |
| 2022/0067850 | A1 | 3/2022 | Bhasme et al. |
| 2024/0157832 | A1* | 5/2024 | Hao ......................... B60L 58/22 |
| 2025/0074236 | A1* | 3/2025 | Lee ......................... B60L 53/56 |

FOREIGN PATENT DOCUMENTS

| | | |
|---|---|---|
| CN | 112186799 A | 1/2021 |
| CN | 115333143 A | 11/2022 |

\* cited by examiner

MODULAR, MULTI-DIRECTIONAL, BATTERY-INTEGRATED SMART ELECTRIC VEHICLE CHARGING STATION

CROSS-REFERENCE TO RELATED APPLICATIONS

Priority is claimed in the application data sheet to the following patents or patent applications, each of which is expressly incorporated herein by reference in its entirety:
Ser. No. 19/060,799

BACKGROUND OF THE INVENTION

Field of the Art

The present invention is in the field of charging stations for electric vehicles.

Discussion of the State of the Art

Electric vehicle (EV) charging stations are becoming a common feature of our roadways. However, EV charging stations suffer from a number of drawbacks. They are permanent installations, requiring on-site maintenance and repair. They are uni-directional, with power flowing from the electrical grid to EVs only (or in some cases from grid to storage batteries to EVs), not allowing for EV-to-grid power routing, EV-to-storage-battery routing, or EV-to-EV charging; and they lack smart routing features which would allow both internal routing of power and integration of each charging station into a larger, wide-area system.

What is needed is a modular, multi-directional EV charging station that addresses these drawbacks.

SUMMARY OF THE INVENTION

Accordingly, the inventor has conceived and reduced to practice, a modular, multi-directional, smart electric vehicle (EV) charging station. In an embodiment, the EV charging station has a field-serviceable, replaceable modular construction, a fully multi-directional power routing architecture, buffered EV-to-grid and EV-to-EV charging, multi-EV charging capability, and the ability to integrate multiple modular charging stations into a networked local and/or wide-area charging system.

BRIEF DESCRIPTION OF THE DRAWING FIGURES

DETAILED DESCRIPTION OF THE INVENTION

Figure 1:
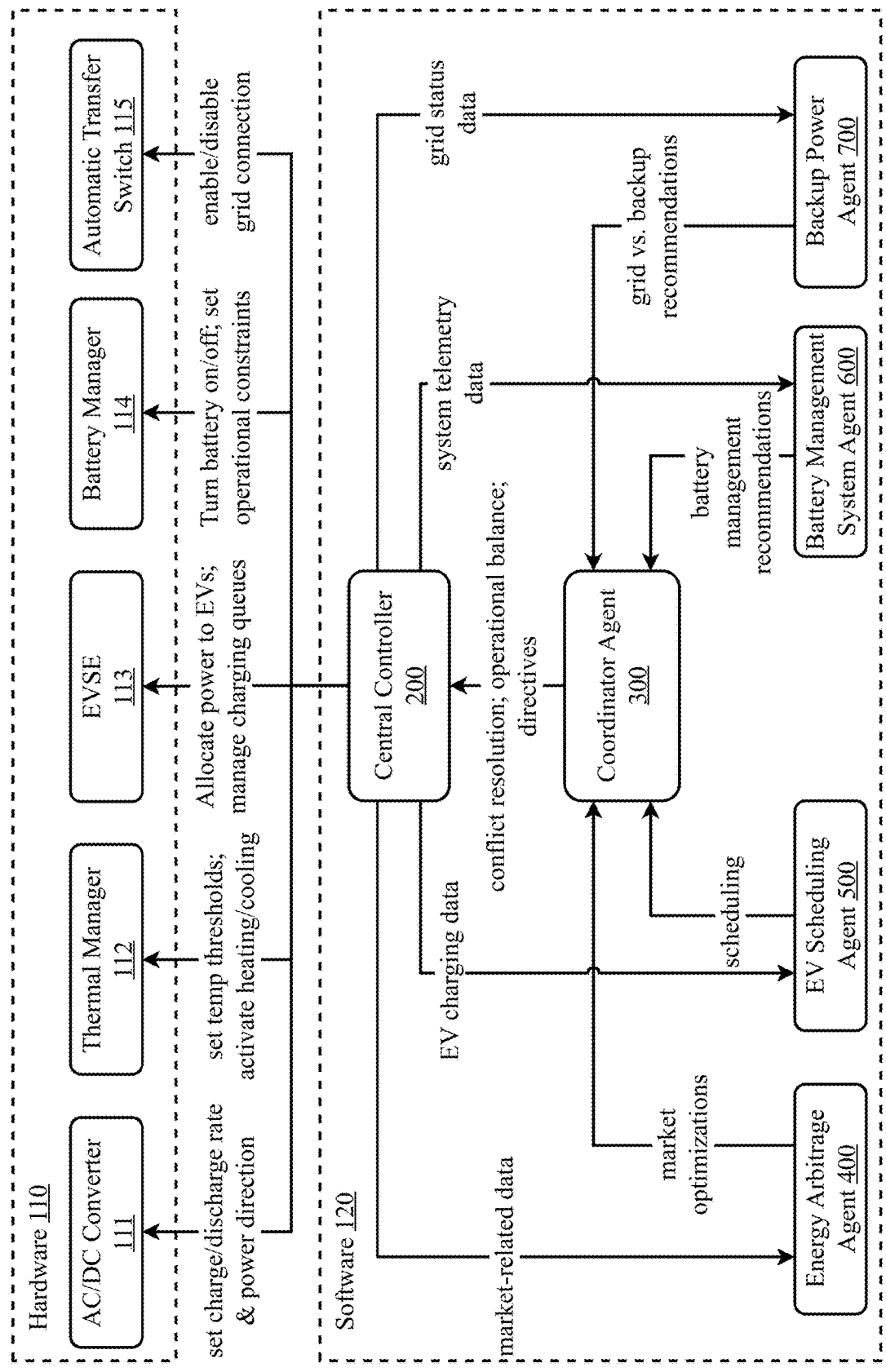
FIG. 1 is a block diagram illustrating an exemplary system architecture for a system for management and control of battery energy storage systems in complex and dynamic multi-factor environments using a degradation-aware multi-agent machine learning framework.

The inventor has conceived, and reduced to practice, a modular, multi-directional, smart electric vehicle (EV) charging station. In an embodiment, the EV charging station has a field-serviceable, replaceable modular construction, a fully multi-directional power routing architecture, buffered EV-to-grid and EV-to-EV charging, multi-EV charging capability, and the ability to integrate multiple modular charging stations into a networked local and/or wide-area charging system.

Electric vehicle (EV) charging stations are becoming a common feature of our roadways.

However, EV charging stations suffer from a number of drawbacks. They are permanent installations, requiring onsite maintenance and repair. They are uni-directional, with power flowing from the electrical grid to EVs only (or in some cases from grid to storage batteries to EVs), not allowing for EV-to-grid (V2G) power routing, EV-to-storage-battery (V2B) routing, or EV-to-EV (V2V) charging; and they lack smart routing features which would allow both internal routing of power and integration of each charging station into a larger, wide-area system.

The system described herein solves these problems by providing a modular, multi-directional, smart electric vehicle (EV) charging station having a field-serviceable, replaceable modular construction, a fully multi-directional power routing architecture, buffered V2G and V2V charging, multi-EV charging capability, and the ability to integrate multiple modular charging stations into a networked local and/or wide-area charging system. The modular system integrates all critical components (e.g., bi-directional AC/DC, DC/DC converters, energy storage, fusing, metering, control logic) a single smart EV charging station. This dramatically simplifies deployment and allows more sophisticated control of power pathways. The system described herein is a fully multi-directional EV charging system that integrates all the hardware and software needed for advanced EV charging and energy management into a single, modular unit, which effectively condenses an entire microgrid—including an AC grid interface, DC distribution, battery storage, and intelligent control—into a replaceable modular unit capable of delivering ultra-fast EV charging, multi-directional energy exchange, and backup power capabilities, while maintaining power quality and improving safety over existing EV charging stations. The system is housed in a containerized or cabinet form factor that is modular and easily deployable, dramatically reducing installation time (no trenching or major construction is needed). Introducing modularity into EV charging stations enables new use cases such as using parked EVs for grid support or allowing energy trading between vehicles, while insulating the grid from adverse effects and keeping operations safe. In summary, the system described herein serves as an intelligent charging hub that can simultaneously draw power from or supply power to the electrical grid, one or more EVs, and a backup battery system.

The modular, multi-directional, smart electric vehicle (EV) charging station described herein introduces many novel aspects and improvements over the prior art in EV charging and energy storage solutions including, but not limited to, a modular design emphasizing modularity, field serviceability, and space efficiency; a fully multi-directional power routing architecture; integrated power quality preservation via internal buffering; bi-directional AC/DC coupling between the system and the electrical grid with enhanced safety in bi-directional grid operations; revenue-grade metering; multiple DC voltage levels with DC isolation & protective Earth bonding; and comprehensive software integration with grid systems. Each of these improvements is discussed in further detail below.

Modular Design Emphasizing Modularity, Space Efficiency, Serviceability, and Safety: The modularity of the system allows either for repair in the field as in existing EV charging systems or for complete replacement by simply removing the modular EV charging station and dropping a new one in its place. This simplifies and accelerates major repairs which are difficult and time-consuming to perform in the field. Rather than perform a major repair in the field (i.e., onsite where the EV charging station is installed), the modular EV charging station can simply be swapped out for a new one, and the unit requiring repair can be taken to a repair facility which has the equipment to perform major repairs quickly and easily.

By condensing functionality into a single, compact unit, the system achieves a smaller footprint and can be manufactured as a modular unit. This is in contrast to existing EV charging systems which require separately installing a standard DC fast charger plus a container of batteries plus additional control gear, occupying more space and requiring complex integration. The modular system herein described is space-efficient and can be scaled by deploying multiple units in parallel at the same location or as a network of remote units at different locations.

In some embodiments, within the overall system module some or all of the system's major components are built as a field-replaceable module. In these embodiments, the field-replaceable modules may include the master control unit, the source selection PDU, the charging PDUs, the dispenser equipment, the flywheel power smoothing system, the backup battery system, the grid interface comprising an AC/DC converter, the generator controller, and other major system components. Making the major system components modular within the overall modular system simplifies field repair and increases uptime, as each modular system component can simply be swapped out onsite in the event of failure. This contrasts with some prior integrated systems that required full replacement if one part failed. The combination of portability (the entire modular system can be relocated if needed, as it is not permanently tied into infrastructure) and quick installation (simply drop the modular system in place and connect to an existing power feed from the grid) is a practical improvement that reduces costs by up to 90% for grid upgrades and site work.

In some embodiments, protection devices are built into the system to ensure safe operation. This includes input AC circuit breakers or fuses, DC fuses for battery and vehicle connections, surge protection devices, and ground fault detectors. These protective components may be arranged modularly so that if a fuse blows or a component wears out, the whole system doesn't go down, but only certain power levels are lost. Further, the protection devices may be designed to be field serviceable through access panels on the exterior of the system's enclosure. Use of field-serviceable or field-replaceable modules allows for safety-critical components like fuses, relays, contactors, and even power modules to be field-accessible and even hot-swappable in some configurations. In some embodiments, serviceability and field safety are improved by providing front-facing fuse panels with clear labeling and color-coded indicators allow fast visual diagnostics, physical separation of high-voltage and control circuits to reduce risk of arc flash or inadvertent shorts during service, interlock mechanisms and real-time diagnostics via software to ensure that only the correct module is accessed and that dangerous voltages are automatically discharged before touch, and ground fault protection, protective earth bonding, and electronic current limiting to ensure user safety even during bi-directional operation.

Fully Multi-Directional Power Routing Architecture: Unlike conventional setups that might use a separate EV charger unit, a separate battery storage system, and a separate inverter for grid services, the system described herein combines all functions into one integrated modular unit. This unified architecture simplifies deployment and ensures all components work in concert by design. Prior art battery-integrated chargers exist, but they function only to boost charging and not to provide full V2G and V2V capabilities with internal coordination. By having a common DC bus and control for grid, battery, and multiple EV connections, the system described herein can natively support energy flows between any ports. This feature acting as a multi-port bi-directional energy router is an improvement over existing EV charging systems which are limited to one in/out power routing pathway at a time. Integration also brings a compact form factor (e.g., containerized) that can be delivered to a site and activated in weeks, as opposed to lengthy construction.

The fully multi-directional power routing architecture operates by actively managing solid-state or relay-based switching between inputs and outputs, depending on the power requirements and power quality requirements at the time of switching. Instead of just selecting between two power sources (e.g., charging from the grid or charging from a battery), multi-directional power routing architecture described herein can route power from one EV to another, or simultaneously manage energy transfer multi-directionally across multiple terminals, with active voltage and current regulation. Instead of simply switching between grid and generator, the system described herein dynamically manages multiple concurrent sources and sinks: grid, battery, and multiple EVs. Safety and anti-islanding logic are incorporated directly into this system and managed by a master control unit. Thus, instead of having an automatic transfer switch acting as a static failover switch like in existing EV charging systems, the system described herein is a real-time, programmable energy router with multi-directional power routing.

The fully multi-directional power routing architecture allows for implementation of sophisticated power routing operations, both within a single modular EV charging station and among multiple, connected modular EV charging stations. The multi-directional power routing architecture allows for a multiplicity of power routing options including, but not limited to, grid-to-EV charging, EV-to-grid power routing, grid-to-battery charging, battery-to-grid power routing, battery-to-EV charging, EV-to-battery charging, EV-to-EV charging, and combinations of the above including power routing among and between multiple sources and destinations (grid, batteries, EVs, flywheels). The integrated nature of the modular EV charging station with its multi-directional power routing architecture enables power to flow in multiple directions simultaneously (e.g., grid↔battery↔vehicle↔vehicle B) without compromising power quality, safety, or modularity. One application of the multi-directional power routing architecture is to provide buffered DC power even while power switching occurs by providing power from a secondary source such as the charging station battery or flywheel (if used). Another use is to provide buffered V2G or V2V power without impacting power quality. For example, in V2G situations, unbuffered power can cause grid destabilization issues. This occurs particularly during power switching and connection/disconnection of EVs for charging. Grid destabilization can be prevented by using a backup battery system or flywheel system as a power quality buffer by smoothing the power flow such that the grid never directly "sees" the variability of EVs or their disconnection/reconnection behavior. The fully multi-directional power routing architecture supports simultaneous charging of a plurality of vehicles, discharging from one to the other (V2V), and grid export/import—all orchestrated via internal DC bus routing and software-defined logic.

Some embodiments enable energy to flow from an EV's battery back to the grid or to another EV. Some embodiments support simultaneous multi-input and multi-output flows, meaning one EV can discharge energy while another EV charges, and/or the grid connection exchanges power at the same time. For example, during peak demand the unit can draw energy from an EV (or its own battery) to support the grid and/or to monetize the power expended by the EV in support of the grid at peak demand, and minutes later recharge that EV when demand drops—all managed by the system. This V2G/V2V functionality is managed without impacting power quality on either the grid or vehicle side, thanks to the coordinated control and buffering. This actively-managed V2G capability combined with revenue-grade metering allows for optimization of EV charging costs, providing power when grid pricing is high and charging when grid pricing is low. In some instances, this actively-managed V2G capability could actually result in net income for the owners of EVs charging their EVs using this system.

The ability to handle simultaneous V2G and V2V and G2V operations marks a notable advancement over the prior art. Prior art EV charging systems handle one mode at a time (charge cars from grid, or discharge one car to grid, etc.). The system described herein, by contrast, can charge one vehicle from the grid while discharging a second vehicle to the grid or to the first vehicle, all under the supervision of a single master control unit. The logical separation of these power streams within a single modular EV charging system is novel. It allows for scenarios like energy trading between vehicles or providing community power while still charging a vehicle—use cases that were not possible with existing single-purpose chargers. This multi-input, multi-output flexibility is enabled by the custom power electronics design and control software, which is an inventive step beyond existing charging station capabilities.

Power Quality Preservation via Internal Buffering: In some embodiments, the system will comprise on-board energy storage systems such as a backup battery system and/or a flywheel power smoothing system. These energy storage systems act as local energy buffers or reservoirs. During V2G discharge, connection, and disconnection, these can smooth out any rapid transients—absorbing surges or injecting power quickly—to ensure that the output to the grid is stable and clean (preventing flicker, harmonic distortion, or voltage sag). Likewise, when charging EVs, the battery system can supplement a weak grid connection, delivering high power to the EV while drawing steadier, lower power from the grid. This internal buffering preserves power quality and prevents destabilizing the local grid even in capacity-constrained areas. It also allows the system to continue providing power to vehicles or critical loads during brief grid disturbances, enhancing reliability. In some embodiments, the system may use a flywheel power smoothing system either in place of the backup battery system or in addition to the backup battery system. As described herein, flywheels can provide a very smooth power source for relatively short periods of time, making them highly useful for power smoothing applications during power switching, connection/disconnection, and other events that cause rapid transients. The inclusion of one or more of these on-board energy storage systems and the control strategy to use them as a buffer is a distinctive improvement over existing EV charging stations. Existing V2G implementations face issues with rapid changes in output as vehicle inverters ramp up or down, potentially causing grid disturbances. The system described herein solves this problem by buffering those changes through the backup battery system. Essentially, the grid "sees" a well-behaved resource (the system's buffered inverter) even if underlying sources (e.g., EVs connected to the system) are variable. Using the backup battery system as a power quality conditioner is an innovative approach to guaranteeing that bi-directional G2V or V2G interaction does not harm grid stability. Additionally, it means the system can provide ancillary services like frequency regulation or voltage support immediately on command, using the backup battery system or flywheel power smoothing system to respond faster than an EV alone could.

Bi-Directional AC/DC Grid Interface between the System and the Electrical Grid with Enhanced Safety in Bi-Directional Grid Operations: Some embodiments contain power electronics that convert between AC (grid power) and DC, and are fully bi-directional. This allows the system to both import power from the grid (for charging vehicles or the backup battery system) and export power back to the grid (drawing from EV batteries or the backup battery system). The AC/DC converter of the grid interface is designed for high power (e.g. 350 kW) fast charging and is capable of operating in reverse as a grid-tied inverter for V2G functionality. Bidirectional charging introduces new safety challenges (e.g., preventing backfeed during faults, coordinating multiple energy sources). The comprehensive safety framework (fast disconnects, ground monitoring, isolation, etc.) and intelligent fault handling of the system described herein is an improvement over the prior art. Many existing V2G pilot systems rely on the vehicle's onboard inverter (which is small and limited) or on retrofitting bidirectionality to existing chargers, possibly lacking some protective features. The system described herein was engineered from the ground up to regularly export power. The result is a robust system that can be trusted for unattended operation providing critical services (including emergency power). The system's ability to operate as a microgrid in isolation if needed is an added reliability benefit. If the grid goes down, it can continue to power vehicles or local loads.

Depending on configuration, the system may support a plurality of charging outputs, allowing a plurality of vehicles to be charged simultaneously. In some embodiments described herein, the system supports two simultaneous DC fast-charge outputs, effectively functioning as two charging stations in one modular unit. These embodiments support charging of two EVs at the same time at full or split power, depending on available energy. For instance, the unit might allocate up to its full power (e.g. 350 kW) between two vehicles based on their needs—either evenly or with one vehicle getting a higher rate if the other is tapering. In other embodiments, charging of more than two vehicles may be supported, potentially at a lower rate of charge depending on available power.

Revenue-Grade Metering: In some embodiments, some or all of the power flow paths of the system integrate bi-directional metering hardware compliant with utility revenue-grade standards. Thus, energy flowing in any path having metering (grid import, grid export, energy delivered to each vehicle, etc.) can accurately measured. This enables energy transactions like selling power back to the grid (V2G services) or vehicle-to-vehicle energy transfers to be tracked for billing or crediting purposes. In some embodiments, the meters may be certified, allowing the system to participate in energy markets or utility programs with confidence in the measurements (e.g., net energy metering or demand response settlements).

Multiple DC Voltage Levels with DC Isolation & Protective Earth Bonding: In some embodiments, the system will support a plurality of distinct DC output levels within the same modular enclosure, allowing the system to interface with vehicles or subsystems that operate at different DC voltage ranges simultaneously. For example, the system of these embodiments can charge an EV with a high-voltage battery pack (800V class) on one port while also charging or discharging a second EV with a lower voltage (400V) pack on another port. Some embodiments will have additional DC voltage levels and/or additional charging ports for more vehicles. In some embodiments, isolated DC paths will be maintained for each port, each with its own voltage and current control, providing safety against accidental grounding. This dual-voltage or multi-voltage capability may implemented without requiring a separate EV charging station with a different voltage as the multi-directional power routing architecture allows for multiple voltage levels managed by a master control unit, which can automatically adjust voltage to each vehicle's requirements.

In some embodiments, isolated DC paths will be maintained for each port, each with its own voltage and current control, providing safety against accidental grounding. In some embodiments, the enclosure and all electrical subsystems are robustly bonded to a protective earth ground. This ensures that any fault currents (e.g., due to insulation failure or a short to the enclosure) will safely flow to ground and trigger protective devices, rather than causing a hazard to users. In addition, the system's control checks for proper grounding and will inhibit operation if a reliable ground connection is not detected. This protective earth bonding is especially important in a bi-directional system, because it maintains safety whether the unit is sourcing or sinking power.

Comprehensive Software Integration with Grid Systems: The system described herein not only provides hardware improvements over the prior art but may also utilize software that can interface with utility systems and market signals. While some prior art chargers can do demand response or basic smart charging, the system described herein may utilize software designed to handle real-time optimization (e.g., using artificial-intelligence-based forecasts) and market participation (e.g., via revenue-grade metering and standard interfaces). This is an improvement that makes the system described herein a financially attractive asset—it can earn revenue when idle by aiding the grid, something prior chargers couldn't do. This holistic integration of hardware and software in an EV charging station enables use cases like providing fast frequency response using the battery, shifting an EV charging station site's (or a network of such stations') entire load profile, or arbitraging energy prices, all in one unit. In some embodiments, the software for the master control unit is the multi-agent machine learning (MAML) framework for managing multi-directional battery energy storage systems software described herein in FIGS. 1 through 8 and their related written descriptions.

Smart Software Control and External Coordination: A master control unit (in some embodiments with embedded software or firmware) manages all aspects of operation, from power conversion to user interactions. In some embodiments, the master control unit continuously monitors and manages voltages, currents, temperatures, and the state-of-charge of the backup battery system and connected EVs. The master control unit may enforce limits to prevent overload and executes interlocks (for example, ensuring that if the grid fails, any export stops immediately in compliance with anti-islanding rules). The master control unit may also communicate with external systems, for example to integrate with an Energy Management System (EMS) or utility control center via standard protocols. This allows coordination with grid needs—for example, responding to a demand response signal by feeding power to the grid, or adjusting charging rates based on time-of-use pricing. In some embodiments, the software for the master control unit is the multi-agent machine learning (MAML) framework for managing multi-directional battery energy storage systems software described herein in FIGS. 1 through 8 and their related written descriptions.

In some embodiments, high voltage direct current (HVDC) architectures adapted from computer data centers are used to improve safety, serviceability, and efficiency in EV charging applications. For example, a centralized dual DC bus architecture may be used to minimized power stage count, enabling more efficient routing between sources and loads. A simplified cabling and enclosure layout that mirrors modern server racks may be used to allow rapid installation and maintenance by trained personnel rather than specialized electricians.

Some systems and methods described herein relate generally to the field of battery energy storage systems (BESS), electric vehicle (EV) charging infrastructures, and microgrids. More specifically, disclosed herein is a multi-agent machine learning (MAML) framework for managing multi-directional battery energy storage systems for homes, solar panel installations, EV charging stations, and other similar installations. While not all embodiments are limited to electrical-grid-connected applications, a primary use case is for battery energy storage systems that are connected to the electrical grid, and most of the examples described herein are grid-connected. In an embodiment, the system and method are configured for use in one or more electrical vehicle charging stations.

Battery degradation has been well recognized as a major cost factor in BESS and EV infrastructure due to frequent charge/discharge cycles. Traditional energy optimization systems do not incorporate detailed battery degradation models in real-time decision-making, resulting in suboptimal operational strategies that compromise long-term battery health. Furthermore, backup power management is often handled by siloed controllers, which can be slow to react or may not prioritize battery health and user satisfaction. The systems and methods described herein seek to solve these problems by introducing an integrated, multi-agent system that dynamically optimizes for multiple factors associated with BESS systems, such as energy arbitrage factors, EV charging factors, battery health and management factors, and backup power operations in a grid-connected environment.

Where existing BESS systems perform optimization, they address each environment or subsystem in isolation, leading to potential conflicts in priorities and directives, missed opportunities for complementary operations to increase efficiency, operational decisions detrimental to certain parts of the overall system, and/or to sub-optimal performance of the entire system. The systems and methods disclosed herein integrate the optimization of each environment and/or subsystem to provide a cohesive control solution capable of optimizing management and control of battery energy storage systems in complex and dynamic multi-factor environments. As an example, the systems and methods disclosed herein facilitate optimizing energy arbitrage in real-time and day-ahead energy markets, coordinating EV charging to meet user-defined service level agreements (SLAs), preserving battery health through continual monitoring of degradation parameters and real-time battery management system (BMS) interventions, and ensuring backup power availability, with real-time islanding capabilities when the grid is unstable or offline. This holistic approach provides a significant advancement in the field of distributed energy resource management, maximizing system performance while reducing operational risks and extending battery lifespan.

The DAMAML framework for BESSs coordinates a plurality of software agents operating in their own learning environments to optimize energy arbitrage, preserve battery health, manage charging or power schedules for external devices or systems, and ensure reliable backup power. Each software agent in the DAMAML framework operates in a learning environment comprising data, methods, models, and constraints associated with a particular field, goal, application, or subsystem. This allows each agent to independently optimize the various factors associated with operation of a BESS, while having a coordinator agent optimize the operation of the overall system by resolving conflicts between other agents, provide operational balance, and prevent unsafe or excessive operations that might degrade battery health or compromise system reliability.

In some embodiments, one or more of the machine learning algorithms may be a reinforcement learning algorithm in which rewards are assigned to successful outcomes and/or penalties are assigned to unsuccessful outcomes. In some embodiments, agents may use different types of machine learning algorithms. In some embodiments, a plurality of agents may share the use of a machine learning algorithm.

In an embodiment, the system and method comprise management and control of electric vehicle (EV) charging stations connected multi-directionally to an electrical power grid wherein degradation-aware multi-agent machine learning is used to simultaneously optimize multiple factors in the EV charging station environment including energy arbitrage including real-time pricing, battery health of both the EVs being charged and backup batteries connected to the EV charging stations, charging schedules of EVs, and backup power management provided by the backup batteries connected to the EV charging stations.

In an embodiment, a system for management and control of battery energy storage systems in complex and dynamic multi-factor environments using a degradation-aware multi-agent machine learning framework comprises a central controller which gathers current data about various environments and feeds the data to one or more agents as well as controlling hardware based on directives received from a coordinator agent; a coordinator agent which orchestrates the outputs of one or more agents responsible for evaluating learning environments that affect the system in some way; an energy arbitrage agent configured to optimize market-related factors; an electrical vehicle charging agent configured to optimize charging-related factors; a battery management system agent configured to optimize battery-life-related factors; and a backup power agent configured to optimize backup-power-related factors.

In an embodiment, central controller is responsible for receiving current market data, charging demand data, system telemetry data, and grid status data, and distributing the data to the agents responsible for optimizing that data. Central controller receives instructions from coordinator agent and implements the instructions by operating one or more hardware components. In some embodiments, central controller execution logs and/or other system logs may be used to further improve the central controller over time.

In an embodiment, coordinator agent orchestrates the outputs of one or more agents associated with the various learning environments in which other agents are operating. Coordinator agent receives outputs from energy arbitrage agent, EV scheduling agent, battery management service agent, and backup power agent into its coordinator agent learning environment to ensuring alignment with global system optimization objectives, adjust operational constraints, perform conflict resolution between the other agent outputs, to perform operational balance for the system as a whole. The outputs of coordinator agent are final instructions to central controller for operation of the system hardware. The outputs of coordinator agent are made by applying a machine learning algorithm to a coordinator agent learning environment comprising data such as global system optimization objectives, operational constraints, user satisfaction goals, battery longevity goals, system resilience goals, site energy consumption data, system execution logs, and other system-level or network-level goals, objectives, priorities, constraints, and optimization parameters. The final instructions may be directed at any number of such goals, objectives, priorities, constraints, and optimization parameters which may either be entered into the coordinator agent learning environment or identified by the machine learning algorithm based on data in the coordinator agent learning environment. As an example, coordinator agent and its learning environment may be configured to balance revenue generation, user satisfaction, battery longevity, resolving local grid outages, and system resilience. In some embodiments, coordinator agent execution logs and/or other system logs may be used to further improve the coordinator agent over time).

In an embodiment, an energy arbitrage agent is configured to optimize market-related factors such as market pricing, market pricing trends, charge/discharge/power demand, grid service participation, and the condition of any batteries being charged or discharged, and outputs predictions, recommendations, or both, for market-related factors such as charge/discharge schedules, revenue forecasts, charging costs, and battery constraints. The predictions, recommendations, or both, are made by applying a machine learning algorithm to a battery arbitrage learning environment comprising energy arbitrage data. The predictions, recommendations, or both, may be directed at any number of priorities and optimization parameters which may either be entered into the battery arbitrage learning environment or identified by the machine learning algorithm based on data in the battery arbitrage learning environment. In an embodiment, the energy arbitrage agent is configured to predict one or more preferred times to perform energy arbitrage. For example, energy arbitrage agent may detect a slope-based power price increase and thus recommends to charge the system until a price-based threshold is reached, or to wait to charge the system until the power price is predicted to drop. As one example of power price determination, the energy arbitrage agent may use technical signals that are commonly used in energy commodities trading.

In an embodiment, an electrical vehicle charging agent is configured to optimize charging-related factors such as power allocation schedules for EVs, charging priorities, EV charging demand, queue length, user requirements, and EV battery history & condition, and outputs predictions, recommendations, or both, for charging-related factors such as recommended EV charging schedules, backup battery charging schedules, service level agreements with EV charging station operators, and demand forecasts. The predictions, recommendations, or both, are made by applying a machine learning algorithm to an electric vehicle charging learning environment comprising EV charging data. The predictions, recommendations, or both, may be directed at any number of priorities and optimization parameters which may either be entered into the electric vehicle charging learning environment or identified by the machine learning algorithm based on data in the electric vehicle charging learning environment.

In an embodiment, a battery management system agent is configured to optimize battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. Battery management system outputs predictions, recommendations, or both, for battery life management such as battery degradation forecasts, operational constraints, and thermal management controls. The predictions, recommendations, or both, are made by applying a machine learning algorithm to either a short-term battery physics learning environment comprising data related to short-term battery physics, a long-term battery degradation learning environment comprising data related to long-term battery degradation, or both. The predictions, recommendations, or both, may be directed at any number of priorities and optimization parameters which may either be entered into the short-term battery physics learning environment and long-term battery degradation learning environment or identified by the machine learning algorithm based on data in either or both of those learning environments. As an example, a battery degradation model may be included in either the short-term battery physics learning environment or the long-term battery degradation learning environment to associate each possible system action with metrics such as predicted capacity loss over time, thermal concerns, battery failure probability, etc.

In an embodiment, a backup power agent is configured to optimize backup power factors such as grid status, proactive identification of local grid outages or grid stressor events, grid power transitions, available backup power, backup activations, power allocations, mode transition priorities, critical load thresholds, and outputs predictions, recommendations, or both, for backup power factors such as backup power activation (also called "islanding"), critical load requirements, and backup power capacity and status. The predictions, recommendations, or both, are made by applying a machine learning algorithm to a backup power learning environment comprising backup power data. The predictions, recommendations, or both, may be directed at any number of priorities and optimization parameters which may either be entered into the backup power learning environment or identified by the machine learning algorithm based on data in the backup power learning environment.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

The skilled person will be aware of a range of possible modifications of the various embodiments described herein. Accordingly, the present invention is defined by the claims and their equivalents.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Battery-to-grid," "Storage-battery-to-grid," and "B2G," as used herein mean electrical power routed from a storage battery of an EV charging station to the electrical power grid.

"Battery-to-EV," "Battery-to-vehicle," and "B2V," as used herein mean electrical power routed from a storage battery of an EV charging station to an electric vehicle.

"Degradation-aware multi-agent machine learning" or "DAMAML" as used herein means a machine learning framework wherein a plurality of machine learning agents each optimize factors associated with their own learning environments using one or more machine learning algorithms, and wherein at least one of the machine learning agents optimizes factors associated with battery degradation of a battery being charged.

"Degradation-aware multi-agent reinforcement learning" or "DAMARL" as used herein means a machine learning framework wherein a plurality of machine learning agents each optimize factors associated with their own learning environments using one or more machine learning algorithms, and wherein at least one of the machine learning agents optimizes factors associated with battery degradation of a battery being charged and wherein at least one of the agents uses a reinforcement-type machine learning algorithm in which rewards are assigned to successful outcomes and/or penalties are assigned to unsuccessful outcomes.

"Electric vehicle" and "EV" as used herein mean a vehicle powered by electrical energy stored in a battery.

"EV-to-battery," "vehicle-to-battery," and "V2B," as used herein mean electrical power routed from an electric vehicle to a storage battery of an EV charging station.

"EV-to-EV," "Vehicle-to-vehicle," and "V2V," as used herein mean electrical power routed from one electric vehicle to another electric vehicle.

"EV-to-grid," "Vehicle-to-grid," and "V2G," as used herein mean electrical power routed from an electric vehicle to the electrical power grid.

"Grid" and "electrical grid" as used herein mean a network of electricity generators, cables, and transformers which supply electricity to end users. Electrical grids supply power in the form of alternating current (AC) and are typically, but not always, operated by a private electric utility company regulated by a government and. In some cases, an electrical grid may be a privately-owned and operated electrical grid that supplies electricity to private users (and not to the public).

"Grid-to-EV," "Grid-to-vehicle," and "G2V," as used herein mean electrical power routed from the electrical power grid to an electric vehicle.

"Grid-to-battery," "grid-to-storage-battery," and "G2B," as used herein mean electrical power routed from the electrical power grid a storage battery of an EV charging station.

"Machine learning" or "machine learning algorithm" as used herein is an for artificial intelligence in which the computer system or component can modify its behavior or understanding without being explicitly programmed to do so. Machine learning algorithms excel at finding patterns in complex data or exploring the outcomes of large numbers of potential options. There are three primary categories of machine learning algorithms, supervised machine learning algorithms, unsupervised machine learning algorithms, and reinforcement machine learning algorithms. Supervised machine learning algorithms are trained to recognize patterns by training them with labeled training data. For example, a supervised machine learning algorithm may be fed pictures of oranges with the label "orange" and pictures of basketballs with the label basketball. The supervised machine learning algorithm will identify similarities (e.g., orange color, round shape, bumpy surface texture) and differences (e.g., black lines on basketball, regular dot pattern texture on basketball versus random texture on oranges) among the pictures to teach itself how to properly classify unlabeled pictures input after training. An unsupervised machine learning algorithm learns from the data itself by association, clustering, or dimensionality reduction, rather than having been pre-trained to discriminate between labeled input data. Unsupervised machine learning algorithms are ideal for identifying previously unknown patterns within data. Reinforcement machine learning algorithms learn from repeated iterations of outcomes based on probabilities with successful outcomes being rewarded or unsuccessful outcomes being penalized. Reinforcement machine learning algorithms are ideal for exploring large number of possible outcomes such as possible outcomes from different moves on a chess board.

"Multi-agent machine learning" or "MAML" as used herein means a machine learning framework wherein a plurality of machine learning agents each optimize factors associated with their own learning environments using one or more machine learning algorithms. In the context of battery energy storage systems, a plurality of machine learning agents each optimize factors associated with their own learning environments in battery energy storage system environments such as energy arbitrage, battery health, charging schedules, and backup power.

DETAILED DESCRIPTION OF THE DRAWING FIGURES

FIG. 1 is a block diagram illustrating an exemplary system architecture for a system 100 for management and control of battery energy storage systems in complex and dynamic multi-factor environments using a degradation-aware multi-agent machine learning framework. In this embodiment, system 100 comprises hardware 110 for providing power to external systems and software 120 for controlling the hardware 110. A non-limiting example of external systems to which power may be provided by system 100 is power provided to charge electric vehicles.

Hardware 110 of this embodiment comprises an alternating current to direct current (AC-to-DC) converter 111 for converting alternating current from a power grid to direct current for charging batteries and vice-versa at rates and directions directed by a central controller, a thermal manager 112 for preventing over-temperature conditions in components of the system such as batteries by utilizing thresholds and activating heating/cooling as directed by central controller, an electric vehicle service exchange (EVSE) 113 which manages charging queues and allocates power to EVs connected to the charging system, a battery manager 114 for managing battery usage and degradation as directed by central controller, and an automatic transfer switch 115 for connecting to and disconnecting from the power grid as directed by central controller. Note that not all hardware components of system 100 are shown. Hardware components required to make the described system operational may be assumed by a person of ordinary skill in the art. For example, a backup battery may be assumed from the existence of battery manager 114 but is not shown.

Software 120 of this embodiment comprises a central controller 200 which gathers current data about various environments and feeds the data to one or more agents as well as controlling hardware based on directives received from a coordinator agent; a coordinator agent 300 which orchestrates the outputs of one or more agents responsible for evaluating learning environments that affect the system in some way; an energy arbitrage agent 400 configured to optimize market-related factors; an electrical vehicle charging agent 500 configured to optimize charging-related factors; a battery management system agent 500 configured to optimize battery-life-related factors; and a backup power agent 700 configured to optimize backup-power-related factors.

Central controller 200 of this embodiment is responsible for receiving current market data, charging demand data, system telemetry data, and grid status data, and distributing the data to the agents responsible for optimizing that data. Central controller 200 receives instructions from coordinator agent 300 and implements the instructions by operating one or more hardware 110 components.

Coordinator agent 300 orchestrates the outputs of one or more agents associated with the various learning environments in which other agents are operating. Coordinator agent receives outputs from energy arbitrage agent, EV scheduling agent, battery management service agent, and backup power agent into its coordinator agent learning environment to ensuring alignment with global system optimization objectives, adjust operational constraints, perform conflict resolution between the other agent outputs, to perform operational balance for the system as a whole. The outputs of coordinator agent 300 are final instructions to central controller 200 for operation of the system hardware 110. The outputs of coordinator agent are made by applying a machine learning algorithm to the received inputs from the other agents in conjunction with a coordinator agent learning environment comprising coordination environment data such as global system optimization objectives, operational constraints, user satisfaction goals, battery longevity goals, resolving local grid outages, system resilience goals, and other system-level or network-level goals, objectives, priorities, constraints, and optimization parameters. The final instructions may be directed at any number of such goals, objectives, priorities, constraints, and optimization parameters which may either be entered into the coordinator agent learning environment or identified by the machine learning algorithm based on data in the coordinator agent learning environment. As an example, coordinator agent and its learning environment may be configured to balance revenue generation, user satisfaction, battery longevity, and system resilience.

Energy arbitrage agent 400 of this embodiment is configured to optimize market-related factors. The predictions, recommendations, or both, are made by applying a machine learning algorithm to market-related data received from central controller 200 in conjunction with a battery arbitrage learning environment comprising energy arbitrage environment data such as market pricing, market pricing trends, charge/discharge/power demand, grid service participation, and the condition of any batteries being charged or discharged, and outputs predictions, recommendations, or both, for market-related factors such as charge/discharge schedules, revenue forecasts, charging costs, and battery constraints. The predictions, recommendations, or both, may be directed at any number of priorities and optimization parameters which may either be entered into the battery arbitrage learning environment or identified by the machine learning algorithm based on data in the battery arbitrage learning environment. In an embodiment, the energy arbitrage agent is configured to predict one or more preferred times to perform energy arbitrage. For example, energy arbitrage agent may detect a slope-based power price increase and thus recommends to charge the system until a price-based threshold is reached, or to wait to charge the system until the power price is predicted to drop. As one example of power price determination, the energy arbitrage agent may use technical signals that are commonly used in energy commodities trading.

Electric vehicle charging agent 500 of this embodiment is configured to optimize charging-related factors. The predictions, recommendations, or both, are made by applying a machine learning algorithm to EV charging data received from central controller 200 in conjunction with an electric vehicle charging learning environment comprising EV charging environment data such as power allocation schedules for EVs, charging priorities, EV charging demand, queue length, user requirements, and EV battery history & condition, and outputs predictions, recommendations, or both, for charging-related factors such as recommended EV charging schedules, backup battery charging schedules, service level agreement for EV charging station operators, and demand forecasts. The predictions, recommendations, or both, may be directed at any number of priorities and optimization parameters which may either be entered into the electric vehicle charging learning environment or identified by the machine learning algorithm based on data in the electric vehicle charging learning environment.

Battery management system agent 600 is configured to optimize battery-life-related factors. Battery management system agent 600 outputs predictions, recommendations, or both, for battery life management such as battery degradation forecasts, operational constraints, and thermal management controls. The predictions, recommendations, or both, are made by applying a machine learning algorithm to battery management system environment data. The battery management system environment data may comprise a short-term battery physics learning environment comprising battery management system environment data related to short-term battery physics, a long-term battery degradation learning environment comprising battery management system environment data related to long-term battery degradation, or both. Such battery management system environment data may include such factors as short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. The predictions, recommendations, or both, may be directed at any number of priorities and optimization parameters which may either be entered into the short-term battery physics learning environment and long-term battery degradation learning environment or identified by the machine learning algorithm based on data in the either or both of those learning environments.

Backup power agent 700 of this embodiment is configured to optimize backup power factors. The predictions, recommendations, or both, are made by applying a machine learning algorithm to grid status data in conjunction with a backup power learning environment comprising backup power environment data such as grid status, proactive identification of local grid outages or grid stressor events, grid power transitions, available backup power, backup activations, power allocations, mode transition priorities, critical load thresholds, and outputs predictions, recommendations, or both, for backup power factors such as backup power activation (also called "islanding"), critical load requirements, and backup power capacity and status. The predictions, recommendations, or both, may be directed at any number of priorities and optimization parameters which may either be entered into the backup power learning environment or identified by the machine learning algorithm based on data in the backup power learning environment.

Figure 2:
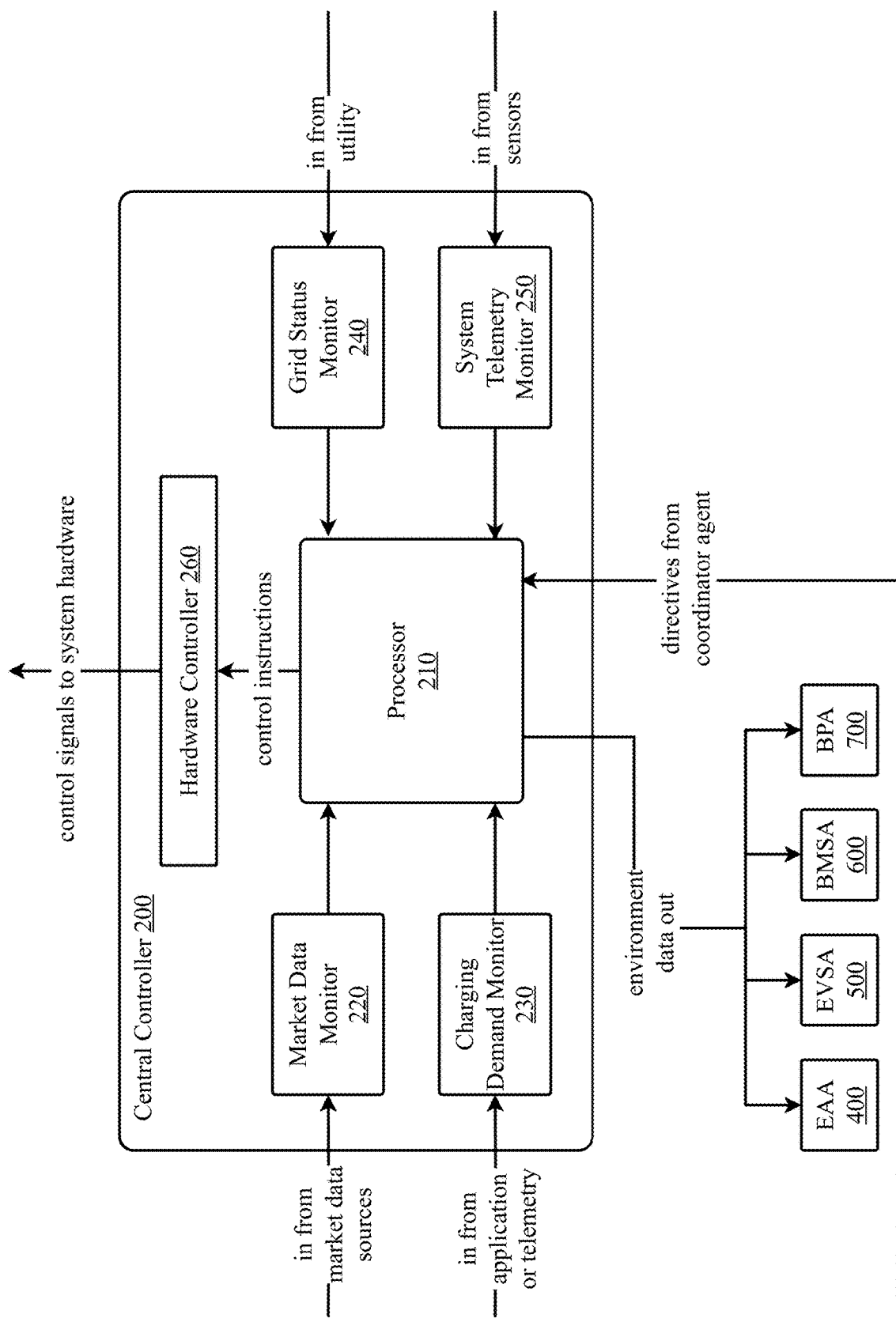
FIG. 2 is a block diagram illustrating a central controller aspect of a system for management and control of battery energy storage systems in complex and dynamic multi-factor environments using a degradation-aware multi-agent machine learning framework.

FIG. 2 is a block diagram illustrating a central controller for a system for management and control of battery energy storage systems in complex and dynamic multi-factor environments using a degradation-aware multi-agent machine learning framework. Central controller 200 of this embodiment is responsible for receiving current market data, charging demand data, system telemetry data, and grid status data, and distributing the data to the agents responsible for optimizing that data. Central controller 200 receives instructions from coordinator agent 300 and implements the instructions by operating one or more hardware 110 components. Central controller 200 of this embodiment comprises a processor 210, a market data monitor 220, a charging demand monitor 230, a grid status monitor 240, a system telemetry monitor 250 and one or more hardware controllers 260.

Processor 210 receives current market data, charging demand data, system telemetry data, and grid status data, and distributing the data to the agents responsible for optimizing that data. In this embodiment, processor 210 forwards the current market data to energy arbitrage agent 400, charging demand data to EV service agent 500, system telemetry data to battery management service agent 600, and grid status data to backup power agent 700.

Market data monitor 220 receives current market data from market data sources such as published utility rates, dynamic pricing rates from utilities, trade publications, utility rate databases, utility rate servers, application programming interfaces (APIs), and similar sources of information. Market data monitor 220 may be an application running on a computer, a web application operating in an Internet browser of a computer, or any suitable similar software capable of connecting to the Internet to obtain current data.

Charging demand monitor 230 receives current charging demand data from data sources such as published charging demand data, real-time charging information from operators of charging stations, trade publications, historical demand databases, application programming interfaces (APIs), and software applications which allow for reservations or scheduling of EV charging (e.g., mobile phone applications with EV charging station reservation capabilities). Charging demand monitor 230 may be an application running on a computer, a web application operating in an Internet browser of a computer, or any suitable similar software capable of connecting to the Internet to obtain current data.

Grid status monitor 240 receives current grid status data either from the utility operating the grid or from data sources such as published information on utility status, trade publications, historical databases, application programming interfaces (APIs), and similar sources of information. Grid status monitor 240 may be an application running on a computer, a web application operating in an Internet browser of a computer, or any suitable similar software capable of connecting to the Internet to obtain current data.

System telemetry monitor 250 receives current hardware status data from sensors attached to or associated with hardware 110 connected to system 100. System telemetry monitor 250 may be a microcontroller directly connected to the sensors, an application running on a computer which receives sensor data wirelessly, a web application operating in an Internet browser of a computer which receives sensor data from a web server, or any suitable similar software or hardware capable of receiving sensor data associated with hardware 110 connected to system 100.

Hardware controllers 260 are devices which control the operation of hardware components 110 of system based on instructions from central controller 200. Examples of hardware controllers are microcontrollers, motor controllers, signal relays, power relays, voltage regulators, and other devices which control the operation of hardware components.

Figure 3:
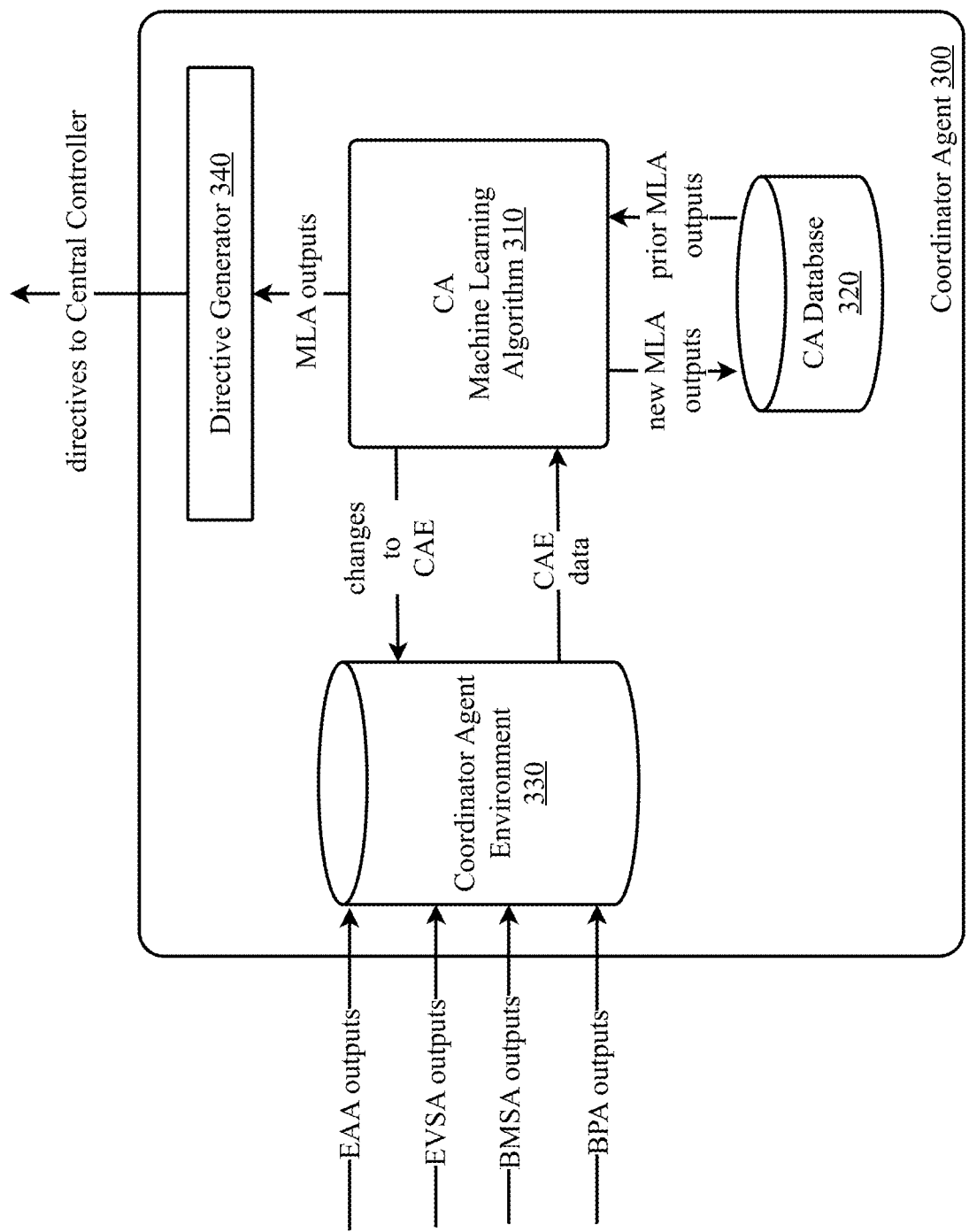
FIG. 3 is a block diagram illustrating a coordinator agent aspect of a system for management and control of battery energy storage systems in complex and dynamic multi-factor environments using a degradation-aware multi-agent machine learning framework.

FIG. 3 is a block diagram illustrating a coordinator agent for a system for management and control of battery energy storage systems in complex and dynamic multi-factor environments using a degradation-aware multi-agent machine learning framework. Coordinator agent 300 orchestrates the outputs of one or more agents associated with the various learning environments in which other agents are operating. Coordinator agent 300 receives outputs from energy arbitrage agent 400, EV scheduling agent 500, battery management service agent 600, and backup power agent 700 into its coordinator agent learning environment to ensuring alignment with global system optimization objectives, adjust operational constraints, perform conflict resolution between the other agent outputs, to perform operational balance for the system as a whole. The outputs of coordinator agent are final instructions to central controller 200 for operation of the system hardware 110.

The outputs of coordinator agent are made by applying a machine learning algorithm to a coordinator agent learning environment comprising data such as global system optimization objectives, operational constraints, user satisfaction goals, battery longevity goals, system resilience goals, site energy consumption data, system execution logs, and other system-level or network-level goals, objectives, priorities, constraints, and optimization parameters. The final instructions may be directed at any number of such goals, objectives, priorities, constraints, and optimization parameters which may either be entered into the coordinator agent learning environment or identified by the machine learning algorithm based on data in the coordinator agent learning environment. As an example, coordinator agent and its learning environment may be configured to balance revenue generation, user satisfaction, battery longevity, and system resilience. In some embodiments, coordinator agent execution logs and/or other system logs may be used to further improve the coordinator agent over time).

Coordinator agent 300 of this embodiment comprises a coordinator agent machine learning algorithm 310, a coordinator agent database 320, a coordinator agent learning environment 330, and a directive generator 340. In other embodiments, coordinator agent may be a different type of decision-making algorithm such as a non-agent-based machine learning algorithm or a simpler rules-based or heuristic decision-making algorithm.

Coordinator agent machine learning algorithm 310 is a machine learning algorithm trained to optimize global system objectives, operational constraints, user satisfaction goals, battery longevity goals, system resilience goals, and other system-level or network-level goals, objectives, priorities, constraints, and optimization parameters. It may do so in part by resolving conflicts between the outputs of other agents, such as energy arbitrage agent 400, EV scheduling agent 500, battery management service agent 600, and backup power agent 700, whose outputs may contain or result in conflicting recommendations. Coordinator agent 300 receives outputs from energy arbitrage agent 400, EV scheduling agent 500, battery management service agent 600, and backup power agent 700 into its coordinator agent learning environment. It applies CA machine learning algorithm 310 to the outputs of the other agents in conjunction with coordinator agent environment 330 by retrieving data from coordinator agent environment 330 and, in some cases, prior outputs from CA machine learning algorithm 310 which may be stored in coordinator agent database 320. Outputs from CA machine learning algorithm 310 are sent to directive generator 340 where they are converted into operating directives for central controller 200 to implement in the hardware 110. Outputs from CA machine learning algorithm 310 may also be used to make changes to coordinator agent environment. For example, if CA machine learning algorithm 310 detects a pattern of recommendations from the other agents that would result in overheating of the system's backup battery, CA machine learning algorithm may change the coordinator agent environment to disallow that pattern of recommendations. Outputs from CA machine learning algorithm 310 may also be stored in CA database 320 for retrieval and application to future analyses by CA machine learning algorithm 310. For example, where an analysis will the same or similar parameters has already been performed, CA machine learning algorithm may simply retrieve and use the previous analysis rather than re-performing the analysis, which can increase the speed and responsiveness of system 100.

Figure 4:
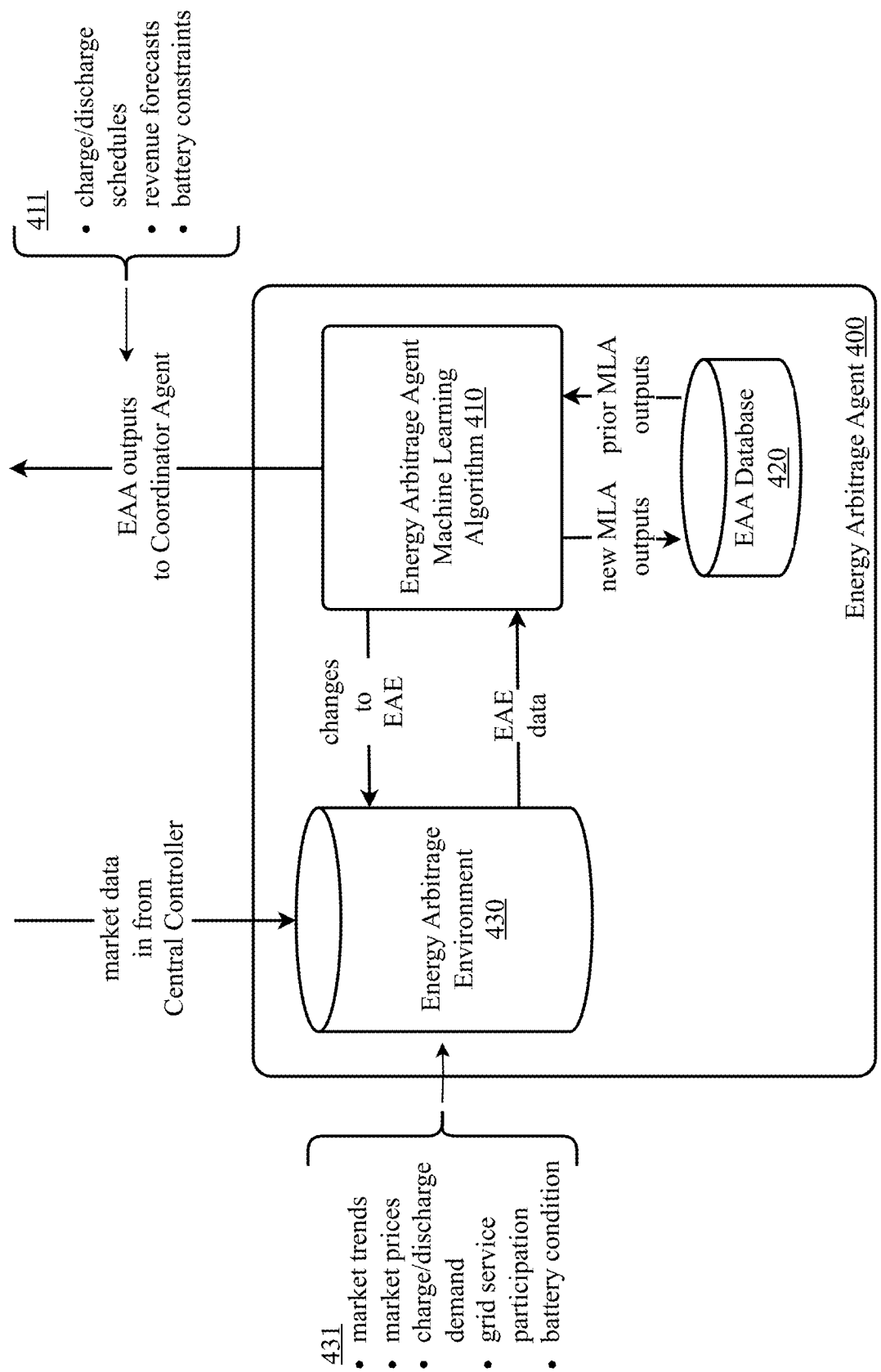
FIG. 4 is a block diagram illustrating an energy arbitrage agent aspect of a system for management and control of battery energy storage systems in complex and dynamic multi-factor environments using a degradation-aware multi-agent machine learning framework.

FIG. 4 is a block diagram illustrating an energy arbitrage agent for a system for management and control of battery energy storage systems in complex and dynamic multi-factor environments using a degradation-aware multi-agent machine learning framework.

In an embodiment, an energy arbitrage agent (EAA) 400 is configured to optimize market-related factors such as market pricing, market pricing trends, charge/discharge/power demand, grid service participation, and the condition of any batteries being charged or discharged, and outputs predictions, recommendations, or both, for market-related factors such as charge/discharge schedules, revenue forecasts, charging costs, and battery constraints. The predictions, recommendations, or both, are made by applying an energy arbitrage agent (EAA) machine learning algorithm 410 to market-related data received from central controller 200 in conjunction with an energy arbitrage agent (EAA) learning environment 430 comprising energy arbitrage data. The predictions, recommendations, or both, may be directed at any number of priorities and optimization parameters which may either be entered into EAA learning environment 430 or identified by the EAA machine learning algorithm 410 based on data in EAA learning environment 430. The outputs of EAA machine learning algorithm 410 may be stored in an energy arbitrage agent (EAA) database 420 for later retrieval.

EAA machine learning algorithm 410 is a machine learning algorithm trained to optimize market-related factors such as market pricing, market pricing trends, charge/discharge/power demand, grid service participation, and the condition of any batteries being charged or discharged, and outputs predictions, recommendations, or both, for market-related factors such as charge/discharge schedules, revenue forecasts, charging costs, and battery constraints. Energy arbitrage agent 400 applies EAA machine learning algorithm 410 to market-related data received from central controller 200 in conjunction with to EAA learning environment 430 by retrieving data from EAA learning environment 430 and, in some cases, prior outputs from EAA machine learning algorithm 410 which may be stored in energy arbitrage agent database 420. Outputs EAA machine learning algorithm 410 are sent to coordinator agent 300 where they are analyzed with outputs from other agents before being converted into operating directives for central controller 200 to implement in the hardware 110. Outputs from EAA machine learning algorithm 410 may also be used to make changes to EAA environment 420. For example, if EAA machine learning algorithm 410 detects a pattern of data in EAA environment 420 that would result in catastrophic failure to meet charging demands, EAA learning algorithm 410 may change EAA environment 430 to disregard that pattern of data. Outputs from EAA machine learning algorithm 410 may also be stored in energy arbitrage agent (EAA) database 420 for retrieval and application to future analyses by EAA machine learning algorithm 410. For example, where an analysis will the same or similar parameters has already been performed, EAA machine learning algorithm 410 may simply retrieve and use the previous analysis rather than re-performing the analysis, which can increase the speed and responsiveness of system 100.

Figure 5:
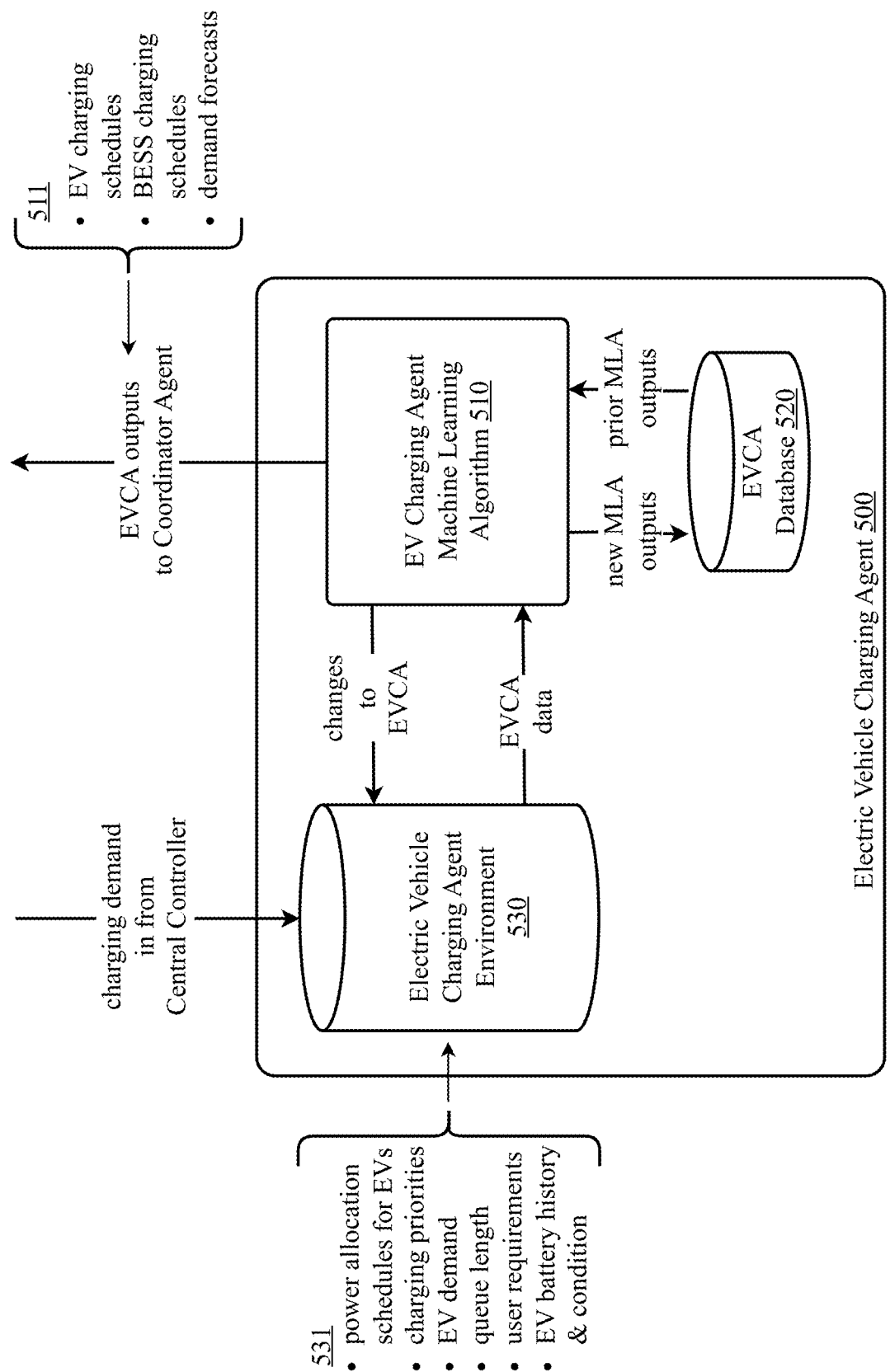
FIG. 5 is a block diagram illustrating an electric vehicle charging agent aspect of a system for management and control of battery energy storage systems in complex and dynamic multi-factor environments using a degradation-aware multi-agent machine learning framework.

FIG. 5 is a block diagram illustrating an electric vehicle charging agent for a system for management and control of battery energy storage systems in complex and dynamic multi-factor environments using a degradation-aware multi-agent machine learning framework.

Electrical vehicle charging agent (EVCA) 500 of this embodiment is configured to optimize charging-related factors such as power allocation schedules for electric vehicles (EVs), charging priorities, EV charging demand, queue length, user requirements, and EV battery history & condition, and outputs predictions, recommendations, or both, for charging-related factors such as recommended EV charging schedules, backup battery charging schedules, and demand forecasts. The predictions, recommendations, or both, are made by applying an electric vehicle charging agent (EVCA) machine learning algorithm 510 to EV charging data received from central controller 200 in conjunction with an electric vehicle charging agent (EVCA) learning environment 530 comprising EV charging data. The predictions, recommendations, or both, may be directed at any number of priorities and optimization parameters which may either be entered into EVCA learning environment 530 or identified by the EVCA machine learning algorithm 510 based on data in the EVCA learning environment 530. The outputs of EVCA machine learning algorithm 410 may be stored in an electric vehicle charging agent (EVCA) database 420 for later retrieval.

EVCA machine learning algorithm 510 is a machine learning algorithm trained to optimize charging-related factors such as power allocation schedules for electric vehicles (EVs), charging priorities, EV charging demand, queue length, user requirements, and EV battery history & condition, and outputs predictions, recommendations, or both, for charging-related factors such as recommended EV charging schedules, backup battery charging schedules, and demand forecasts. Electric vehicle charging agent 500 applies EVCA machine learning algorithm 510 to EV charging data received from central controller 200 in conjunction with EVCA learning environment 530 by retrieving data from EVCA learning environment 530 and, in some cases, prior outputs from EVCA machine learning algorithm 510 which may be stored in EVCA database 520. Outputs of EVCA machine learning algorithm 510 are sent to coordinator agent 300 where they are analyzed with outputs from other agents before being converted into operating directives for central controller 200 to implement in the hardware 110. Outputs from EVCA machine learning algorithm 510 may also be used to make changes to EVCA environment 520. For example, if EVCA machine learning algorithm 510 detects a pattern of data in EVCA environment 520 that would result in overcharging of a particular type of electric vehicle, EVCA learning algorithm 510 may change EVCA environment 530 to disregard that pattern of data. Outputs from EVCA machine learning algorithm 510 may also be stored in EVCA database 520 for retrieval and application to future analyses by EVCA machine learning algorithm 510. For example, where an analysis will the same or similar parameters has already been performed, EVCA machine learning algorithm 510 may simply retrieve and use the previous analysis rather than re-performing the analysis, which can increase the speed and responsiveness of system 100.

Figure 6:
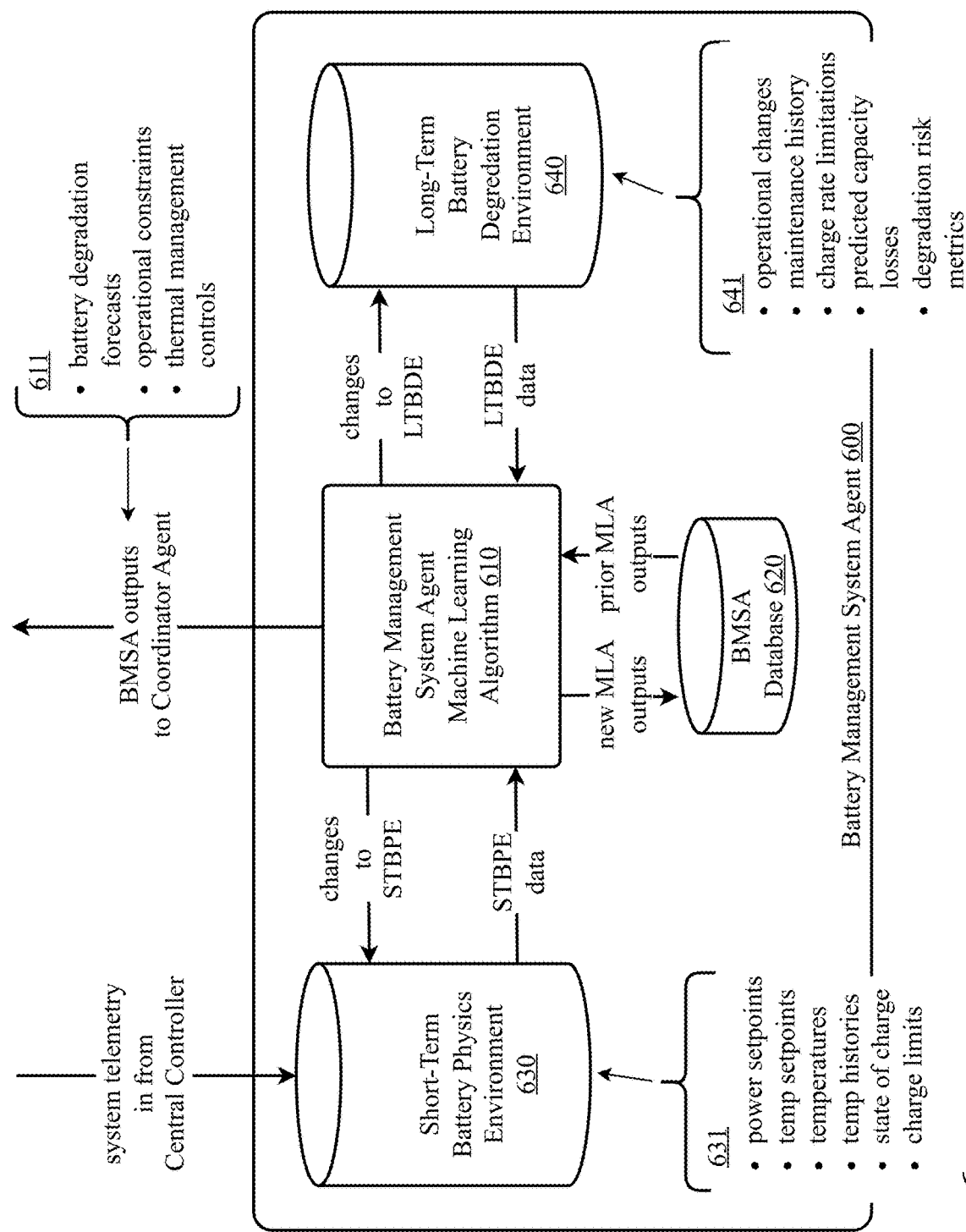
FIG. 6 is a block diagram illustrating a battery management system agent aspect of a system for management and control of battery energy storage systems in complex and dynamic multi-factor environments using a degradation-aware multi-agent machine learning framework.

FIG. 6 is a block diagram illustrating a battery management system agent for a system for management and control of battery energy storage systems in complex and dynamic multi-factor environments using a degradation-aware multi-agent machine learning framework.

Battery management system agent (BMSA) 600 of this embodiment is configured to optimize battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. Battery management system agent 600 outputs predictions, recommendations, or both, for battery life management such as battery degradation forecasts, operational constraints, and thermal management controls. The predictions, recommendations, or both, are made by applying a battery management system agent (BMSA) machine learning algorithm 610 to system telemetry data received from central controller 200 in conjunction with either a short-term battery physics learning environment (STBPE) 630 comprising data related to short-term battery physics, a long-term battery degradation learning environment (LTBDE) 640 comprising data related to long-term battery degradation, or both. The predictions, recommendations, or both, may be directed at any number of priorities and optimization parameters which may either be entered into the short-term battery physics learning environment and long-term battery degradation learning environment or identified by BMSA machine learning algorithm 610 based on data in the either or both of those learning environments 630, 640. The outputs of BMSA machine learning algorithm 610 may be stored in a battery management system agent (BMSA) database 620 for later retrieval.

BMSA machine learning algorithm 610 is a machine learning algorithm trained to optimize battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. Electric vehicle charging agent 600 applies BMSA machine learning algorithm 610 to system telemetry data received from central controller 200 in conjunction with BMSA learning environment 630 by retrieving data from BMSA learning environment 630 and, in some cases, prior outputs from BMSA machine learning algorithm 610 which may be stored in BMSA database 620. Outputs of BMSA machine learning algorithm 610 are sent to coordinator agent 300 where they are analyzed with outputs from other agents before being converted into operating directives for central controller 200 to implement in the hardware 110. Outputs from BMSA machine learning algorithm 610 may also be used to make changes to BMSA environment 620. For example, if BMSA machine learning algorithm 610 detects a pattern of data in BMSA environment 620 that would result in overcharging of a particular type of electric vehicle, BMSA learning algorithm 610 may change BMSA environment 630 to disregard that pattern of data. Outputs from BMSA machine learning algorithm 610 may also be stored in BMSA database 620 for retrieval and application to future analyses by BMSA machine learning algorithm 610. For example, where an analysis will the same or similar parameters has already been performed, BMSA machine learning algorithm 610 may simply retrieve and use the previous analysis rather than re-performing the analysis, which can increase the speed and responsiveness of system 100.

Figure 7:
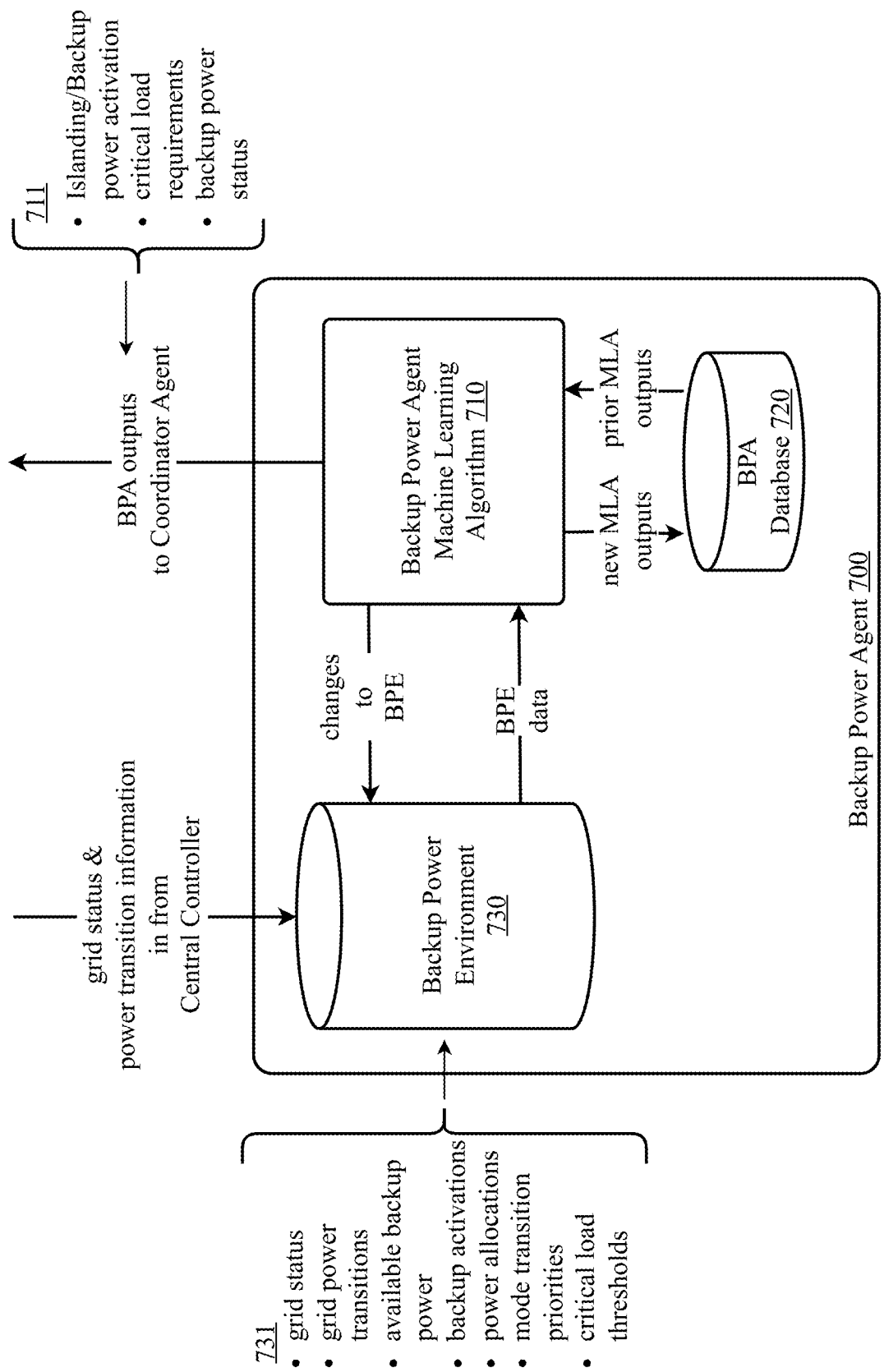
FIG. 7 is a block diagram illustrating a backup power agent aspect of a system for management and control of battery energy storage systems in complex and dynamic multi-factor environments using a degradation-aware multi-agent machine learning framework.

FIG. 7 is a block diagram illustrating a backup power agent for a system for management and control of battery energy storage systems in complex and dynamic multi-factor environments using a degradation-aware multi-agent machine learning framework.

Backup power agent (BPA) 700 is configured to optimize backup power factors such as grid status, grid power transitions, available backup power, backup activations, power allocations, mode transition priorities, critical load thresholds, and outputs predictions, recommendations, or both, for backup power factors such as backup power activation (also called "islanding"), critical load requirements, and backup power capacity and status. The predictions, recommendations, or both, are made by applying a backup power agent (BPA) machine learning algorithm 710 to grid status data received from central controller 200 in conjunction with a backup power agent (BPA) learning environment 730 comprising backup power data. The predictions, recommendations, or both, may be directed at any number of priorities and optimization parameters which may either be entered into BPA learning environment 730 or identified by the BPA machine learning algorithm 710 based on data in the backup power learning environment. The outputs of BPA machine learning algorithm 710 may be stored in a backup power agent (BPA) database 620 for later retrieval.

BPA machine learning algorithm 610 is a machine learning algorithm trained to optimize battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. Electric vehicle charging agent 600 applies BPA machine learning algorithm 610 to grid status data received from central controller 200 in conjunction with BPA learning environment 630 by retrieving data from BPA learning environment 630 and, in some cases, prior outputs from BPA machine learning algorithm 610 which may be stored in BPA database 620. Outputs of BPA machine learning algorithm 610 are sent to coordinator agent 300 where they are analyzed with outputs from other agents before being converted into operating directives for central controller 200 to implement in the hardware 110. Outputs from BPA machine learning algorithm 610 may also be used to make changes to BPA environment 620. For example, if BPA machine learning algorithm 610 detects a pattern of data in BPA environment 620 that would result in overcharging of a particular type of electric vehicle, BPA learning algorithm 610 may change BPA environment 630 to disregard that pattern of data. Outputs from BPA machine learning algorithm 610 may also be stored in BPA database 620 for retrieval and application to future analyses by BPA machine learning algorithm 610. For example, where an analysis will the same or similar parameters has already been performed, BPA machine learning algorithm 610 may simply retrieve and use the previous analysis rather than re-performing the analysis, which can increase the speed and responsiveness of system 100.

Figure 8:
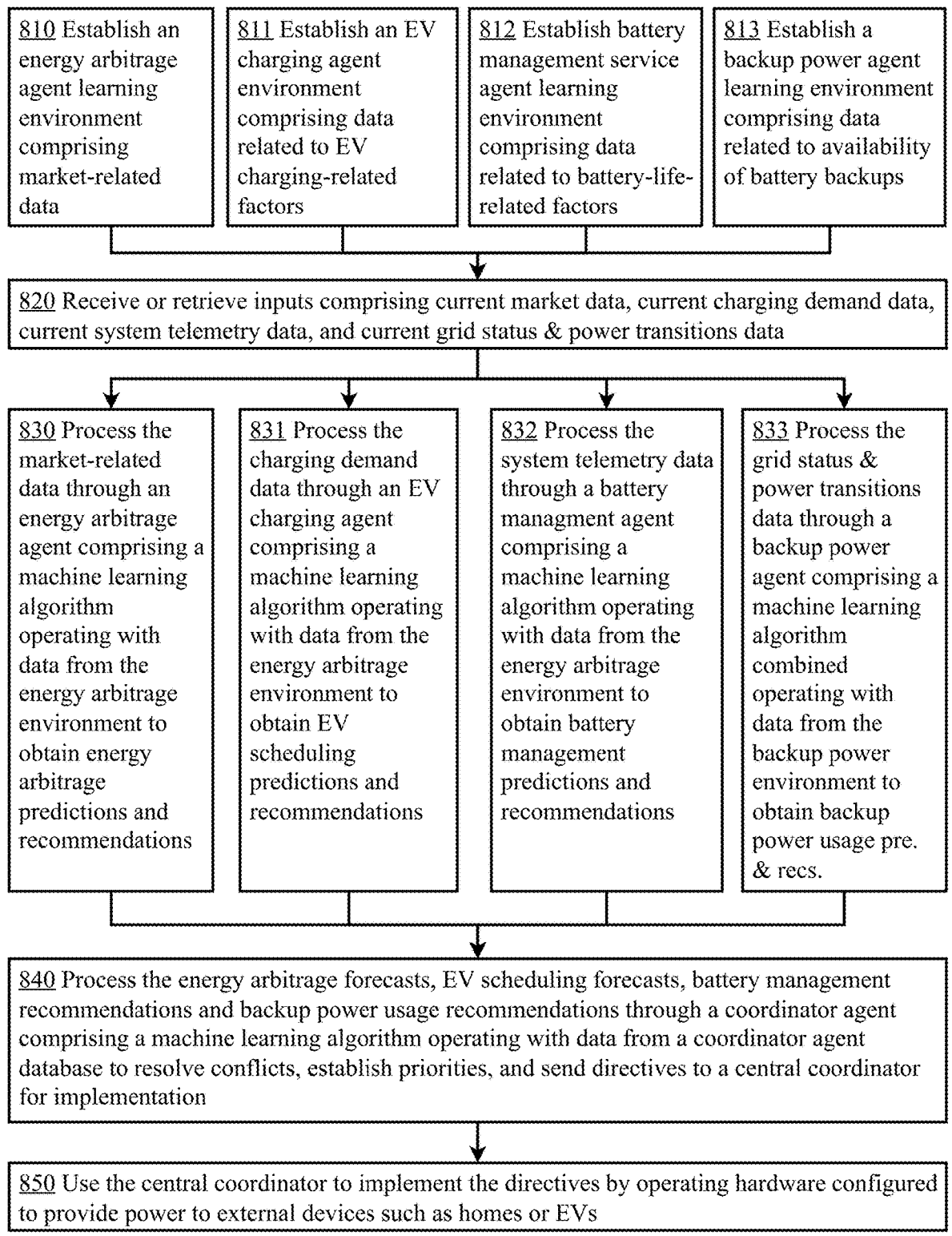
FIG. 8 is a flow diagram illustrating an exemplary method for management and control of battery energy storage systems in complex and dynamic multi-factor environments using a degradation-aware multi-agent machine learning framework.

FIG. 8 is a flow diagram illustrating an exemplary method 800 for management and control of battery energy storage systems in complex and dynamic multi-factor environments using a degradation-aware multi-agent machine learning framework.

At step 810, an energy arbitrage agent learning environment is established comprising energy arbitrage data related to market-related factors such as market pricing, market pricing trends, charge/discharge/power demand, grid service participation, and the condition of any batteries being charged or discharged. The energy arbitrage agent learning environment may be, for example, that described for EAA learning environment 430. At step 811, an EV charging agent learning environment is established comprising EV charging data related to charging-related factors such as power allocation schedules for EVs, charging priorities, EV charging demand, queue length, user requirements, and EV battery history & condition. The EV charging agent learning environment may be, for example, that described for EVCA learning environment 530. At step 812, a battery management service agent learning environment is established comprising battery management service data related to battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. The battery management service agent learning environment may be, for example, that described for BMSA learning environment 630. At step 813, a backup power agent learning environment is established comprising backup power data related to backup power factors such as grid status, grid power transitions, available backup power, backup activations, power allocations, mode transition priorities, critical load thresholds.

The backup power agent learning environment may be, for example, that described for BPA learning environment 730.

At step 820, inputs are received or retrieved comprising current market data, current charging demand data, current system telemetry data, and current grid status & power transitions data. The receipt and retrieval may be performed by, for example, central coordinator 200.

At step 830, the market-related data is processed through an energy arbitrage agent by applying a machine learning algorithm to market-related data in conjunction with the established energy arbitrage agent learning environment to obtain energy arbitrage predictions, recommendations, or both, for optimizing the market-related factors such as charge/discharge schedules, revenue forecasts, charging costs, and battery constraints, as further described for energy arbitrage agent 400. At step 831, the EV charging-related data is processed through an EV charging agent by applying a machine learning algorithm to the EV charging data in conjunction with the established EV charging agent learning environment to obtain predictions, recommendations, or both, for charging-related factors such as recommended EV charging schedules, backup battery charging schedules, and demand forecasts, as further described for EV charging agent 500. At step 832, the battery life data is processed through a battery management service agent by applying a machine learning algorithm to the battery life data in conjunction with the established battery management service agent learning environment to obtain predictions, recommendations, or both, for battery life management such as battery degradation forecasts, operational constraints, and thermal management controls, as further described for battery management service agent 600. At step 833, the backup power data is processed through a backup power agent by applying a machine learning algorithm to the backup power data in conjunction with the established backup power agent learning environment to obtain predictions, recommendations, or both, for backup power factors such as backup power activation (also called "islanding"), critical load requirements, and backup power capacity and status, as further described for backup power agent 700.

At step 840, the predictions, recommendations, or both, for energy arbitrage, EV scheduling, battery management, and backup power are processed through a coordinator agent comprising a machine learning algorithm operating with data from a coordinator agent database to resolve conflicts, establish priorities, and send directives to a central coordinator for implementation central controller is responsible for receiving current market data, charging demand data, system telemetry data, and grid status data, and distributing the data to the agents responsible for optimizing that data, all as further described for coordinator agent 300.

Central controller receives instructions from coordinator agent and implements the instructions by operating one or more hardware components as further described for central controller 200.

Figure 9:
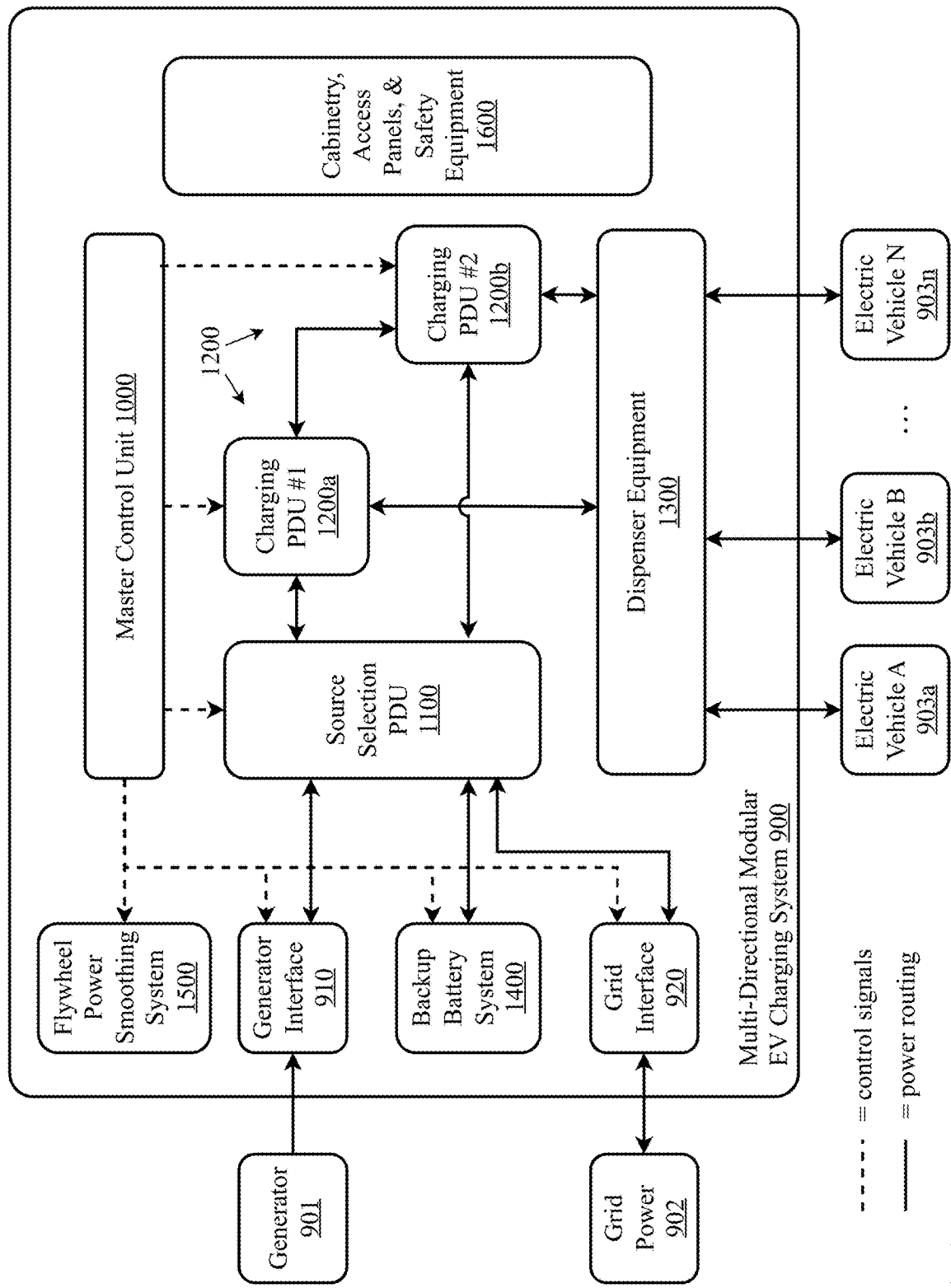
FIG. 9 is a block diagram showing an exemplary overall system architecture for a modular, multi-directional, smart EV charging station.

FIG. 9 is a block diagram showing an exemplary overall system architecture for a modular, multi-directional, smart EV charging station. The system 900 of this embodiment comprises a control system comprising both hardware controllers like as digital signal processors (DSPs) or microcontroller-based control boards for real-time power electronics control) and higher-level software controls for energy management. On the hardware side, each power conversion stage (AC/DC inverter, each DC/DC converter for the EV ports, and the battery interface) has an independent control board that handles fast inner-loop controls (current and voltage regulation, PWM signals to transistors, etc.). These controllers communicate over a high-speed internal network with a master control unit 1000 that coordinates their actions. The master control unit 1000 runs the supervisory software that decides power flow priorities and modes. For instance, if the system is set to charge vehicles from the grid 902, the master control unit 1000 commands the grid interface 920 to draw a certain limit of power from AC, and the DC/DC converters (not shown) to regulate each EV's 903a-n charging profile according to the vehicle's request (typically via standard protocols like CCS's PLC communications or CHAdeMO signals). If a command is received to provide grid 902 support (e.g., frequency regulation), the master control unit 1000 can direct the grid interface 920 to either absorb or supply a certain wattage to the grid 902, drawing on the backup battery system 1400 or adjusting vehicle charge rates accordingly.

The system 900 allows for multi-directional power routing allows for operation in a variety of modes, some examples of which may include: G2V mode, V2G mode, V2V mode, backup (island) mode, and idle/maintenance mode, among others. In G2V mode, the logic ensures the EV battery stays within safe limits while possibly shaving peak draw from the grid to avoid exceeding a certain demand threshold. In V2G mode, if an EV has opted to discharge, the logic will manage the power output to the grid, ramping it smoothly to avoid step changes. For each mode, the master control unit 1000 monitors power quality parameters in real time; if any distortion or instability is detected, it can adjust converter operation (e.g., engage filtering algorithms, or momentarily use the battery to inject counteracting currents)

to maintain quality. The master control unit 1000 may also comprise safety interlocks, verifying that all converters agree on the direction of power flow and that no subsystem is overloaded. If an EV suddenly stops discharging (e.g., if a user unplugs the EV), the master control unit 1000 instantly senses the change and adjusts the AC/grid converter 920 to avoid transients. Similarly, if the grid 902 signals an emergency (like a blackout or frequency out-of-range), the master control unit 1000 can disconnect from grid in <100 ms and either stop all outputs or transition to an islanded backup mode using the backup battery system 1400.

Through all these modes, the master control unit 1000 ensures physical and logical separation of different power streams as needed. Physically, each power path (grid, each EV, battery) has its own converters and protection, so energy only goes where it's intended. Logically, control algorithms in the master control unit 1000 keep track of where each joule of energy should be going—for instance, preventing a situation where two sources unintentionally drive the DC bus at the same time in conflict. This separation and management is an improvement over the prior art that allows the system to behave flexibly like a "power router" while avoiding cross-coupling issues or instability.

External communication protocols allow the system to communicate with the Internet, the grid 902, other connected (or remote) modules, and EVs 903*a-n*. Standard EV charging communication protocols allow the system to communicate with EVs for DC fast charging (e.g., protocols like ISO 15118/DIN 70121 for CCS, or CHAdeMO for compatibility). This allows the system to handshake and agree on charging or discharging parameters with each connected EV. For grid/utility communication, the system may support protocols such as OCPP (Open Charge Point Protocol) for network integration, and possibly DER protocols like IEEE 2030.5 or direct utility SCADA links for demand response signals. Via Internet communication protocols, the system can receive price signals or load requests from an external energy management system. The system may be configured to make autonomous decisions as well—for example, using AI-based forecasting of local load or renewable generation to decide the optimal times to charge the backup battery system 1400 or discharge it.

As previously explained, the fully multi-directional power routing architecture is a significant improvement over the prior art for EV charging systems. The system's multi-directional power routing architecture allows for operation in a variety of power routing modes, some examples of which include: G2V, V2G, V2V, G2B, and combinations of these modes.

G2V is the standard EV charging mode and all existing EV charging stations are capable of operating in this mode. The grid supplies AC power to the system 900, which is converted to DC and fed into one or more EV's 903*a-n* batteries.

G2B is another operating mode. Some existing EV charging systems are capable of charging a backup battery, but none in a modular arrangement as described herein.

In an exemplary combined G2V plus G2B mode, the backup battery system 1400 can play two roles. If the grid is strong and energy is cheap, the control might also charge the backup battery system while charging the vehicles (effectively treating the backup battery system 1400 as another "vehicle" to charge). Alternately, if the grid connection has limited capacity or if multiple cars are charging, the battery can discharge to supplement the grid's charging of EVs (preventing overload of the grid connection). A fast charge (e.g., 350 kW) may be supplied to an EV, yet the grid 902 may only see a steady 50 kW draw if the backup battery system 1400 is supplying the remainder. This mode requires coordination by the master control unit to not exceed the grid import limit set for the site, which the master control unit enforces. The system ensures that each EV receives the appropriate DC voltage and current as requested by the vehicle's Battery Management System (BMS), adjusts outputs to the backup battery system and each EV independently. Charging can be fast (in the dual charging PDU embodiment described herein, up 350 kW total), giving a typical EV a large amount of range in minutes.

In an exemplary V2G mode, one or more EVs 903*a-n* act as power sources, sending energy from their batteries back into the grid 902. This might occur during peak grid demand or as part of a frequency regulation service. The system 900 will ramp up the AC output in sync with grid frequency and voltage, effectively acting like a small power plant injecting power. The backup battery system 1400 again ensures that the power exported is smooth—if an EV's output fluctuates or if it disconnects, the backup battery system 1400 can instantaneously fill the gap so the grid doesn't see an abrupt change. A revenue-grade metering system may record exactly how much energy was sent to the grid 902 from each source (each EV or backup battery system) for potential compensation. Anti-islanding protection may also be used wherein the system 900 monitors grid 902 health and will cease V2G export immediately if the grid 902 goes down (to prevent unsafe backfeeding). Additionally, power quality conditioning may be used in this mode wherein an inverter is operated to provide reactive power or harmonic compensation as needed. Power quality conditioning may be used internally within the system, regulating local voltage by absorbing/injecting reactive power to or from the backup battery system 1400.

V2V mode involves one vehicle discharging its battery to provide energy to another vehicle, facilitated by the system. In one exemplary scenario, an EV B 903*a* is plugged into a first port A, and an EV A 903*b* is plugged into a second port B. EV B's 903*a* owner wants to share/sell energy to EV A 903*b* (or EV2 is low on charge and grid is unavailable or expensive). The system would set EV B's 903*a* DC/DC converter to discharge mode, pulling energy from EV B's 903*a* battery onto a DC bus. Simultaneously, it sets EV A's 903*b* converter to charge mode, drawing from the DC bus to charge EV A 902*b*. The backup battery system 1400 can be used here as a buffer if necessary—for example, smoothing the ramp-up of current or even temporarily storing some of EV1's 903*a* energy if EV2's 903*b* request is lower. Essentially, the PDU mediates the transfer to ensure correct voltage levels and that both vehicles operate within their allowed parameters. V2V could happen concurrently with grid interaction; for instance, if EV B 903*a* is sending energy to EV A 903*b*, the grid converter might stay neutral or could even assist if EV A 903*b* needs more power than EV B 903*a* alone can provide (topping up from grid/battery). All this is handled automatically by the power flow controller. This capability can be useful in fleet scenarios or emergency situations where one vehicle can help charge another.

In G2B and B2G modes, the system can function as a stationary battery energy storage system (BESS) for the grid. In G2B mode, when there are no vehicles charging (or even if there are, if capacity allows), the system can absorb excess renewable energy B2G mode, it can discharge stored energy to support the grid 902 or a local facility. This essentially turns the system into a distributed energy resource or a node in a virtual power plant, particularly where a plurality of modular EV charging stations are connected in a network (whether locally or remotely). The control logic for this is similar to V2G, except it draws from the backup battery system instead of the EV. From the grid's perspective, it sees a controllable battery power system that can respond to commands. This mode can operate overnight or in between vehicle charging sessions, ensuring the battery is kept at optimal levels for either grid support or to be ready to assist with the next EV fast charge.

The modular, multi-directional EV charging station 900 of this embodiment comprises a master control unit 1000; a source selection power distribution unit (SS PDU) 1100; two charging power distribution units (charging PDUs) 1200; dispenser equipment 1300 for connecting to EVs for charging; four power sources (some of which may act both as sources and sinks such as the flywheel and battery), a flywheel power smoothing system 1500, a generator interface 910 (which will be connected to an external generator 901 in actual usage), a backup battery system 1400, and grid interface 920 comprising an AC/DC converter (which will be connected to the electrical grid 902 in actual usage); and cabinetry, access panels, and safety equipment 1600.

The master control unit 1000 of this embodiment (in some embodiments with embedded software or firmware) manages operation of the system, monitoring and managing voltages, currents, temperatures, multi-directional power routing, the state-of-charge of the backup battery system, connected EVs, and other aspects of system operation. The master control unit 1000 may enforce limits to prevent overload and may execute interlocks (for example, ensuring that if the grid fails, any export stops immediately in compliance with anti-islanding rules). The master control unit 1000 may also communicate with external systems, for example to integrate with an Energy Management System (EMS) or utility control center via standard protocols. This allows coordination with grid needs—for example, responding to a demand response signal by feeding power to the grid, or adjusting charging rates based on time-of-use pricing. In some embodiments, the software for the master control unit 1000 is the multi-agent machine learning (MAML) framework for managing multi-directional battery energy storage systems software described herein in FIGS. 1 through 8 and their related written descriptions.

In addition to controlling internal system operations, the master control unit 1000 may also utilize software that can interface with utility systems and market signals. While some prior art chargers can do demand response or basic smart charging, the system described herein may utilize software designed to handle real-time optimization (e.g., using artificial-intelligence-based forecasts) and market participation (e.g., via revenue-grade metering and standard interfaces). This is an improvement that makes the system described herein a financially attractive asset—it can earn revenue when idle by aiding the grid, something prior chargers couldn't do. This holistic integration of hardware and software in an EV charging station enables use cases like providing fast frequency response using the battery, shifting an EV charging station site's (or a network of such stations') entire load profile, or arbitraging energy prices, all in one unit. In some embodiments, the software for the master control unit is the multi-agent machine learning (MAML) framework for managing multi-directional battery energy storage systems software described herein in FIGS. 1 through 8 and their related written descriptions.

The source selection power distribution unit (SS PDU) 1100 controls power routing between a plurality of power sources and one or more charging power distribution units (charging PDUs) 1200. In this embodiment, there are four power sources: a flywheel power smoothing system 1500, a generator interface 910 (which will be connected to an external generator 901 in actual usage), a backup battery system 1400, and grid interface 920 comprising a grid interface 920 comprising an AC/DC converter (which will be connected to the electrical grid 902 in actual usage), but in other embodiments there may be fewer power sources (e.g., grid power and battery power only) or more power sources (e.g., the ones shown plus additional generators). The flywheel power smoothing system 1500, backup battery system 1400, and grid interface 920 connected to the grid 902 can act as both power sources (when expending stored energy) and as power sinks (when storing energy from another of the power sources). In this embodiment, there are two charging PDUs, charging PDU B 1200*a* and charging PDU A 1200*b*, but in other embodiments there may be more of fewer charging PDUs. In operation, the source selection power distribution unit (SS PDU) 1100 receives power routing instructions from the master control unit 1000 and routes power between the power sources/sinks and the charging PDUs 1200 by operating a plurality of solid state switches and/or physical relays, depending on the power source, the current required, and the power quality requirements. The SS PDU 1100 may have internal algorithms programmed into its hardware, firmware, or a microcontroller to determine the optimal operation of the solid state switches and/or physical relays.

The SS PDU 1100 comprises a high-voltage DC bus (HVDC bus) 1130 to which all power sources and the charging PDUs 1200 are connected. This DC bus is a central node to which the backup battery system pack and the EV charger PDU 1200 outputs are connected. In this design, the high-voltage DC bus 1130 might operate around a nominal voltage (for example, ~800 V DC) suitable for directly interfacing with the battery and providing headroom for DC-DC converters to step down to various EV battery voltages. The HVDC bus 1130 is equipped with proper bus bars, contactors, and fuses. During operation, the HVDC bus 1130 allows energy to flow between any connected element: the grid 902 (via grid interface 920), the backup battery system 1400 (via DC/DC converter or battery management system (BMS) interface), and the EV charging PDUs 1200, and other sources and sinks such as the flywheel power smoothing system 1500 and the generator 901 (via the generator interface 910). The SS PDU/s 1100 switching logic controller 1110 actively manages the DC bus voltage and ensures it remains stable (with help from the backup battery system 1400 acting as a buffer). By having a common HVDC bus 1130, the system 900 achieves a multi-port power distribution topology: power from one source can be redirected to any load, limited only by converter capacities and control logic. For example, if one EV is discharging (V2G/V2V mode), the HVDC bus 1130 will be driven by that EV's DC/DC converter and/or the battery, and the AC/DC converter can push excess power to the grid or to the other EV's charger. This configuration is what enables simultaneous multi-directional flows within the single unit.

The connection between the SS PDU 1100 and the grid 902 has to meet utility standards for interconnection. This means the SS PDU 1100 will have protection relays or equivalent functions to detect out-of-range conditions (over/under voltage, over/under frequency, etc.) and disconnect from the grid 902 in those events. The SS PDU 1100 manages these functions in coordination with the master control unit 1000 integrates these protective functions in software and hardware—for instance, the SS PDU 1100 might use the inverter's measurements to detect an islanding condition (loss of mains) and then open the main AC contactor, notifying the master control unit of the islanding condition so that the master control unit 1000 can instruct the SS PDU 1100 to route power from other sources (e.g., the backup battery system 1400). In some embodiments, there may also be an integrated automatic transfer switch if the system provides backup power to a site, to isolate the site from the grid during an outage.

The charging power distribution units (charging PDUs) 1200 operate in a similar manner to the SS PDU 1100, except that they each control power between the SS PDU 1100 and single EV. Use of multiple charging PDUs 1200 allows for multiple voltage levels within the system 900. For example, EV A 903*a* can be charged at 800V while EV B 903*b* can be simultaneously charged at 400V. In this example, there are two charging PDUs 1200*a,b*, but in other embodiments, more or fewer charging PDUs could be used.

The dispenser equipment 1300 for connecting to EVs for charging utilizes industry standard connectors to allow connection to EVs. As there are many different connectors for EVs, the connectors of the dispenser equipment may be interchangeable or swappable so that a large variety of types of EVs can be charged using the system 900. The dispenser equipment 1300 will have one or more EV charging ports, each EV charging port comprising power cables and connectors/couplers for attaching the charging system of an EV. In some embodiments, each EV charging port includes safety mechanisms whereby each port can be individually rendered safe and isolated in the event of a fault without disabling the entire system, the safety mechanisms comprising: a contactor or relay that isolates the port when no vehicle is connected; a ground fault detection circuit that trips upon detection of leakage current; and an over-current protection devices which shuts off power in the event of over-current detection.

The flywheel power smoothing system 1500 is an energy storage system that stores energy in the form of spinning flywheels. Each flywheel has an electric motor attached to it which, when powered, spins the flywheel up to a predetermined maximum speed for storage of kinetic energy. When used as an energy source, the motor acts as a generator, converting the kinetic energy of the flywheel into electrical energy. Flywheels can produce very smooth DC power almost instantaneously, making them ideal for power smoothing operations during power switching or connection/disconnection of EVs which would otherwise produce substantial transients in the power supply. Flywheels do lose power quickly, so are not ideal for sustained power output.

The generator interface 910 of this embodiment is used to control an external fuel-powered (e.g., gasoline or diesel-powered) generator 901 connected to the system. The generator 901 provides power to the system in much the same way as the grid 902 provides power to the system. In the case of the generator 901, the power provided is uni-directional as the generator 901 cannot receive power. Generators can produce either AC or DC power. Where the generator produces AC power, the system will further comprise an AC/DC converter in the power path of the generator 901 similar to the AC/DC converter of the grid interface 920 in the power path of the electrical grid 902.

The backup battery system 1400 is an energy storage system that stores energy in the form of electrical energy in one or more batteries. The battery or batteries may be in the form of battery packs comprising a plurality of batteries connected in series, or in parallel, or both. Each battery may comprise one or more battery cells which may be connected in series, or in parallel, or both. The backup battery system 1400 of this embodiment is a large lithium-ion battery bank (or other advanced chemistry) is housed inside the modular system 900. The backup battery system 1400 may comprise multiple modules, for example, many smaller battery packs wired in series/parallel to achieve the desired voltage and capacity, each configured to be easily and separately replaceable. The battery management system (BMS) for the backup battery system 1400 (or for each smaller battery pack if designed modularly) is integrated with the master control unit 1000, providing telemetry like state-of-charge, cell voltages, and temperatures. The backup battery system connects to the SS PDU 1100, either directly if the pack voltage is naturally within the bus operating range, or through its own bi-directional DC/DC converter if finer control of battery charge/discharge is needed (this depends on system design; a direct connection would be simpler and rely on the AC/DC to manage bus voltage, whereas a DC/DC for the battery gives extra control, e.g., allowing the battery to be at a lower voltage than the bus and step up when discharging).

The backup battery system 1400 can perform several roles in the system, depending on system needs. It can provide sole power to charge EVs, supplement grid power where grid power is insufficient or expensive, provide power smoothing during switching, provide backup power to internal systems (e.g., safety systems in the event that grid power goes out), and power external systems such as lights. Ideally, the backup battery system 1400 will have a capacity of several hundred kWh, sufficient to charge a few EVs without using grid power, plus some left over for ancilliary functions such as powering internal safety equipment. The use of the backup battery system 1400 will be directed by the master control unit.

One primary use of the backup battery system is for energy storage. If the grid is strong and energy is cheap, for example, the master control unit 1000 might also charge the backup battery system 1400 while charging the vehicles (effectively treating the backup battery system 1400 as another "vehicle" to charge). Alternately, if the grid 902 connection has limited capacity or if multiple cars are charging, the backup battery system 1400 can discharge to supplement the grid's 902 charging of EVs (preventing overload of the grid 902 connection). A fast charge (e.g., 350 kW) may be supplied to an EV, yet the grid 902 may only see a steady 50 kW draw if the backup battery system 1400 is supplying the remainder. This mode requires coordination by the master control unit 1000 so as not to exceed the grid 902 import limit set for the site, which the master control unit enforces. The system 900 ensures that each EV receives the appropriate DC voltage and current as requested by the vehicle's Battery Management System (BMS), adjusts outputs to the backup battery system 1400 and each EV independently. Charging can be fast (in the dual charging PDU 1200 embodiment described herein, up 350 kW total), giving a typical EV a large amount of range in minutes.

If grid power 902 becomes unavailable, the system 900 can also operate in an island mode to provide backup power to local loads. For example, if installed at a depot or a building, the system 902 can disconnect from the dead grid and use its backup battery system 1400 (and even EVs that choose to participate) to supply emergency power to critical circuits. In this mode, the AC/DC converter can act as a local AC grid if such capability is required (acting as a grid-forming inverter). Protective earth and neutral bonding inside the unit would be configured appropriately when islanded for safety. Thus, the same hardware can be reconfigured via software to handle off-grid scenarios, further ensuring that V2G functionality doesn't compromise the ability to maintain stable voltage/frequency when grid is absent.

Another primary use of the backup battery system is for power smoothing (also known as power quality conditioning). In V2G mode, one or more EVs 903*a-n* act as power sources, sending energy from their batteries back into the grid 902. The system 900 will ramp up the AC output in sync with grid frequency and voltage, effectively acting like a small power plant injecting power. The backup battery system 1400 can be used to ensure that the power exported to the grid is smooth. If an EV's output fluctuates or if it disconnects, the backup battery system 1400 can instantaneously fill the gap so the grid doesn't see an abrupt change. Additionally, power quality conditioning may be used in this mode wherein an inverter is operated to provide reactive power or harmonic compensation as needed. Power quality conditioning may be used internally within the system, regulating local voltage by absorbing/injecting reactive power to or from the backup battery system 1400.

In some embodiments, the backup battery system may be directly connected to the high-voltage DC bus of the source-selection PDU 1100 or another DC bus such that the backup battery system automatically absorbs transient power surges or supplies transient power deficits on the DC bus to maintain the connected DC bus at a stable voltage during fluctuations in load or power generation. This direct connection of the backup battery system may be through one or more DC-to-DC converters. For example, if the backup battery system operates at a nominal 800V, it may still be "directly" attached to a 400V DC bus via a DC-to-DC converter and still automatically absorb transient power surges or supplies transient power deficits on the DC bus to maintain the connected DC bus at a stable voltage during fluctuations in load or power generation The grid interface 902 has an AC input that is connected to the electrical grid 902 and a grid interface 920 comprising an AC/DC converter that converts alternating current (AC) from the grid 902 to direct current (DC) for use within the system 900. The type of AC input will depend on the local installation (e.g., it could be three-phase, 480 V AC, or medium-voltage via a transformer, depending on the installation). This connection may go through an isolation transformer (if needed for voltage matching or isolation) and into a bidirectional grid interface 920. There may be a main AC breaker or contactor for safety isolation from the grid, which the SS PDU 1100 can open in case of faults or when the unit goes offline. The bi-directional grid interface 920 (also known as a grid-tie converter) is grid-synchronized and compliant with appropriate industry standards (like IEEE 1547 for interconnection), capable of both drawing power from the grid to charge EVs and injecting power into the grid with tight control of power factor and harmonics by using the backup battery system 1400 for power smoothing. The grid interface 920 may support "zero-export" modes if required (ensuring no backfeed to grid 902 unless commanded). The grid interface 920 includes metering current transformers (CTs) and/or potential transformers (PTs) feeding the revenue-grade meters to track energy and perhaps a power quality meter to measure total harmonic distortion (THD), voltage, frequency, etc., for system use.

The grid import/export is managed to avoid compromise of power quality on the utility side. The grid interface 920 is capable of maintaining a near-unity power factor or a commanded power factor, and injecting minimal harmonics—effectively, it acts as a current-source inverter following a reference set by the master control unit 1000. The presence of the backup battery system allows the grid 902 interface to ramp its power smoothly. For example, if the grid 902 dispatches a signal to go from 0 to 100 kW export (V2G), the system 900 can begin injecting from the backup battery system 1400 immediately while coordinating any EV contributions, making the transition smooth. Without a backup battery system 1400, if one tried to push power from just an EV, the EV's response might be slower or less controlled, potentially causing a flicker. In the system described herein, the backup battery system 1400 and the grid interface 920 act as a buffer and a high-quality power source, respectively. This ensures compliance with grid standards for flicker (voltage change) and harmonic distortion (often IEEE 519 limits).

The cabinetry, access panels, and safety equipment 1600 comprise the remainder of the modular EV charging system. The entire system 900 of this embodiment is housed in a single enclosure configured as a replaceable modular unit. Subsystems of the system 900 may also be designed in modular fashion. For example, if the backup battery system 1400 comprises a plurality of battery packs connected together to form a single, high-capacity, high-voltage battery, each of the battery packs may be designed as modular units, easily accessible from an access panel to facilitate field replacement without having the replace the entire backup battery system 1400. To the extent possible, all major system components (e.g., backup battery system 1400, flywheel power smoothing system 1500, master control unit 1000, SS PDU 1200, charging PDUs 1200) and minor system components (e.g., fuses, circuit breakers, dispenser equipment, etc.) are designed as replaceable modular units accessible through access panels on the outside of the enclosure. Safety equipment such as automatically-locking access panel doors, automatic shut-off switches for open doors, etc., are installed to prevent accidents.

In some embodiments, the system is housed in a single, modular enclosure and further comprises an internal cooling system and protective earth grounding whereby the system is made modular and transportable, requiring only an electrical grid connection to function and providing a plug-and-play installation for bi-directional charging of the EV or supply of power to the electrical grid from the EV.

Figure 10:
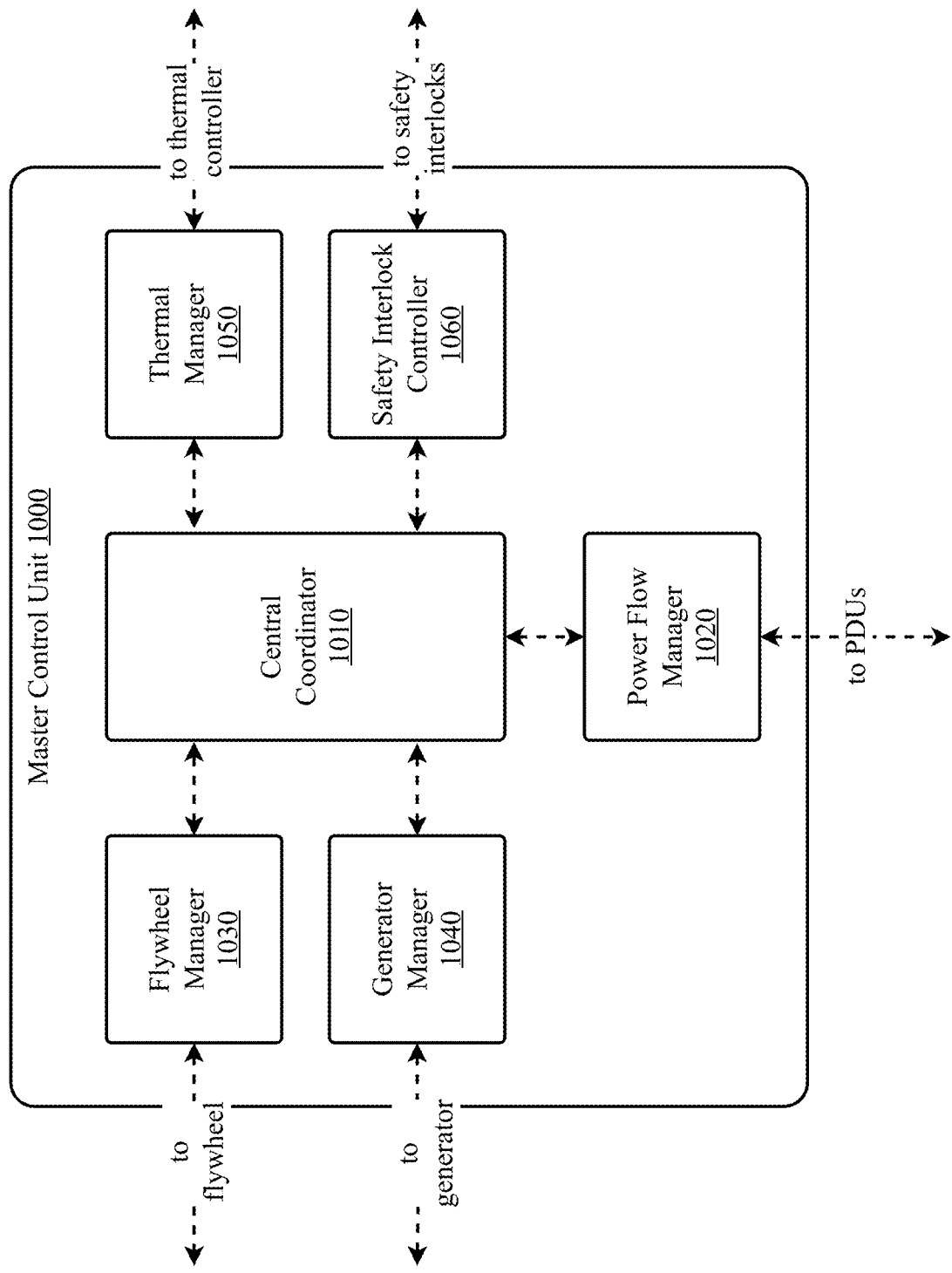
FIG. 10 is a block diagram showing an exemplary master control unit for a modular, multi-directional, smart EV charging station.

FIG. 10 is a block diagram showing an exemplary master control unit for a modular, multi-directional, smart EV charging station. The master control unit 1000 of this embodiment (in some embodiments with embedded software or firmware) manages operation of the system, monitoring and managing voltages, currents, temperatures, multi-directional power routing, the state-of-charge of the backup battery system, connected EVs, and other aspects of system operation. The master control unit 1000 may enforce limits to prevent overload and may execute interlocks (for example, ensuring that if the grid fails, any export stops immediately in compliance with anti-islanding rules). The master control unit 1000 may also communicate with external systems, for example to integrate with an Energy Management System (EMS) or utility control center via standard protocols. This allows coordination with grid needs—for example, responding to a demand response signal by feeding power to the grid, or adjusting charging rates based on time-of-use pricing. In some embodiments, the software for the master control unit 1000 is the multi-agent machine learning (MAML) framework for managing multi-directional battery energy storage systems software described herein in FIGS. 1 through 8 and their related written descriptions.

In addition to controlling internal system operations, the master control unit 1000 may also utilize software that can interface with utility systems and market signals. While some prior art chargers can do demand response or basic smart charging, the system described herein may utilize software designed to handle real-time optimization (e.g., using artificial-intelligence-based forecasts) and market participation (e.g., via revenue-grade metering and standard interfaces). This is an improvement that makes the system described herein a financially attractive asset—it can earn revenue when idle by aiding the grid, something prior chargers couldn't do. This holistic integration of hardware and software in an EV charging station enables use cases like providing fast frequency response using the battery, shifting an EV charging station site's (or a network of such stations') entire load profile, or arbitraging energy prices, all in one unit. In some embodiments, the software for the master control unit is the multi-agent machine learning (MAML) framework for managing multi-directional battery energy storage systems software described herein in FIGS. 1 through 8 and their related written descriptions.

The master control unit 1000 of this embodiment comprises a central coordinator 1010, a power flow manager 1020, a flywheel manager 1030, a generator manager 1040, a thermal manager 1050, and a safety interlock controller 1060.

The central coordinator 1010 is a programmable computer or microcontroller that provides the primary operating logic for the system. It may be programmed to direct the overall operation of the system, managing power flows for optimal utilization of sources and sinks depending on the current conditions of each of the sources and sinks and other factors such as states of charge of connected EVs, priorities of charging of EVS (e.g., where an owner urgently needs a charge and asks for charging priority which may be done through a user interface at the dispenser equipment 1300, or where an owner has indicated a desire to sell power from his or her EV at peak grid power prices), market rates for grid power at any given time, etc. For example, where grid power 902 is abundant, it may be used to both charge EVs and the backup battery system. Where grid power is not available or the draw limit of grid power for that particular installation has been reached, power may be routed from the backup battery system 1400 for usage. Where the price of grid power is high, owners of connected EVs may choose to sell power to the grid.

The power flow manager 1020 directs the SS PDU 1100 and charging PDUs 1200 to re-route power according to the logic determined by the central coordinator 1010.

The flywheel manager 1030 determines the state of the flywheel(s) of the flywheel power smoothing system 1500 via system telemetry and instructs the SS PDU 1100 via the power flow manager 1020 to either provide power to or draw power from the flywheel power smoothing system 1500.

The generator manager 1040 determines the state of the generator 1040 via system telemetry and instructs the SS PDU 1100 via the power flow manager 1020 to either provide power to or draw power from the generator 1040.

The thermal manager 1050 determines the thermal state of the power sources, busses, and other power transfer equipment via system telemetry and instructs the SS PDU 1100 via the power flow manager 1020 to reduce power to or from such equipment if the equipment temperature rises above certain thresholds.

The safety interlock controller 1060 determines the state of fuses, circuit breakers, access panel doors, and other safety equipment via system telemetry and operates the safety interlocks to prevent access to malfunctioning or dangerous equipment.

Figure 11:
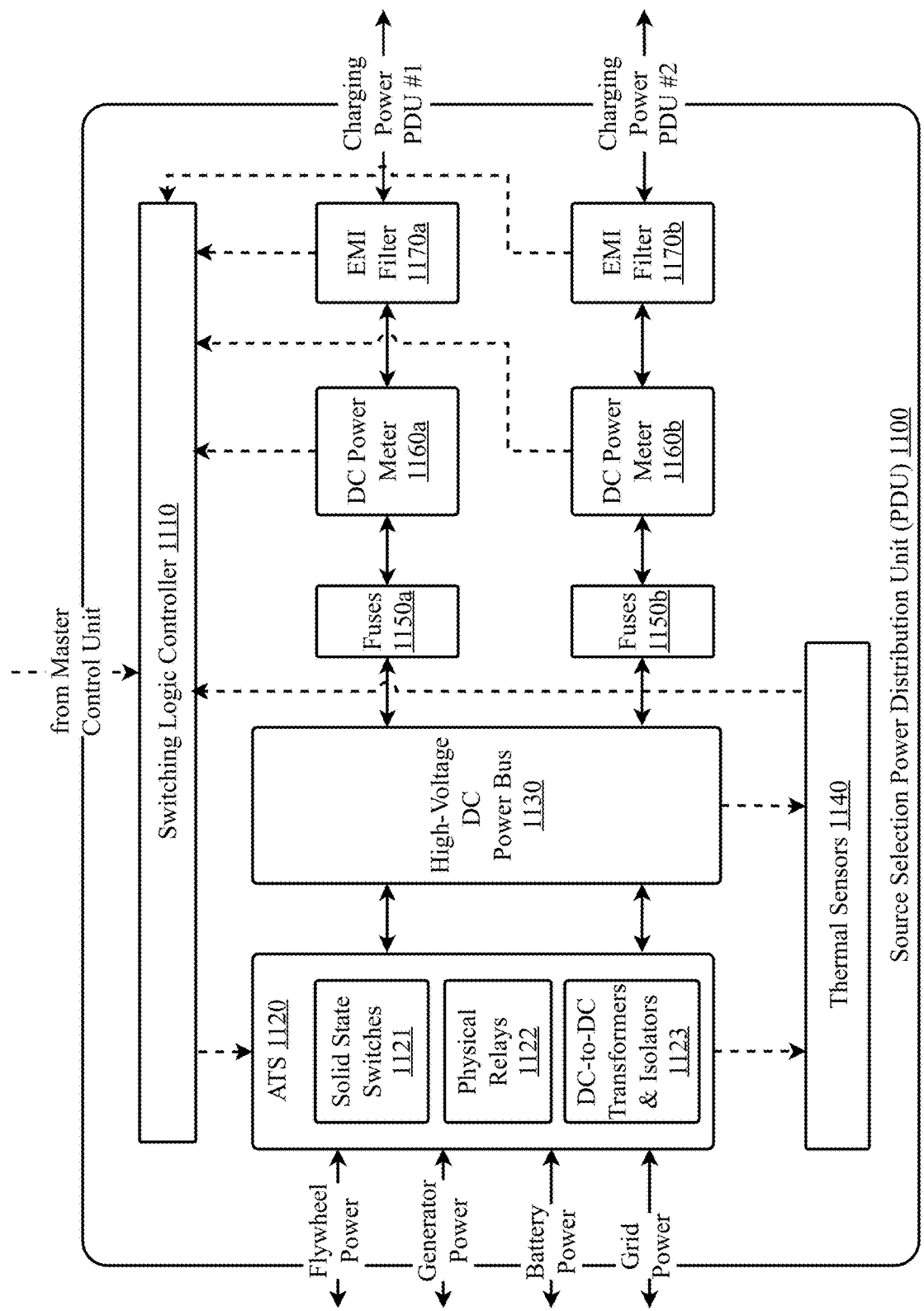
FIG. 11 is a block diagram showing an exemplary source selection power distribution unit for a modular, multi-directional, smart EV charging station.

FIG. 11 is a block diagram showing an exemplary source selection power distribution unit for a modular, multi-directional, smart EV charging station. The source selection power distribution unit (SS PDU) 1100 controls power routing between a plurality of power sources and one or more charging power distribution units (charging PDUs) 1200. In this embodiment, there are four power sources: a flywheel power smoothing system 1500, a generator interface 910 (which will be connected to an external generator 901 in actual usage), a backup battery system 1400, and a grid interface 920 comprising an AC/DC converter (which will be connected to the electrical grid 902 in actual usage), but in other embodiments there may be fewer power sources (e.g., grid power and battery power only) or more power sources (e.g., the ones shown plus additional generators). The flywheel power smoothing system 1500, backup battery system 1400, and grid interface 920 connected to the grid 902 can act as both power sources (when expending stored energy) and as power sinks (when storing energy from another of the power sources). In this embodiment, there are two charging PDUs, charging PDU B 1200a and charging PDU A 1200b, but in other embodiments there may be more of fewer charging PDUs. In some embodiments, the charging PDUs 1200 may be substituted for additional solid state switches 1121, physical relays 1122, and/or DC-to-DC transformers & isolators 1123 in the ATS 1120 of the SS PDU 1100. In operation, the source selection power distribution unit (SS PDU) 1100 receives power routing instructions from the master control unit 1000 and routes power between the power sources/sinks and the charging PDUs 1200 by operating a plurality of solid state switches and/or physical relays, depending on the power source, the current required, and the power quality requirements. The SS PDU 1100 may have internal algorithms programmed into its hardware, firmware, or a microcontroller to determine the optimal operation of the solid state switches and/or physical relays.

The SS PDU 1100 comprises a high-voltage DC bus (HVDC bus) 1130 to which all power sources and the charging PDUs 1200 are connected. This DC bus is a central node to which the backup battery system pack and the EV charger PDU 1200 outputs are connected. In this design, the high-voltage DC bus 1130 might operate around a nominal voltage (for example, ~800 V DC) suitable for directly interfacing with the battery and providing headroom for DC-DC converters to step down to various EV battery voltages. The HVDC bus 1130 is equipped with proper bus bars, contactors, and fuses. During operation, the HVDC bus 1130 allows energy to flow between any connected element: the grid 902 (via grid interface 920), the backup battery system 1400 (via DC/DC converter or battery management system (BMS) interface), and the EV charging PDUs 1200, and other sources and sinks such as the flywheel power smoothing system 1500 and the generator 901 (via the generator interface 910). The SS PDU/s 1100 switching logic controller 1110 actively manages the DC bus voltage and ensures it remains stable (with help from the backup battery system 1400 acting as a buffer). By having a common HVDC bus 1130, the system 900 achieves a multi-port power distribution topology: power from one source can be redirected to any load, limited only by converter capacities and control logic. For example, if one EV is discharging (V2G/V2V mode), the HVDC bus 1130 will be driven by that EV's DC/DC converter and/or the battery, and the AC/DC converter can push excess power to the grid or to the other EV's charger. This configuration is what enables simultaneous multi-directional flows within the single unit.

The connection between the SS PDU 1100 and the grid 902 should meet utility standards for interconnection. This means the SS PDU 1100 will have protection relays or equivalent functions to detect out-of-range conditions (over/under voltage, over/under frequency, etc.) and disconnect from the grid 902 in those events. The SS PDU 1100 manages these functions in coordination with the master control unit 1000 integrates these protective functions in software and hardware—for instance, the SS PDU 1100 might use the inverter's measurements to detect an islanding condition (loss of mains) and then open the main AC contactor, notifying the master control unit of the islanding condition so that the master control unit 1000 can instruct the SS PDU 1100 to route power from other sources (e.g., the backup battery system 1400). In some embodiments, there may also be an integrated automatic transfer switch if the system provides backup power to a site, to isolate the site from the grid during an outage.

In this embodiment, the source selection power distribution unit (SS PDU) 1100 comprises a switching logic controller 1110; an automatic transfer switch 1120 system; a high-voltage power bus 1130; thermal sensors 1140; and separate lines of fuses 1150*a,b*, DC power meters 1160*a,b*, and electromagnetic interference filters 1170*a,b* going to their respective charging power distribution units 1200*a,b*.

The switching logic controller 1110 receives power routing instructions from the master control unit 1000 and operates a plurality of solid state switches 1121, physical relays 1122, and/or DC-to-DC transformers & isolators 1123 in the ATS 1120 of the SS PDU 1100 to route power to and from the power sources and sinks according to the instructions. The type of switching used (solid state switches or physical relays) may be chosen according to the amount of current required, the quality of power required, safety considerations, and/or equipment cost considerations through that power pathway. For example, solid state switches are useful in lower-current applications where fast switching and high power quality are required (e.g., when bringing batteries or a flywheel online as a power-smoothing device. Physical relays are useful in high-current applications for several reasons: they are much cheaper to buy for high-current applications, they fully disconnect the power through a given pathway, increasing safety by isolating current from that pathway, and they will pass through AC current without the need for DC rectification. However, relays are slower to operate and cause substantial transients in the power pathway. A plurality of DC-to-DC transformers may be used to change the DC voltage in a given pathway. DC-to-DC transformers also isolate the power in the pathway from the grid, adding safety by protecting the circuit on the non-grid side of the circuit from accidental grounding. A plurality of solid state switches 1121, physical relays 1122, and/or DC-to-DC transformers & isolators 1123 may be arranged and operated to facilitate power routing to and from the power sources and sinks according to the instructions provided by the master control unit 1000.

The automatic transfer switch 1120 system comprises the above-described solid state switches 1121, physical relays 1122, and/or DC-to-DC transformers & isolators 1123 that allow power to be routed to and from the power sources and sinks according to the instructions provided by the master control unit 1000.

The high-voltage power bus 1130 provides a common tie-in to power at a convenient system-standard voltage (e.g., 800V). This system-standard voltage may be utilized directly by power sources or sinks operating at that voltage, or may be increased or decreased using DC-to-DC transformers either in the ATS 1120 of the SS PDU 1100 (e.g., bumping power up or down to and from one of the four described power sources or by a DC-to-DC transformer in one of the charging PDUs 1200. Multiple voltage levels may be maintained within the system 900 by use of these DC-to-DC transformers, and may be changed by the system 900 via instructions provided by the master control unit 1000.

Thermal sensors 1140 may be used within the system 900 or SS PDU 1100 as a safety mechanism to detect and prevent overheating of various components of the system 900 or SS PGU. Here, thermal sensors 1140 are shown as being connected to the ATS 1120 and high-voltage power bus 1130 to monitor temperatures of those components of the SS PDU 1100. The thermal sensors 1140 are connected to the thermal manager 1050 of the master control unit 1000.

The separate lines of fuses 1150*a,b*, DC power meters 1160*a,b*, and electromagnetic interference filters 1170*a,b* going to their respective charging power distribution units 1200*a,b* are used to monitor and control power to each of the two charging PDUs 1200*a,b* of this embodiment. The fuses 1150*a,b* prevent overcurrent by disconnecting the circuit if current rises above a given fuse's current rating. The DC power meters 1160*a,b* of this embodiment are revenue-grade power meters, allowing for precise determination of power flowing to and from an EV connected to each charging PDU 1200*a,b* for purposes of charging or crediting an EV owner's account for the energy used and/or provided. The electromagnetic interference (EMI) filters 1170*a,b* are used to filter out transients and other interference in the power pathway that can lead to malfunctioning or even damage to the EV charging station and EVs attached to it.

Electromagnetic interference in a power pathway can lead to serious problems including electronic component damage, malfunctioning of the battery management system (BMS) either of the EV or the EV charging station, disruptions of the charging process as the BMS tries to cope with changing power, and even overheating, short circuits, or fires in worst case scenarios.

Figure 12:
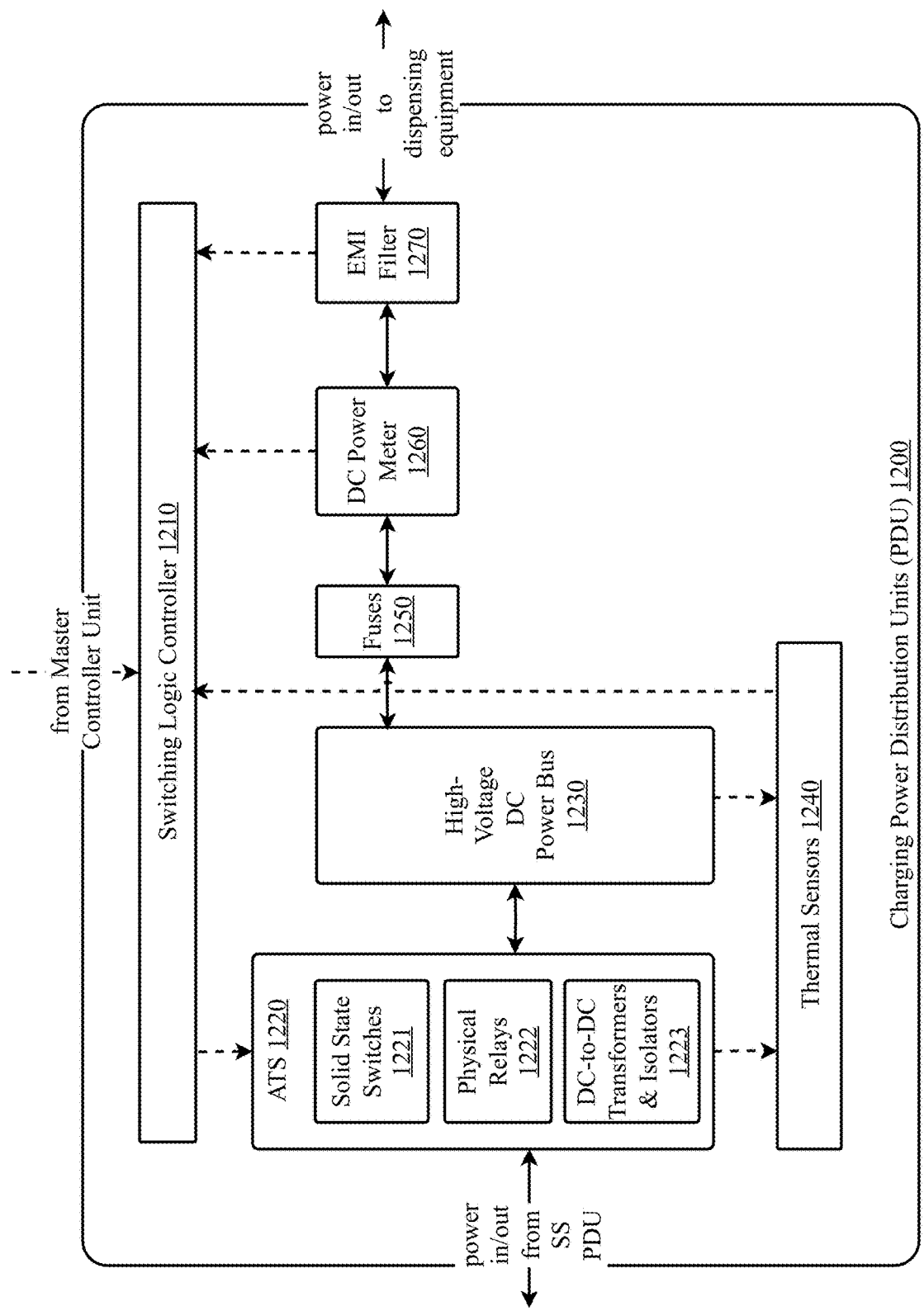
FIG. 12 is a block diagram showing an exemplary charging power distribution unit for a modular, multi-directional, smart EV charging station.

FIG. 12 is a block diagram showing an exemplary charging power distribution unit for a modular, multi-directional, smart EV charging station. The charging power distribution units (charging PDUs) 1200 operate in a similar manner to the SS PDU 1100, except that they each control power between the SS PDU 1100 and single EV. Use of multiple charging PDUs 1200 allows for multiple voltage levels within the system 900. For example, EV A 903*a* can be charged at 800V while EV B 903*b* can be simultaneously charged at 400V. In this example, there are two charging PDUs 1200*a,b*, but in other embodiments, more or fewer charging PDUs could be used.

In this embodiment, there are two charging PDUs, charging PDU B 1200*a* and charging PDU A 1200*b*, but in other embodiments there may be more of fewer charging PDUs. In some embodiments, the charging PDUs 1200 may be substituted for additional solid state switches 1121, physical relays 1122, and/or DC-to-DC transformers & isolators 1123 in the ATS 1120 of the SS PDU 1100.

In this embodiment, each charging power distribution unit (PDU) 1200 comprises a switching logic controller 1210; an automatic transfer switch 1220 system; a high-voltage power bus 1230; thermal sensors 1240; and separate lines of fuses 1250*a,b*, DC power meters 1260*a,b*, and electromagnetic interference filters 1270*a,b* going to their respective charging power distribution units 1200*a,b*.

The switching logic controller 1210 receives power routing instructions from the master control unit 1000 and operates a plurality of solid state switches 1221, physical relays 1222, and/or DC-to-DC transformers & isolators 1223 in the ATS 1220 of the charging PDU 1200 to route power to and from the SS PDU 1100 and the EV according to the instructions. The type of switching used (solid state switches or physical relays) may be chosen according to the amount of current required, the quality of power required, safety considerations, and/or equipment cost considerations through that power pathway. For example, solid state switches are useful in lower-current applications where fast switching and high power quality are required (e.g., when bringing batteries or a flywheel online as a power-smoothing device. Physical relays are useful in high-current applications for several reasons: they are much cheaper to buy for high-current applications, they fully disconnect the power through a given pathway, increasing safety by isolating current from that pathway, and they will pass through AC current without the need for DC rectification. However, relays are slower to operate and cause substantial transients in the power pathway. A plurality of DC-to-DC transformers may be used to change the DC voltage in a given pathway. DC-to-DC transformers also isolate the power in the pathway from the grid, adding safety by protecting the circuit on the non-grid side of the circuit from accidental grounding. A plurality of solid state switches 1221, physical relays 1222, and/or DC-to-DC transformers & isolators 1223 may be arranged and operated to facilitate power routing to and from the SS PDU 1100 and the EV according to the instructions provided by the master control unit 1000.

The automatic transfer switch 1220 system comprises the above-described solid state switches 1221, physical relays 1222, and/or DC-to-DC transformers & isolators 1223 that allow power to be routed to and from the SS PDU 1100 according to the instructions provided by the master control unit 1000.

The high-voltage power bus 1230 provides a common tie-in to power at the voltage assigned by the master control unit 1000 for that charging PDU (e.g., 400V for charging of a particular brand of EV). Thus, each charging PDU 1200*a,b* can support a different voltage level from the system-standard voltage of the high-voltage power bus 1130 of the SS PDU 1100.

Thermal sensors 1240 may be used within the system 900 or charging PDU 1200 as a safety mechanism to detect and prevent overheating of various components of the system 900 or SS PGU. Here, thermal sensors 1240 are shown as being connected to the ATS 1220 and high-voltage power bus 1230 to monitor temperatures of those components of the charging PDU 1200. The thermal sensors 1240 are connected to the thermal manager 1050 of the master control unit 1000.

The fuses 1250, DC power meter 1260, and electromagnetic interference filter 1270 going to the dispensing equipment are used to monitor and control power to the EV attached to the charging PDU. The fuses 1250 prevent overcurrent by disconnecting the circuit if current rises above a given fuse's current rating. The DC power meter 1260 of this embodiment is a revenue-grade power meter, allowing for precise determination of power flowing to and from an EV connected to the charging PDU 1200*a,b* for purposes of charging or crediting an EV owner's account for the energy used and/or provided. Where a DC power meter is provided at the charging PDU level for a given power pathway, it may be eliminated from the SS PDU level, and vice-versa. The electromagnetic interference (EMI) filter is used to filter out transients and other interference in the power pathway that can lead to malfunctioning or even damage to the EV charging station and EVs attached to it. Electromagnetic interference in a power pathway can lead to serious problems including electronic component damage, malfunctioning of the battery management system (BMS) either of the EV or the EV charging station, disruptions of the charging process as the BMS tries to cope with changing power, and even overheating, short circuits, or fires in worst case scenarios.

Figure 13:
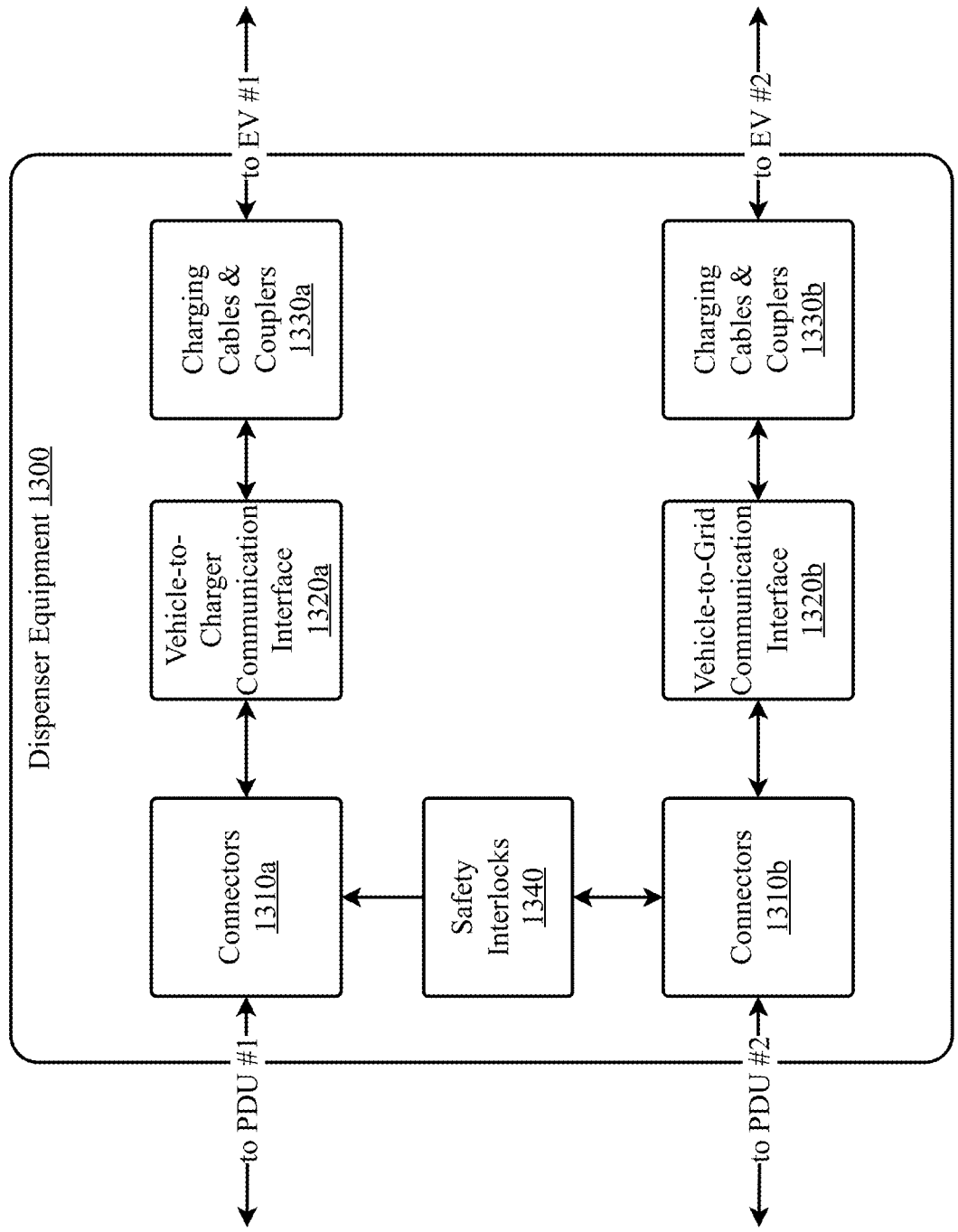
FIG. 13 is a block diagram showing an exemplary dispenser equipment for a modular, multi-directional, smart EV charging station.

FIG. 13 is a block diagram showing an exemplary dispenser equipment for a modular, multi-directional, smart EV charging station. The dispenser equipment 1300 for connecting to EVs for charging utilizes industry standard connectors to allow connection to EVs. As there are many different connectors for EVs, the connectors of the dispenser equipment may be interchangeable or swappable so that a large variety of types of EVs can be charged using the system 900. The dispenser equipment of this embodiment comprises dual charging ports comprising connectors 1310*a,b*, safety interlocks 1340, vehicle-to-charger communication interfaces 1320*a,b*, and charging cables and couplers 1330*a,b*. Each charging port is configured to connect via the cables and couplers to the charging system of an EV.

The connectors 1310*a,b* allow for connection of the dispensing equipment 1300 to the EV charging station. Where the dispensing equipment 1300 is modular, the connectors 1310*a,b* allow for easy replaceability of the dispensing equipment 1300 module. In some embodiments, access panels to the connectors 1310*a,b* may have safety interlocks 1340 installed such that opening the access panel to access the connectors 1310*a,b* will shut off power to the dispensing equipment. The safety interlocks 1340 may also provide feedback to the master control unit 1000 to implement other safety measures such as disconnecting relays in the power path to the dispensing equipment 1300.

The vehicle-to-charger communication interfaces 1320*a,b* communicate with the battery management system (BMS) of the EV and with the master control unit 1000 to coordinate charging rates (supplied voltages and available amperages).

The charging cables and couplers 1330*a,b* are the direct physical connection to the EV that provide power to the EV for charging. The cables are high-voltage, high-amperage cables suitable for fast EV charging (e.g., 350 kW). While there are standards for couplers, there are many such standards that are often brand-specific and vehicle-specific. The couplers may be removeable and/or replaceable by the EV charging user so that the charging cable will connect to the user's particular EV.

Figure 14:
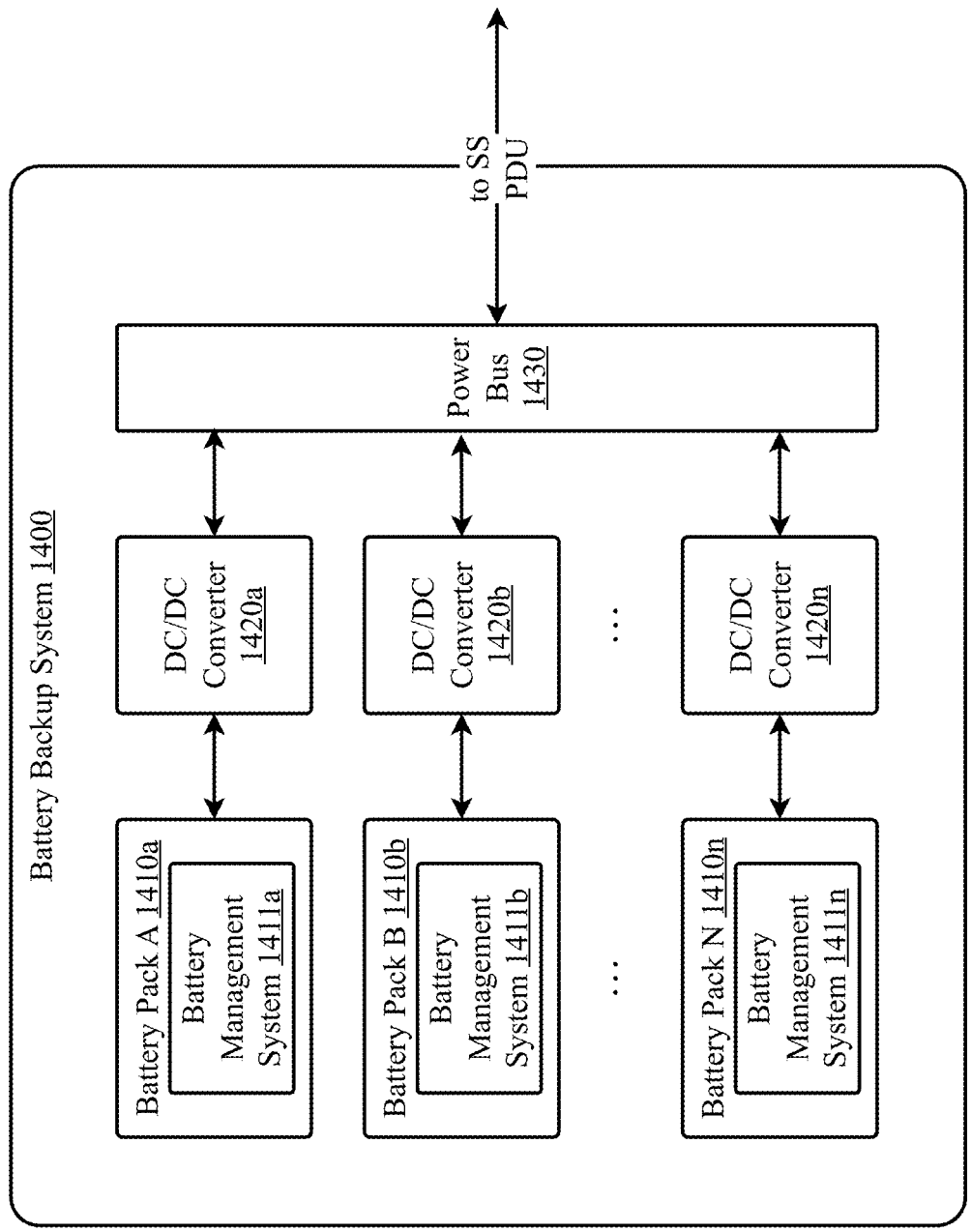
FIG. 14 is a block diagram showing an exemplary backup battery system for a modular, multi-directional, smart EV charging station.

FIG. 14 is a block diagram showing an exemplary backup battery system for a modular, multi-directional, smart EV charging station.

The battery backup system 1400 can perform several roles in the system, depending on system needs. It can provide sole power to charge EVs, supplement grid power where grid power is insufficient or expensive, provide power smoothing during switching, provide backup power to internal systems (e.g., safety systems in the event that grid power goes out), and power external systems such as lights. Ideally, the backup battery system 1400 will have a capacity of several hundred kWh, sufficient to charge a few EVs without using grid power, plus some left over for ancilliary functions such as powering internal safety equipment. The use of the backup battery system 1400 will be directed by the master control unit.

One primary use of the backup battery system is for energy storage. If the grid is strong and energy is cheap, for example, the master control unit 1000 might also charge the backup battery system 1400 while charging the vehicles (effectively treating the backup battery system 1400 as another "vehicle" to charge). Alternately, if the grid 902 connection has limited capacity or if multiple cars are charging, the backup battery system 1400 can discharge to supplement the grid's 902 charging of EVs (preventing overload of the grid 902 connection). A fast charge (e.g., 350 kW) may be supplied to an EV, yet the grid 902 may only see a steady 50 kW draw if the backup battery system 1400 is supplying the remainder. This mode requires coordination by the master control unit 1000 so as not to exceed the grid 902 import limit set for the site, which the master control unit enforces. The system 900 ensures that each EV receives the appropriate DC voltage and current as requested by the vehicle's Battery Management System (BMS), adjusts outputs to the backup battery system 1400 and each EV independently. Charging can be fast (in the dual charging PDU 1200 embodiment described herein, up 350 kW total), giving a typical EV a large amount of range in minutes.

If grid power 902 becomes unavailable, the system 900 can also operate in an island mode to provide backup power to local loads. For example, if installed at a depot or a building, the system 902 can disconnect from the dead grid and use its backup battery system 1400 (and even EVs that choose to participate) to supply emergency power to critical circuits. In this mode, the AC/DC converter can act as a local AC grid if such capability is required (acting as a grid-forming inverter). Protective earth and neutral bonding inside the unit would be configured appropriately when islanded for safety. Thus, the same hardware can be reconfigured via software to handle off-grid scenarios, further ensuring that V2G functionality doesn't compromise the ability to maintain stable voltage/frequency when grid is absent.

Another primary use of the backup battery system is for power smoothing (also known as power quality conditioning). In V2G mode, one or more EVs 903*a-n* act as power sources, sending energy from their batteries back into the grid 902. The system 900 will ramp up the AC output in sync with grid frequency and voltage, effectively acting like a small power plant injecting power. The backup battery system 1400 can be used to ensure that the power exported to the grid is smooth. If an EV's output fluctuates or if it disconnects, the backup battery system 1400 can instantaneously fill the gap so the grid doesn't see an abrupt change. Additionally, power quality conditioning may be used in this mode wherein an inverter is operated to provide reactive power or harmonic compensation as needed. Power quality conditioning may be used internally within the system, regulating local voltage by absorbing/injecting reactive power to or from the backup battery system 1400.

The battery management system 1400 of this embodiment comprises a plurality of modular battery packs 1410*a-n* each of which comprises a plurality of battery cells and a battery management system 1411*a-n* which monitors the state of charge and health of each battery cell and manages power to and from each cell in accordance with the monitoring. The combined voltage and capacity of all battery packs 1410*a-n* is configured to be a useful for EV fast charging (e.g., 800V with a capacity of several hundred kWh). Each battery pack 1410*a-n* is configured to be separately replaceable as a module, increasing reliability and serviceability. If a given battery pack fails, that particular battery pack can be easily replaced without having to replace the entire set of batteries. In this embodiment, each battery pack 1410*a-n* has its own DC-to-DC converter, allowing each battery pack to be charged to a different nominal voltage, facilitating use of battery packs from different manufacturers. The DC-to-DC converters 1420*a-n* step the voltage up or down to a common power bus voltage 1430, which ideally will correspond to the system-standard voltage of the high-voltage DC power bus 1130 of the SS PDU 1100. Here, the battery packs are shown as being connected in parallel. However, in some cases the battery packs may be connected in series in order to boost voltage to the power bus (e.g., if the battery packs have a nominal voltage of 400V, two battery packs may be connected in series to obtain 800V).

Figure 15:
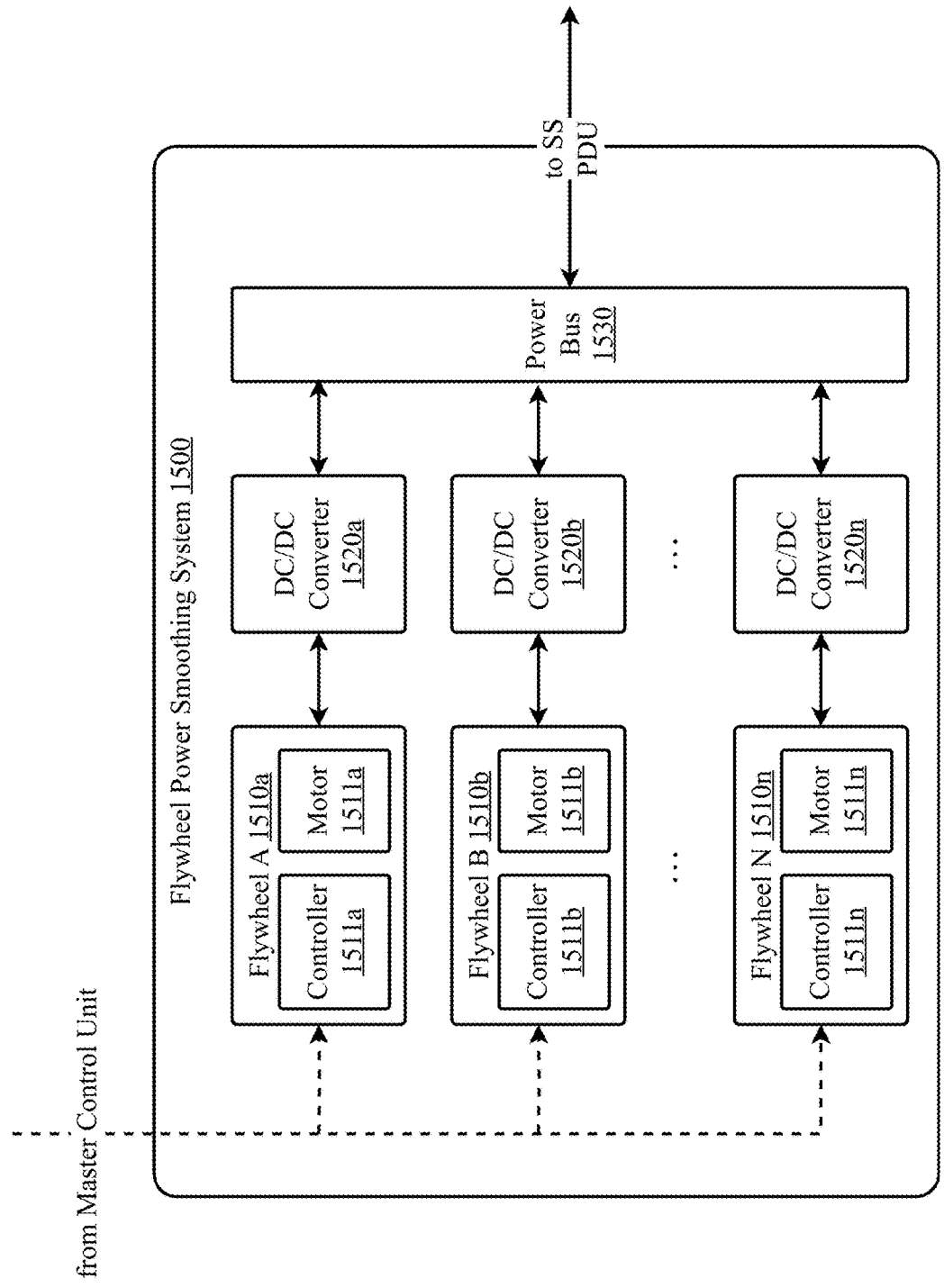
FIG. 15 is a block diagram showing an exemplary flywheel power smoothing system for a modular, multi-directional, smart EV charging station.

FIG. 15 is a block diagram showing an exemplary flywheel power smoothing system for a modular, multi-directional, smart EV charging station. The flywheel power smoothing system 1500 is an energy storage system that stores energy in the form of spinning flywheels. Each flywheel has an electric motor attached to it which, when powered, spins the flywheel up to a pre-determined maximum speed for storage of kinetic energy. When used as an energy source, the motor acts as a generator, converting the kinetic energy of the flywheel into electrical energy. Flywheels can produce very smooth DC power almost instantaneously, making them ideal for power smoothing operations during power switching or connection/disconnection of EVs which would otherwise produce substantial transients in the power supply. Flywheels do lose power quickly, so are not ideal for sustained power output.

The flywheel power smoothing system 1500 of this embodiment is configured similarly to the battery management system 1400. The flywheel power smoothing system 1500 comprises a plurality of flywheels each comprising a flywheel (not shown), a controller 1511*a-n*, and a motor 1511*a-n*. The master control unit 1000 monitors the rate of spin of each flywheel via its controller 1511*a-n*, and determines when to engage the motor 1511*a* to either charge the flywheel (increase its spin) or discharge from the flywheel (drawing energy from the flywheel, decreasing its spin). Each flywheel 1510*a-n* is configured to be separately replaceable as a module, increasing reliability and serviceability. If a given flywheel fails, that particular flywheel can be easily replaced without having to replace the entire set of flywheels. In this embodiment, each flywheel 1510*a-n* has its own DC-to-DC converter, allowing each flywheel to receive or generate a different nominal voltage, facilitating use of flywheels and motors from different manufacturers. The DC-to-DC converters 1520*a-n* step the voltage up or down to a common power bus voltage 1530, which ideally will correspond to the system-standard voltage of the high-voltage DC power bus 1130 of the SS PDU 1100. Here, the flywheels are shown as being connected in parallel. However, in some cases the flywheels may be connected in series in order to boost voltage to the power bus (e.g., if the flywheels each generate a nominal voltage of 400V, two flywheels may be connected in series to obtain 800V).

Figure 16:
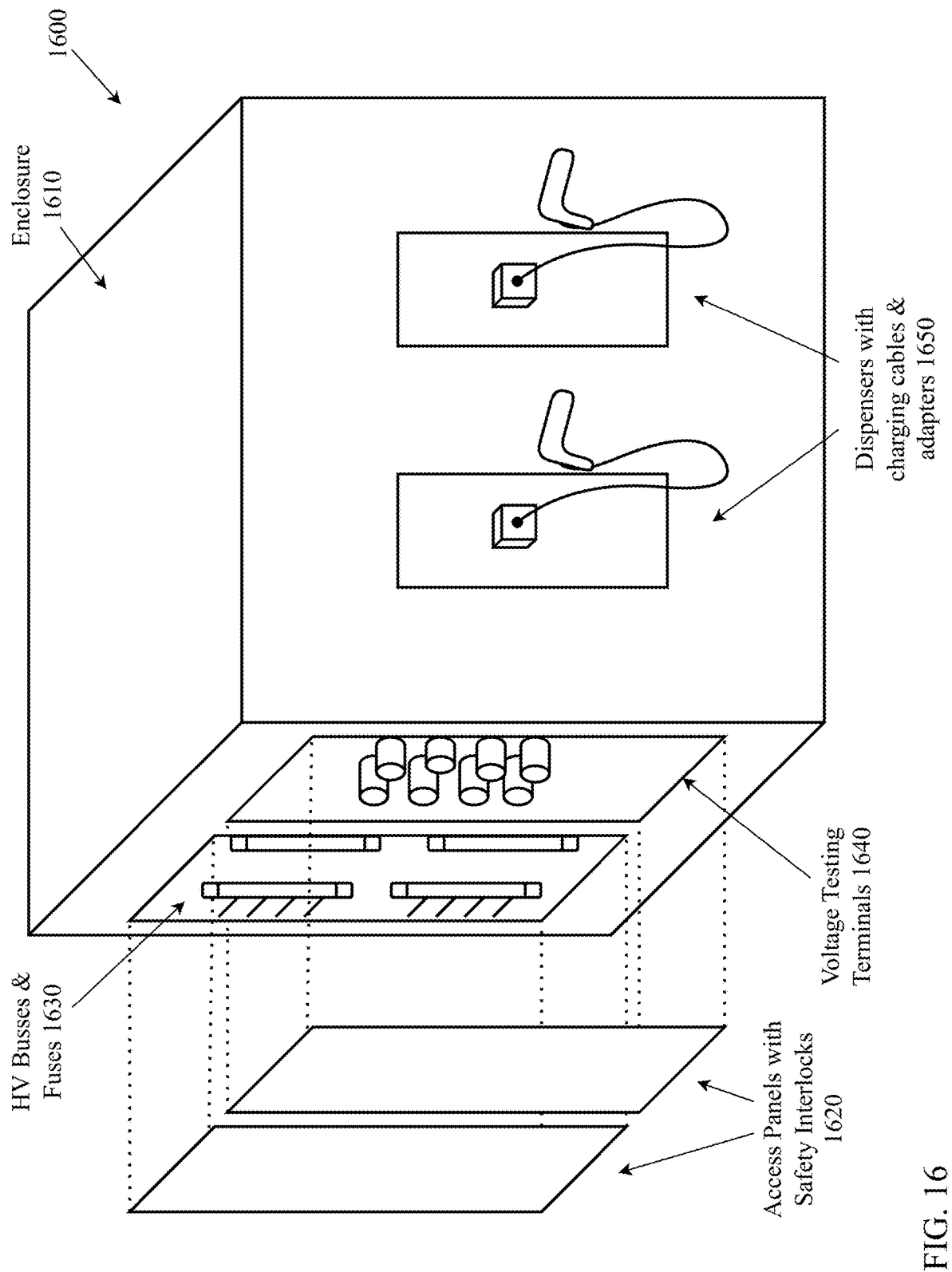
FIG. 16 is a perspective view of an exemplary enclosure for a modular, multi-directional, smart EV charging station.

FIG. 16 is a perspective view of an exemplary enclosure for a modular, multi-directional, smart EV charging station.

The cabinetry, access panels, and safety equipment 1600 comprise the remainder of the modular EV charging system. The entire system 900 of this embodiment is housed in a single enclosure 1610 configured as a replaceable modular unit. Subsystems of the system 900 may also be designed in modular fashion. For example, if the backup battery system 1400 comprises a plurality of battery packs connected together to form a single, high-capacity, high-voltage battery, each of the battery packs may be designed as modular units, easily accessible from an access panel 1620 to facilitate field replacement without having the replace the entire backup battery system 1400. Access panels of this embodiment comprise safety interlocks such that when they are opened, charging power is shut off to prevent accidental shock or grounding. To the extent possible, all major system components (e.g., backup battery system 1400, flywheel power smoothing system 1500, master control unit 1000, SS PDU 1200, charging PDUs 1200) and minor system components (e.g., fuses, circuit breakers, dispenser equipment, etc.) are designed as replaceable modular units accessible through access panels on the outside of the enclosure. Safety equipment such as automatically-locking access panel doors, automatic shut-off switches for open doors, etc., are installed to prevent accidents.

Access panels may include access panels with safety interlocks 1620. This diagram shows two such panels, one for accessing high-voltage busses and fuses, and another for accessing voltage testing terminals. However, additional access panels many exist for repair and/or replacement of major system components such as battery pack modules 1410a-n, flywheels 1510a-n, the source selection PDU (1100), the charging PDUs 1200a,b, etc. Also shown in this diagram are dispensers with charging cables and couplers/adapters 1650 for connection to EVs for charging.

Figure 17:
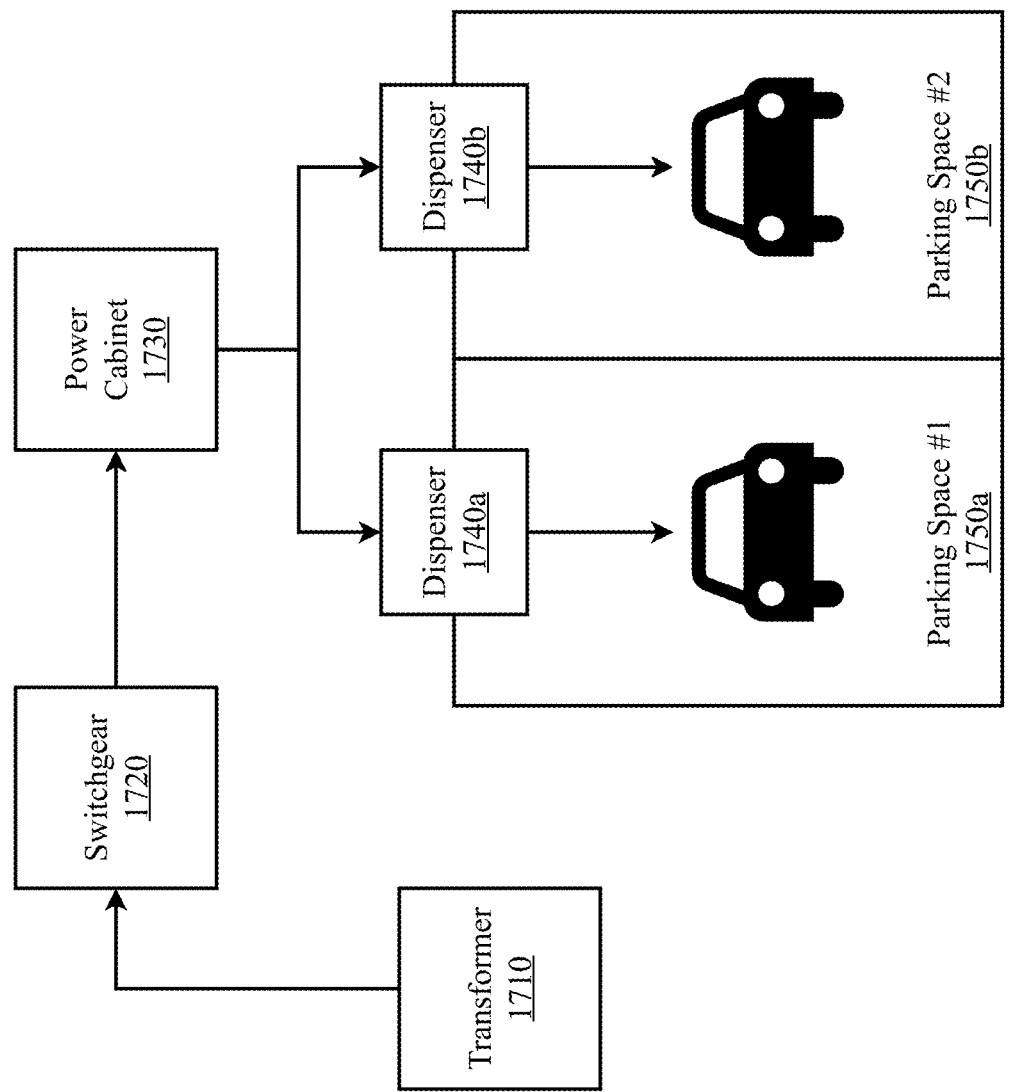
FIG. 17 (PRIOR ART) is a block diagram showing an onsite installation of a typical existing EV charging station.

FIG. 17 (PRIOR ART) is a block diagram showing an onsite installation of a typical existing EV charging station. Existing EV charging stations are permanently installed at a charging site and typically comprise a transformer 1710, a switchgear cabinet 1720, a power cabinet 1730, and dispensers 1740a,b, and a parking spaces for each dispenser, here parking space #1 1750a and parking space #2 1750b. Each of the equipment components 1710, 1720, 1730, 1740a,b are separate units permanently installed at the site, making them very space-inefficient (i.e., taking up a lot of area on the site). Some larger installations may have larger equipment (bigger transformers 1710, more switchgear 1720, and a larger power cabinet 1740) which can power additional dispensers, but the drawback to these large-capacity installations is that they can't be easily down-sized if that site does not receive much usage. The larger equipment and additional parking spaces will be wasted unless the site is torn up and reconfigured. This typical configuration takes up a large amount of space on the site and can be field-repaired only as each unit is permanently installed and cannot be removed without major construction repairs. None of the equipment is modular. To add additional charging capacity, either a larger equipment must be installed or a second or third set of smaller equipment must be installed on the site, again permanently taking up a lot of area on the site.

Figure 18:
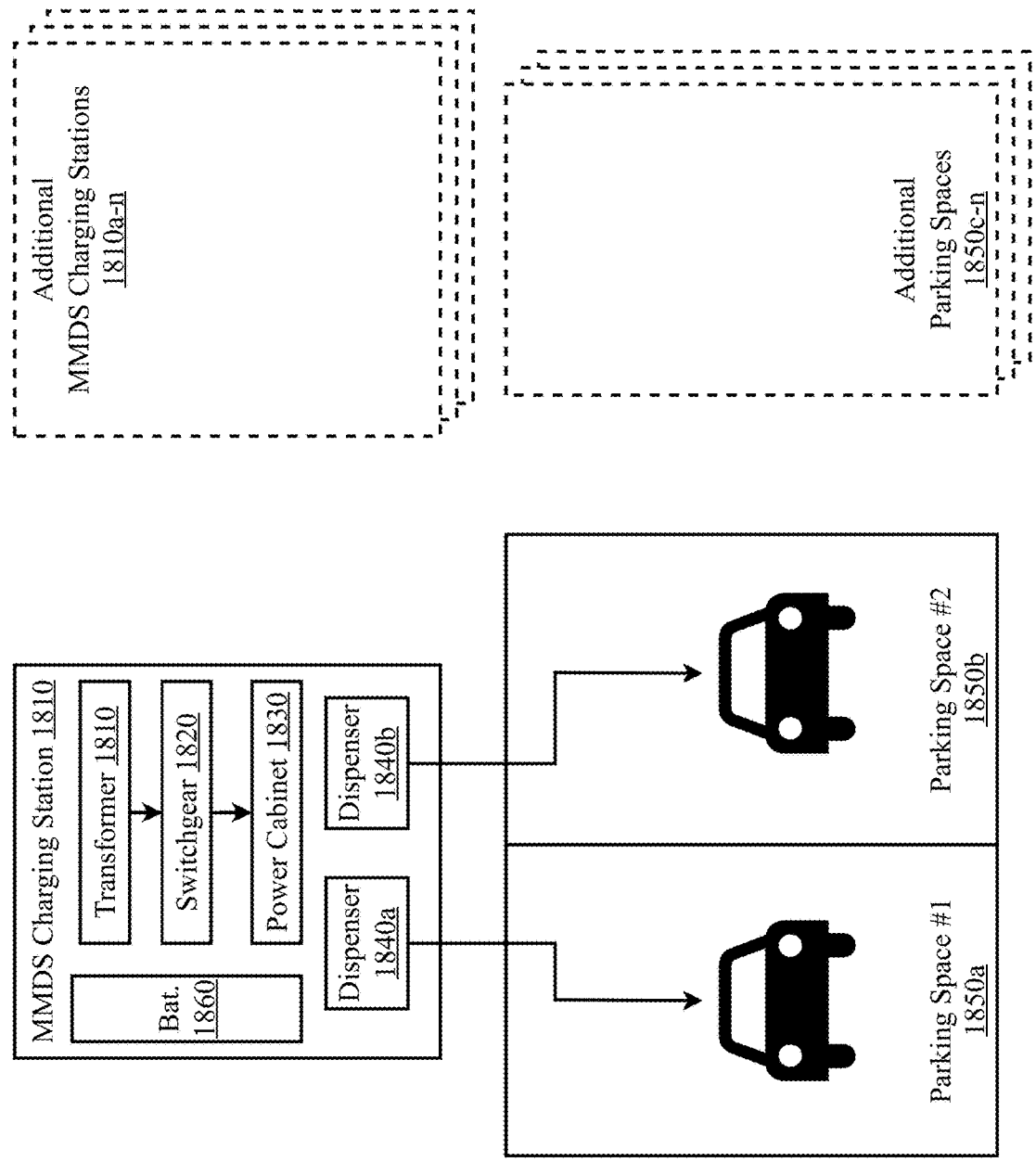
FIG. 18 is a block diagram showing onsite installation of a modular, multi-directional, smart EV charging station.

FIG. 18 is a block diagram showing onsite installation of a modular, multi-directional, smart EV charging station. The modular, multi-directional, smart (MMDS) EV charging station 1810 is compact and very space-efficient, housing inside a single enclosure all equipment needed for charging one or more EVs (in this embodiment, two EVs), the backup battery system 1860, the equivalent of the onsite transformer 1810, the equivalent of the onsite switchgear 1820, the equivalent of the onsite power cabinet 1830, and dispensers 1840a,b for two EVs. The entire unit 1810 may either be field-serviced or pulled and replaced with another unit. Further, in some embodiments, each of the major components of the system 900 may be designed modularly, such that if any major component fails, it may be simply swapped out with another module of that component. The modular design of the overall system plus the modular design of its major components greatly increases the options for servicing and greatly increases system up-time as repairs can be made quickly and efficiently. If additional capacity is required, additional MMDS EV charging station units 1810a-n can simply be dropped onsite and connected to the electrical grid (to the extent of the site's allowed grid capacity) and additional parking spaces assigned 1850c-n (to the extent of the site's available space). Thus, charging capacity at the site can be added or removed simply by adding or removing MMDS EV charging station units 1810a-n.

Figure 19:
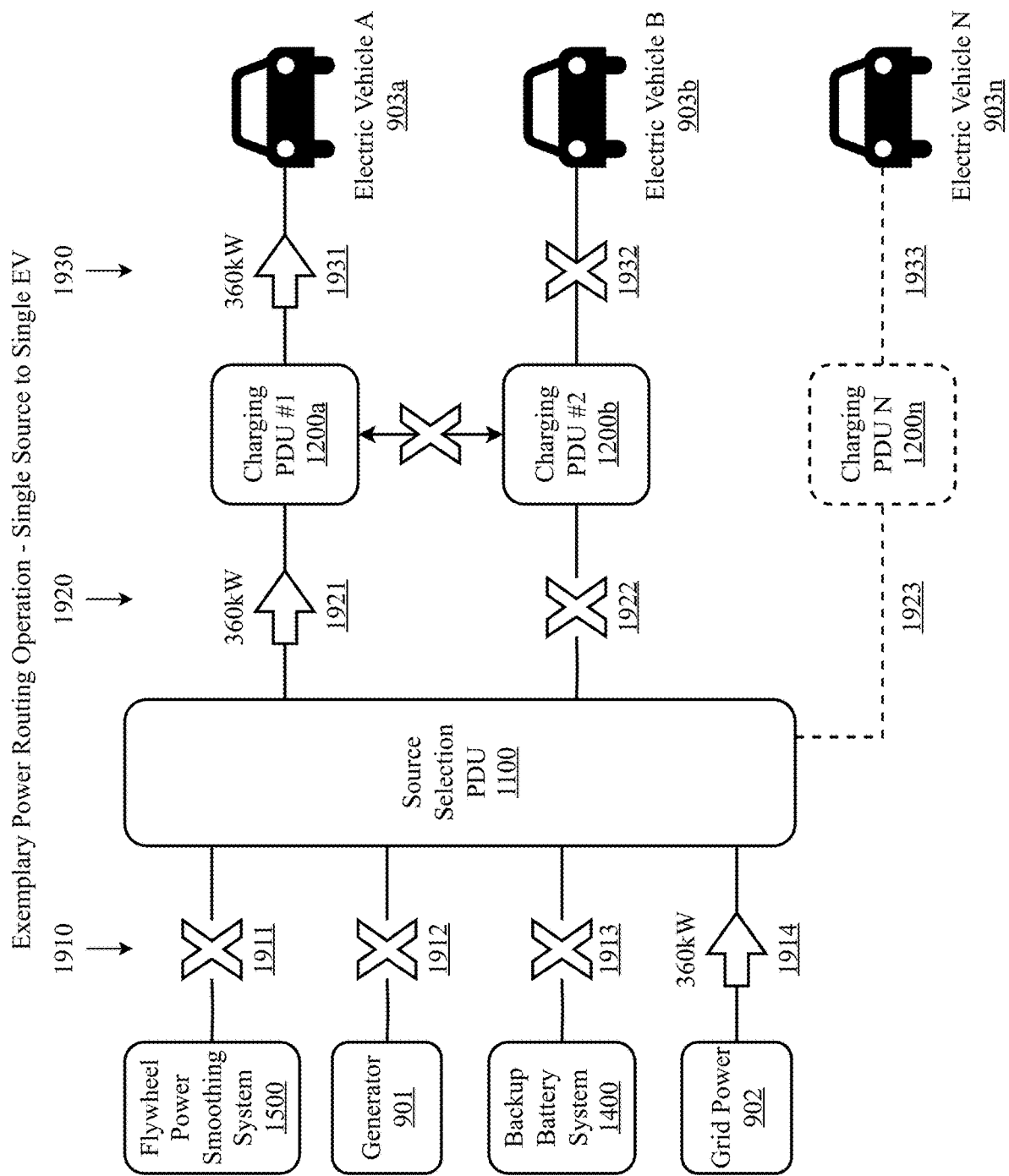
FIG. 19 is a block diagram showing an exemplary single source to single EV power routing operation of a modular, multi-directional, smart EV charging station.

FIG. 19 is a block diagram showing an exemplary single source to single EV power routing operation of a modular, multi-directional, smart EV charging station. In each of the examples in FIGS. 19-23, there are four connections 1910 from four power sources (flywheel 1500, generator 901, backup battery system 1400, and grid power 902) to the SS PDU, two connections 1920 from the SS PDU to the two charging PDUs 1200a,b, and one connection between the charging PDUs 1200a,b, and two connections 1930a,b to the EVs 903a,b. In some embodiments, additional charging PDUs 1200n and EVs 903n may be connected to the system. In some embodiments, instead of using charging PDUs 1200a-n as separate components, the charging PDUs 1200a-n will be replaced by additional switches, relays, and DC-to-DC converters either as part of the SS PDU 1100 or controlled by the SS PDU 1100.

In this example, a single EV 903a is being charged by grid power 902 using an ultra-fast charge (Level 3 charging which is nominally 350 kW to 360 kW) at a particular moment in time. As indicated by the paths shown by the arrows, the SS PDU 1100 draws 360 kW of power 1914 from the grid 902 and routes it 1921 to charging PDU #1 1200a which supplies the power 1931 to the EV 903a 1931.

The remaining pathways marked with an X are unused.

Figure 20:
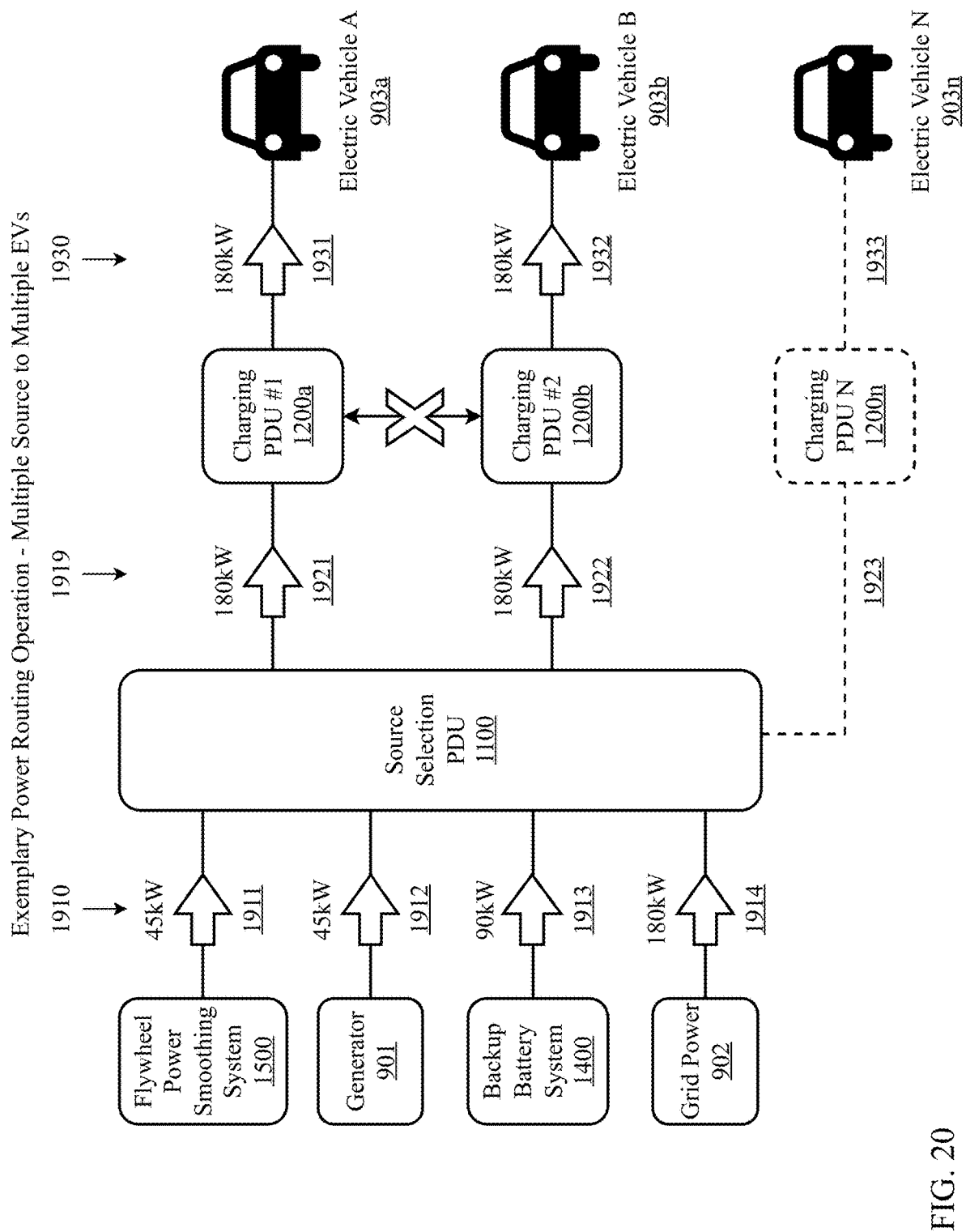
FIG. 20 is a block diagram showing an exemplary multiple source to multiple EV power routing operation of a modular, multi-directional, smart EV charging station.

FIG. 20 is a block diagram showing an exemplary multiple source to multiple EV power routing operation of a modular, multi-directional, smart EV charging station. In each of the examples in FIGS. 19-23, there are four connections 1910 from four power sources (flywheel 1500, generator 901, backup battery system 1400, and grid power 902) to the SS PDU, two connections 1920 from the SS PDU to the two charging PDUs 1200a,b, and one connection between the charging PDUs 1200a,b, and two connections 1930a,b to the EVs 903a,b. In some embodiments, additional charging PDUs 1200n and EVs 903n may be connected to the system. In some embodiments, instead of using charging PDUs 1200a-n as separate components, the charging PDUs 1200a-n will be replaced by additional switches, relays, and DC-to-DC converters either as part of the SS PDU 1100 or controlled by the SS PDU 1100.

In this example, two EVs 903a,b are being charged by a combination of power sources using a fast charge (Level 2 charging which is nominally 150 kW to 180 kW) at a particular moment in time. As indicated by the paths shown by the arrows, grid power 902 supplies 180 kW 1914, the backup battery system 1400 supplies 90 kW 1913, a generator 901 supplies 45 kW, and the flywheel power smoothing system 1500 supplies 45 kW. The power from these sources is supplied to the SS PDU 100 and is allocated by the SS PDU 1100 to charging PDU #1 1200a at 180 kW 1921 and supplied to EV A 903a 1931, and to charging PDU #2 1200b at 180 kW 1922 and supplied to EV B 903b 1932.

The remaining pathways marked with an X are unused.

Figure 21:
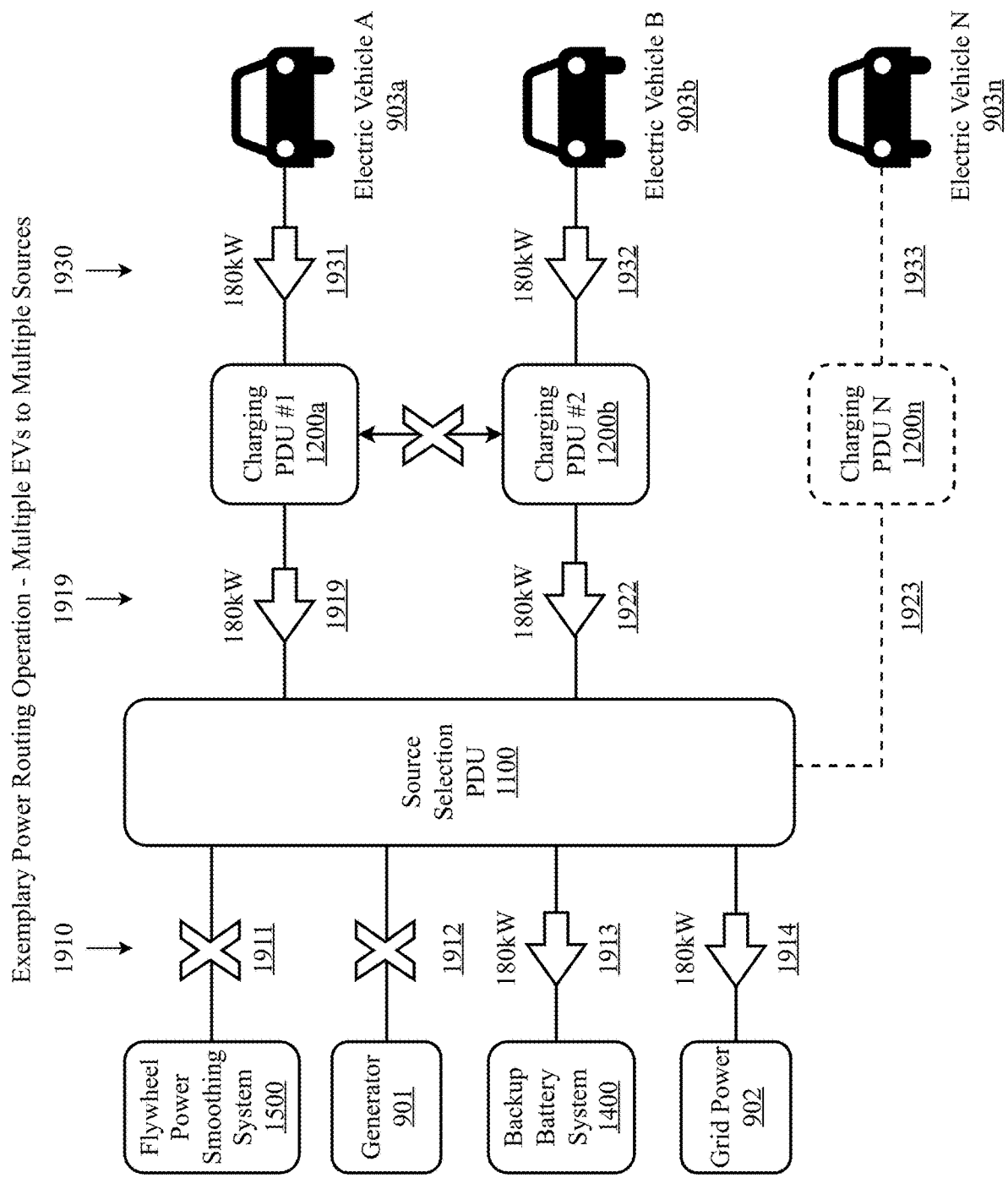
FIG. 21 is a block diagram showing an exemplary multiple EV to multiple source power routing operation of a modular, multi-directional, smart EV charging station.

FIG. 21 is a block diagram showing an exemplary multiple EV to multiple source power routing operation of a modular, multi-directional, smart EV charging station. In each of the examples in FIGS. 19-23, there are four connections 1910 from four power sources (flywheel 1500, generator 901, backup battery system 1400, and grid power 902) to the SS PDU, two connections 1920 from the SS PDU to the two charging PDUs 1200*a,b*, and one connection between the charging PDUs 1200*a,b*, and two connections 1930*a,b* to the EVs 903*a,b*. In some embodiments, additional charging PDUs 1200*n* and EVs 903*n* may be connected to the system. In some embodiments, instead of using charging PDUs 1200*a-n* as separate components, the charging PDUs 1200*a-n* will be replaced by additional switches, relays, and DC-to-DC converters either as part of the SS PDU 1100 or controlled by the SS PDU 1100.

In this example, two EVs 903*a,b* are supplying power to a plurality of power sources (which in this case act as power sinks) using a fast charge (Level 2 charging which is nominally 150 kW to 180 kW) at a particular moment in time. As indicated by the paths shown by the arrows, EV A 903*a* supplies 180 kW 1931 to charging PDU #1 1200*a* which supplies 180 kW 1922 to the SS PDU 1100. EV B likewise supplies 180 kW 1932 to charging PDU #2 1200*b* which supplies 180 kW 1922 to the SS PDU 1100. The SS PDU 1100 routes 180 kW 1913 to the backup battery system 1400 to charge it, and 180 kW 1914 to the grid 902 to generate revenue for the EV owners. Note that, in some embodiments, power supplied to the backup battery system 1400 may be revenue-generating for the EV owners. The precise allocation of revenue between the owners of the EVs 903*a,b* would depend on a number of factors such as the measured power supplied by the revenue-grade meters in the power pathway from the EV, and contractual arrangements made between the EV owners and the owner of the EV charging station (e.g., monthly subscriptions with charging rates established, etc.), and real-time pricing, if available. The remaining pathways marked with an X are unused.

Figure 22:
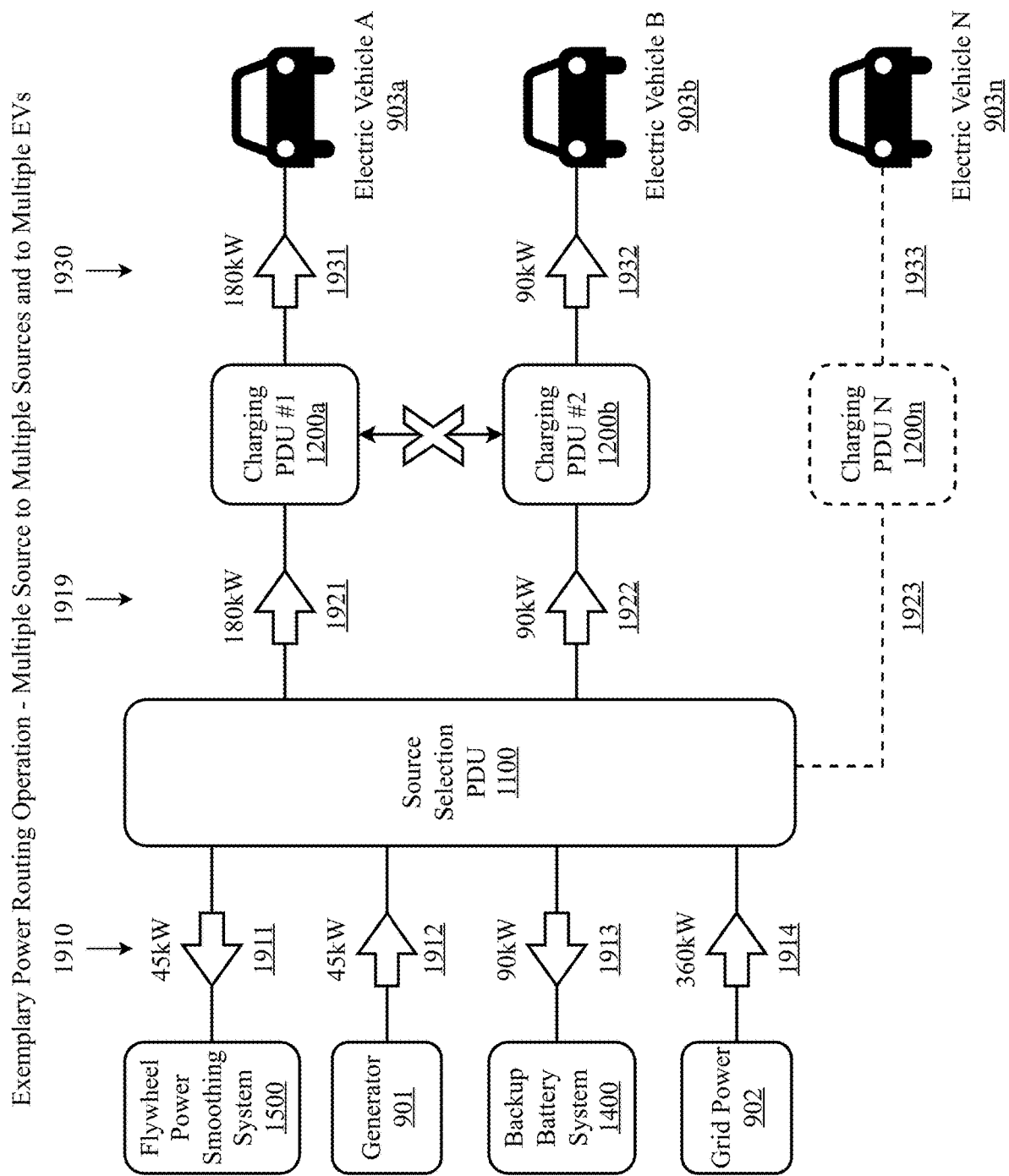
FIG. 22 is a block diagram showing an exemplary multiple source to multiple source and multiple EV power routing operation of a modular, multi-directional, smart EV charging station.

FIG. 22 is a block diagram showing an exemplary multiple source to multiple source and multiple EV power routing operation of a modular, multi-directional, smart EV charging station. In each of the examples in FIGS. 19-23, there are four connections 1910 from four power sources (flywheel 1500, generator 901, backup battery system 1400, and grid power 902) to the SS PDU, two connections 1920 from the SS PDU to the two charging PDUs 1200*a,b*, and one connection between the charging PDUs 1200*a,b*, and two connections 1930*a,b* to the EVs 903*a,b*. In some embodiments, additional charging PDUs 1200*n* and EVs 903*n* may be connected to the system. In some embodiments, instead of using charging PDUs 1200*a-n* as separate components, the charging PDUs 1200*a-n* will be replaced by additional switches, relays, and DC-to-DC converters either as part of the SS PDU 1100 or controlled by the SS PDU 1100.

In this example, two EVs 903*a,b* are being charged by a combination of power sources at a particular moment in time, EV A 903*a* being charged using a fast charge (Level 2 charging which is nominally 150 kW to 180 kW), and EV B being charged using a slower charge (still classified as a Level 2 charge, but at a nominal 90 kW). As indicated by the paths shown by the arrows, grid power 902 supplies 360 kW 1914 and a generator 901 supplies 45 kW, for a total available power of 405 kW. The power from these sources is supplied to the SS PDU 1100 and is allocated by the SS PDU 1100 to charging PDU #1 1200*a* at 180 kW 1921 and supplied to EV A 903*a* 1931, and to charging PDU #2 1200*b* at 180 kW 1922 and supplied to EV B 903*b* 1932. This leaves 135 kW to be allocated by the SS PDU 1100, which uses the remaining power to charge the backup battery system using 90 kW 1913 and to charge the flywheel power smoothing system 1500 using 45 kW 1911.

The remaining pathways marked with an X are unused.

Figure 23:
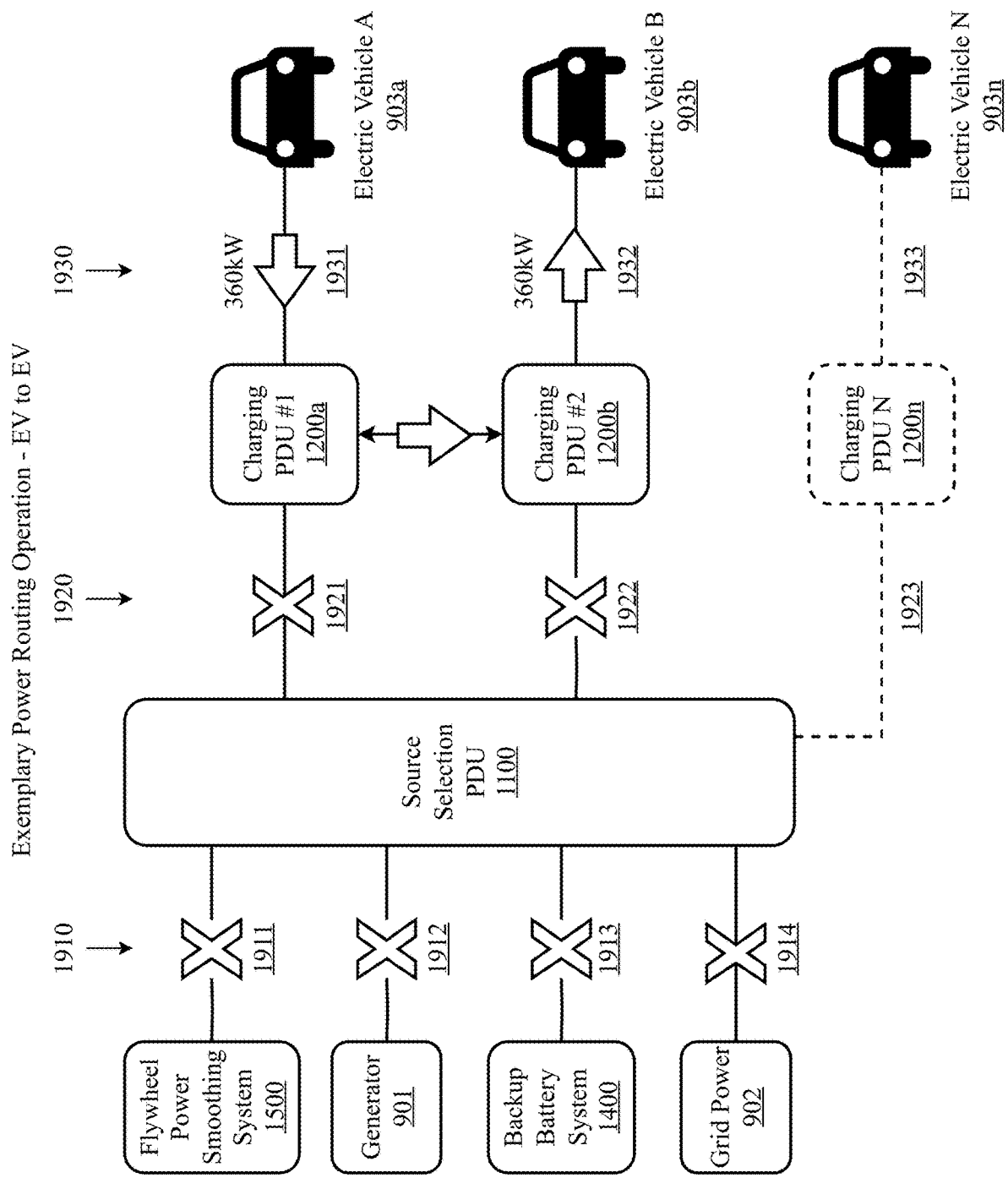
FIG. 23 is a block diagram showing an exemplary EV to EV power routing operation of a modular, multi-directional, smart EV charging station.

FIG. 23 is a block diagram showing an exemplary EV to EV power routing operation of a modular, multi-directional, smart EV charging station. In each of the examples in FIGS. 19-23, there are four connections 1910 from four power sources (flywheel 1500, generator 901, backup battery system 1400, and grid power 902) to the SS PDU, two connections 1920 from the SS PDU to the two charging PDUs 1200*a,b*, and one connection between the charging PDUs 1200*a,b*, and two connections 1930*a,b* to the EVs 903*a,b*. In some embodiments, additional charging PDUs 1200*n* and EVs 903*n* may be connected to the system. In some embodiments, instead of using charging PDUs 1200*a-n* as separate components, the charging PDUs 1200*a-n* will be replaced by additional switches, relays, and DC-to-DC converters either as part of the SS PDU 1100 or controlled by the SS PDU 1100.

In this example, EV A 903*a* is charging EV B 903*b* using an ultra-fast charge (Level 3 charging which is nominally 350 kW to 360 kW) at a particular moment in time. As indicated by the paths shown by the arrows, EV A 903*a* supplies 360 kW 1931 to charging PDU #1 1200*a* which routes the power to charging PDU #2 1200*b* which supplies the power 1932 to the EV B 903*b*.

The remaining pathways marked with an X are unused.

Exemplary Computer System for
Computer-Implemented Aspects and Embodiments

Figure 24:
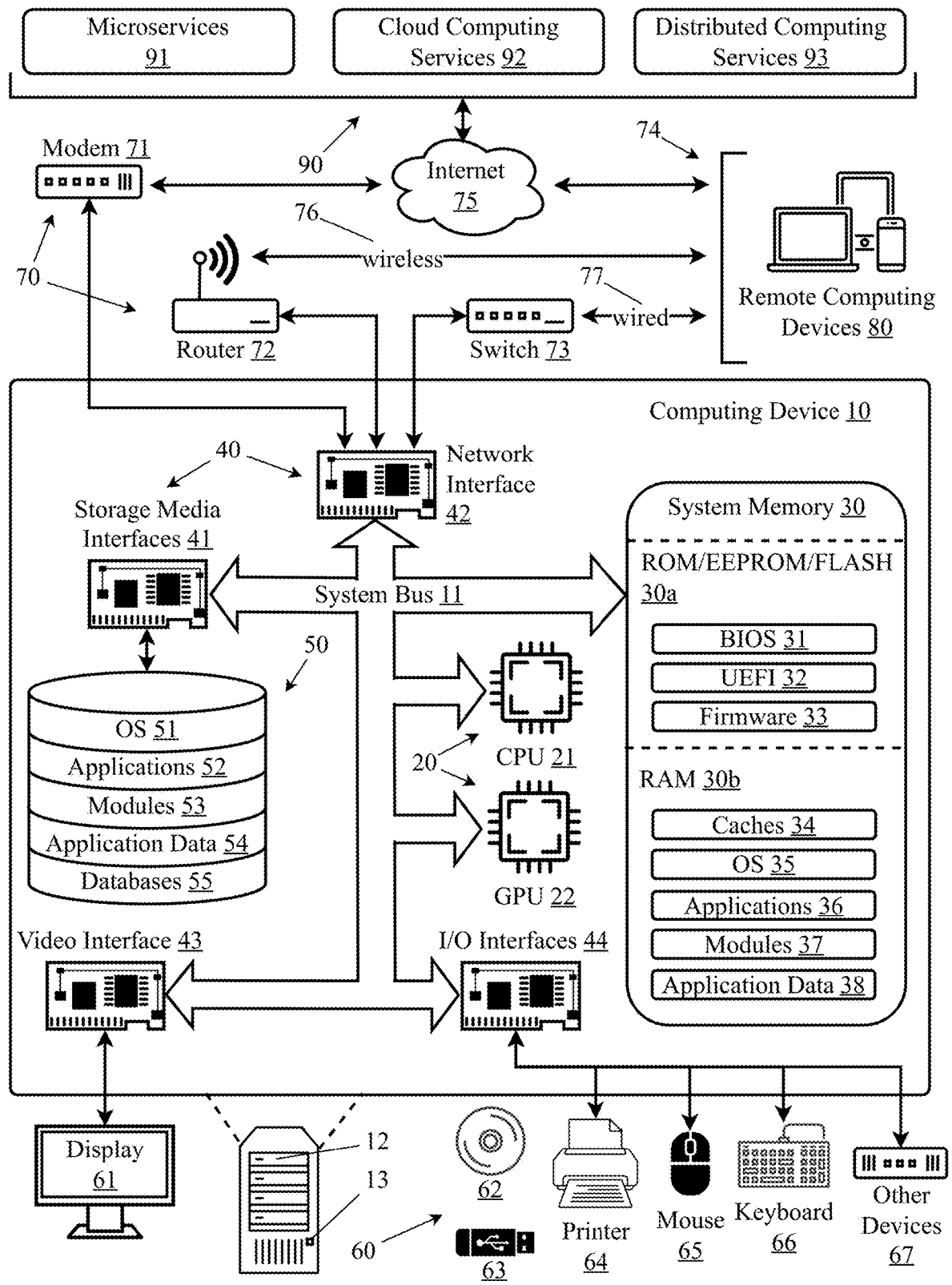
FIG. 24 illustrates an exemplary computer system on which embodiments described herein may be implemented.

FIG. 24 illustrates an exemplary computer system on which embodiments described herein may be implemented, in full or in part. This exemplary computer system describes computer-related components and processes supporting enabling disclosure of computer-implemented embodiments. Inclusion in this exemplary computer system of well-known processes and computer components, if any, is not a suggestion or admission that any aspect or embodiment is no more than an aggregation of such processes or components. Rather, implementation of an aspect or embodiment using processes and components described in this exemplary computer system will involve programming or configuration of such processes and components resulting in a machine specially programmed or configured for such implementation. The exemplary computer system described herein is only one example of such an environment and other configurations of the components and processes are possible, including other relationships between and among components, and/or absence of some processes or components described. Further, the exemplary computer system described herein is not intended to suggest any limitation as to the scope of use or functionality of any embodiment implemented, in whole or in part, on components or processes described herein.

The exemplary computer system described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computer architectures, operating systems, and environments.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computer system are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computer architectures. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A multi-directional electric vehicle (EV) charging system, comprising:
   a grid interface for connection to an electrical grid supplying alternating current (AC) electrical power, the grid interface comprising a bi-directional AC/DC converter;
   a backup battery system comprising one or more batteries;
   an electric vehicle (EV) charging port comprising a cable and a coupler for connection to a charging system of an EV;
   a source selection power distribution unit (PDU) comprising:
      a plurality of electrical connections, one to each of: the bi-directional AC/DC converter of the grid interface, the backup battery system, and the EV charging port;
      one or more switches or relays for routing electrical power to and from the plurality of electrical connections; and
      a switching logic controller configured to:
         receive instructions from a master control unit for routing power among the grid interface, the backup battery system, and the electric vehicle port; and
         operate the one or more switches or relays to route power according to the instructions; and
   the master control unit comprising a memory, a processor, and a plurality of programming instructions stored in the memory which, when operating on the processor, causes the master control unit to:
      determine one or more pathways for electrical power to be routed among the grid interface, the backup battery system, and the electric vehicle ports; and
      issue instructions to the source selection power distribution unit to route power along the one or more pathways.

2. The system of claim 1, wherein the system further comprises a plurality of EV charging ports each comprising a cable and a coupler for connection to a charging system of an EV.

3. The system of claim 2, wherein:
   the master control unit is further programmed to issue instructions to the source selection power distribution unit to simultaneously charge a first EV and a second EV; and
   the source selection PDU operates the one or more switches or relays to simultaneously charge the first EV and second EV.

4. The system of claim 2, wherein:
   the master control unit is further programmed to issue instructions to the source selection power distribution unit to charge a first EV from a second EV; and
   the source selection PDU operates the one or more switches or relays to route power from the first EV to the second EV.

5. The system of claim 4, wherein:
the system further comprises an electrical power meter in the routed power between the first EV to the second EV; and
the master control unit is further programmed to determine an amount of power transferred from the first EV to the second EV and calculate a monetary amount to be charged from an account associated with the first EV to an account associated with the second EV.

6. The system of claim 5, wherein:
the system further comprises a network connection to the Internet; and
the master control unit is further programmed to transfer, via the Internet, the monetary amount from the account associated with the first EV to the account associated with the second EV.

7. The system of claim 3, wherein:
the system further comprises a plurality of electrical power meters, one in each power pathway to an EV;
the master control unit is further programmed to:
issue instructions to route power from one or more EVs to the electrical grid; and
track an amount of power from each of the one or more EVs to the electrical grid using the plurality of power meters; and
calculate monetary amounts to be charged from an account associated with an operator of the electrical grid to accounts associated with each of the one or more EVs;
the source selection PDU operates the one or more switches or relays to route power from the one or more EVs to the electrical grid in accordance with the instructions issued by the master control unit.

8. The system of claim 7, wherein:
the system further comprises a network connection to the Internet; and
the master control unit is further programmed to transfer, via the Internet, the monetary amounts from the account associated with an operator of the electrical grid to accounts associated with each of the one or more EVs.

9. The system of claim 2, wherein:
the master control unit is further programmed to simultaneously connect power multi-directionally to a plurality of sources, a plurality of sinks, or to a plurality of both sources and sinks; and
the list of sources and sinks comprises the grid interface, the backup battery system, and the plurality of EVs.

10. The system of claim 2, wherein:
the system further comprises a generator interface and a flywheel power smoothing system;
the master control unit is further programmed to simultaneously connect power multi-directionally to a plurality of sources, a plurality of sinks, or to a plurality of both sources and sinks; and
the list of sources and sinks comprises the grid interface, the backup battery system, the plurality of EVs, the generator interface, and the flywheel power smoothing system.

11. The system of claim 1, wherein:
the system further comprises:
a plurality of EV charging ports each comprising a cable and a coupler for connection to a charging system of an EV; and
one or more direct current to direct current (DC-to-DC) converters configured to receive electrical power at a first DC voltage and output electrical power at a second DC voltage; and
the source selection power distribution unit is further programmed to:
receive instructions from the master control unit to connect a first EV at the first DC voltage and to connect a second EV at a second DC voltage;
operate the one or more switches or relays to connect the first EV at the first voltage;
operate the one or more switches or relays to route power to simultaneously connect the second EV at the second voltage by passing the power to the second EV through at least one of the one or more DC-to-DC converters.

12. The system of claim 11, wherein:
the master control unit is further programmed to issue instructions to the source selection power distribution unit to simultaneously charge the first EV and the second EV; and
the source selection PDU operates the one or more switches or relays to simultaneously charge the first EV at the first DC voltage and the second EV at the second voltage.

13. The system of claim 11, wherein:
the master control unit is further programmed to issue instructions to the source selection power distribution unit to charge the first EV at the first voltage from the second EV at the second voltage; and
the source selection PDU operates the one or more switches or relays to route power from the first EV at the first voltage to the second EV at the second voltage.

14. The system of claim 13, wherein:
the system further comprises an electrical power meter in the routed power between the first EV to the second EV; and
the master control unit is further programmed to determine an amount of power transferred from the first EV to the second EV and calculate a monetary amount to be charged from an account associated with the first EV to an account associated with the second EV.

15. The system of claim 14, wherein:
the system further comprises a network connection to the Internet; and
the master control unit is further programmed to transfer, via the Internet, the monetary amount from the account associated with the first EV to the account associated with the second EV.

16. The system of claim 11, wherein:
the system further comprises a plurality of electrical power meters, one in each power pathway to an EV;
the master control unit is further programmed to:
issue instructions to route power from one or more EVs to the electrical grid; and
track an amount of power from each of the one or more EVs to the electrical grid using the plurality of power meters; and
calculate monetary amounts to be charged from an account associated with an operator of the electrical grid to accounts associated with each of the one or more EVs;
the source selection PDU operates the one or more switches or relays to route power from the one or more EVs to the electrical grid in accordance with the instructions issued by the master control unit.

17. The system of claim 16, wherein:

the system further comprises a network connection to the Internet; and the master control unit is further programmed to transfer, via the Internet, the monetary amounts from the account associated with an operator of the electrical grid to accounts associated with each of the one or more EVs.

18. The system of claim 1, wherein:

the system further comprises a direct current (DC) bus to which power may be routed by the source selection PDU to the grid interface and the EV; and the backup battery system is connected, either directly or through a DC-to-DC converter, to the DC bus such that the backup battery system automatically absorbs transient power surges or supplies transient power deficits on the DC bus to maintain the DC bus at a stable voltage during fluctuations in load or power generation.

19. The system of claim 1, wherein:

the system further comprises a direct current (DC) bus to which power may be routed by the source selection PDU to the grid interface and the EV, and a flywheel power smoothing system; and the flywheel power smoothing system is connected, either directly or through a DC-to-DC converter, to the DC bus operating such that the flywheel power smoothing system automatically absorbs transient power surges or supplies transient power deficits on the DC bus to maintain the DC bus at a stable voltage during fluctuations in load or power generation.

20. The system of claim 1, wherein:

the system further comprises, and is housed in, a single, modular enclosure;

the system further comprises an internal cooling system and protective earth grounding;

whereby the system is made modular and transportable, requiring only an electrical grid connection to function and providing a plug-and-play installation for bi-directional charging of the EV or supply of power to the electrical grid from the EV.

\* \* \* \* \*